US012441789B2

(12) United States Patent
Poirier et al.

(10) Patent No.: US 12,441,789 B2
(45) Date of Patent: Oct. 14, 2025

(54) DLL3-TARGETING ANTIBODIES AND USES THEREOF

(71) Applicants: Memorial Sloan Kettering Cancer Center, New York, NY (US); TRI-INSTITUTIONAL THERAPEUTICS DISCOVERY INSTITUTE, New York, NY (US)

(72) Inventors: John T. Poirier, New York, NY (US); Charles Rudin, New York, NY (US); Jason Lewis, New York, NY (US); Abdul Khan, New York, NY (US); David Andrew, New York, NY (US); Xinlei Chen, New York, NY (US); Ivo Lorenz, New York, NY (US)

(73) Assignees: Memorial Sloan Kettering Cancer Center, New York, NY (US); Tri-Institutional Therapeutics Discovery Institute, New York, NY (US)

(*) Notice: Subject to any disclaimer, the term of this patent is extended or adjusted under 35 U.S.C. 154(b) by 949 days.

(21) Appl. No.: 17/622,404

(22) PCT Filed: Jul. 8, 2020

(86) PCT No.: PCT/US2020/041282
§ 371 (c)(1),
(2) Date: Dec. 23, 2021

(87) PCT Pub. No.: WO2021/007371
PCT Pub. Date: Jan. 14, 2021

(65) Prior Publication Data
US 2022/0348648 A1  Nov. 3, 2022

Related U.S. Application Data

(60) Provisional application No. 62/872,915, filed on Jul. 11, 2019.

(51) Int. Cl.
*C07K 16/28* (2006.01)
*A61P 35/00* (2006.01)
*C12N 15/63* (2006.01)

(52) U.S. Cl.
CPC .............. *C07K 16/28* (2013.01); *A61P 35/00* (2018.01); *C12N 15/63* (2013.01); *C07K 2317/24* (2013.01); *C07K 2317/51* (2013.01); *C07K 2317/515* (2013.01); *C07K 2317/55* (2013.01)

(58) Field of Classification Search
None
See application file for complete search history.

(56) References Cited

U.S. PATENT DOCUMENTS

| 7,718,774 | B2 | 5/2010 | Mather et al. |
| 9,127,071 | B2* | 9/2015 | Yoshida ............... A61K 39/395 |
| 2005/0031614 | A1 | 2/2005 | Roskos et al. |
| 2013/0195878 | A1* | 8/2013 | MacDonald ............ A61P 25/04 |
| | | | 424/139.1 |
| 2016/0208019 | A1 | 7/2016 | Bacac et al. |

FOREIGN PATENT DOCUMENTS

| CN | 104093738 A | 10/2014 |
| JP | 2015-509947 A | 4/2015 |
| JP | 2017-514143 A | 6/2017 |
| WO | WO-2011/093097 A1 | 8/2011 |
| WO | WO-2012/013813 A1 | 2/2012 |
| WO | WO-2013/126746 A2 | 8/2013 |
| WO | WO-2015/127407 A1 | 8/2015 |
| WO | WO-2016/016412 A1 | 2/2016 |

OTHER PUBLICATIONS

Rudikoff et al (Proc Natl Acad Sci USA 1982 vol. 79 p. 1979). (Year: 1982).*
International Search Report and Written Opinion on PCT/US2020/041282, mailed Dec. 18, 2020 (14 pages).
Saunders et al., "A DLL3-targeted antibody-drug conjugate eradicates high-grade pulmonary neuroendocrine tumor-initiating cells in vivo." Sci Transl Med. 2015, vol. 7, Issue 302.

* cited by examiner

*Primary Examiner* — Janet L Andres
*Assistant Examiner* — Imma Barrera
(74) *Attorney, Agent, or Firm* — Foley & Lardner LLP

(57) ABSTRACT

The present disclosure relates generally to immunoglobulin-related compositions (e.g., antibodies or antigen binding fragments thereof) that can bind to delta-like protein 3 (DLL3). The antibodies of the present technology are useful in methods for detecting and treating a DLL3-associated cancer in a subject in need thereof.

17 Claims, 11 Drawing Sheets
Specification includes a Sequence Listing.

FIG. 1
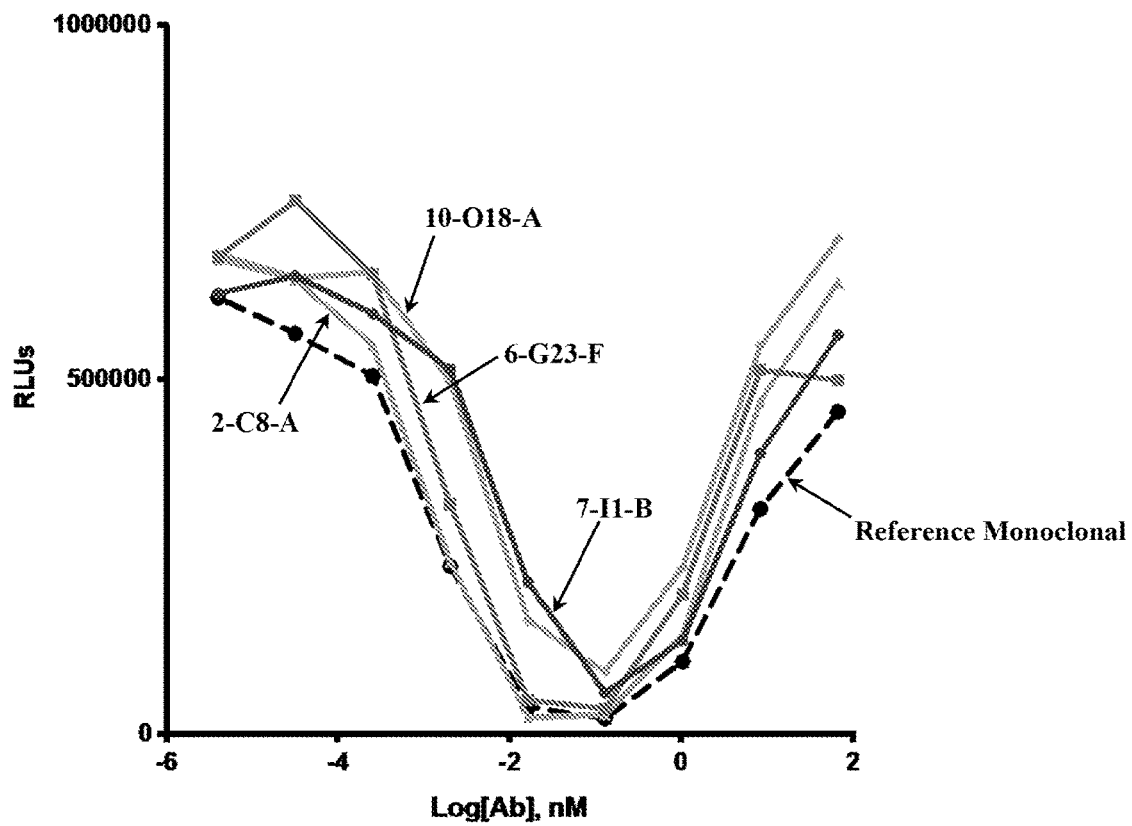
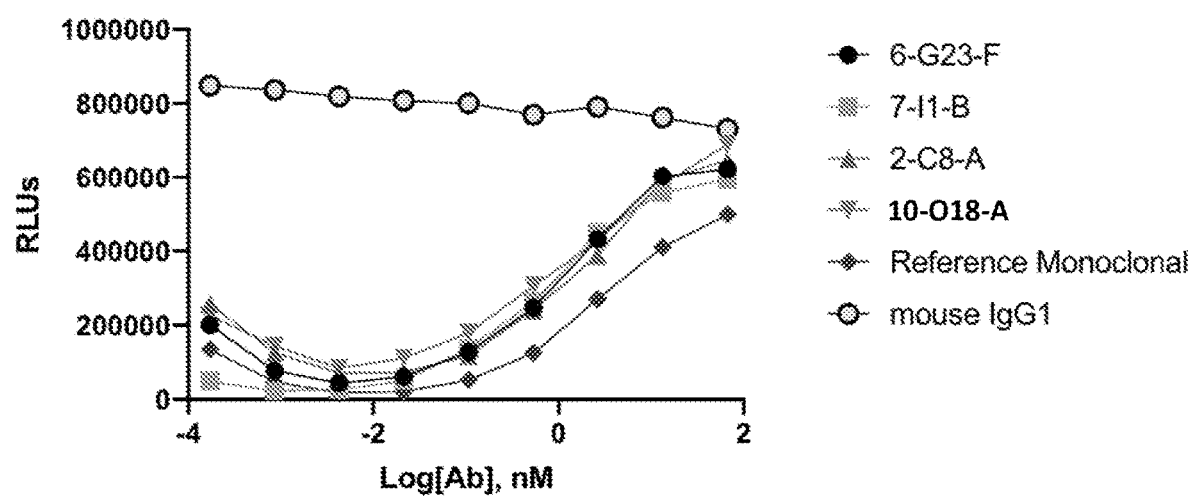

FIG. 2E

| | Kd nM | Kon (1/Ms) | Kdis(1/s) | FullX^2 | FullR^2 |
|---|---|---|---|---|---|
| 7-I1-B | 0.68 | 5.02E+05 | 3.44E-04 | 0.168 | 0.99 |
| 10-O18-A | 0.62 | 4.49E+05 | 2.67E-04 | 0.038 | 0.97 |
| 6-G23-F | 0.16 | 4.05E+05 | 6.49E-05 | 0.15 | 0.97 |
| 2-C8-A | 0.668 | 3.63E+05 | 2.42E-04 | 0.073 | 0.99 |

FIG. 3A

Nucleotide Sequence of Heavy Chain Variable Domain (V$_H$) of 7-I1-B (SEQ ID NO: 1)

GAGGTGCAGCTGGTGGAGTCTGGGGGGGGCTTGGTAAAGCCTGGGGGGTCCCTT
AGACTCTCCTGTGCAGCCTCTGGATTCACTTTCAGTAACACCTGGATGAGCTGGG
TCCGCCAGGCTCCAGGGAAGGGGCTGGAGTGGGTTGGCCGTATTAAAAGCAAAT
CTGATGGTGGGACAACAGACTACGCTGCACCCGTGAAAGGCAGATTCACCATCT
CAAGAGATGATTCAAAAAACACGCTGTATCTGCAAATGAACAGCCTGAAAACCG
AGGACACAGCCGTGTATTACTGTACCCAGTATTATTGGAACTCCTTTGACTACTG
GGGCCAGGGAACCCTGGTCACCGTCTCCTCA

Amino Acid Sequence of Heavy Chain Variable Domain (V$_H$) of 7-I1-B (SEQ ID NO: 2)

EVQLVESGGGLVKPGGSLRLSCAASGFTFSNTWMSWVRQAPGKGLEWVGR<u>IKSKS
DGGTT</u>DYAAPVKGRFTISRDDSKNTLYLQMNSLKTEDTAVYYC<u>*TQYYWNSFDY*</u>WGQ
GTLVTVSS

FIG. 3B

Nucleotide Sequence of Light Chain Variable Domain (V$_L$) of 7-I1-B (SEQ ID NO: 6)

GACATCCAGATGACCCAGTCTCCATCCTCCCTGTCTGCATCTGTAGGAGACAGAG
TCACCATCACTTGCCAGGCGAGTCAGGACATTAGCAACTATTTAAATTGGTATCA
GCAGAAACCAGGGAAAGCCCCTAAGCTCCTGATCTACGATGCATCCAATTTGGA
AACAGGGGTCCCATCAAGGTTCAGTGGAAGTGGATCTGGGACAGATTTTACTTTC
ACCATCAGCAGCCTGCAGCCTGAAGATATTGCAACATATTACTGTCAACAGTATG
ATAATCTCCCGCTCACTTTCGGCGGAGGGACCAAGGTGGAGATCAAA

Amino Acid Sequence of Light Chain Variable Domain (V$_L$) of 7-I1-B (SEQ ID NO: 7)

DIQMTQSPSSLSASVGDRVTITCQASQDISNYLNWYQQKPGKAPKLLIY<u>DASNLETG</u>
VPSRFSGSGSGTDFTFTISSLQPEDIATYYC<u>*QQYDNLPLT*</u>FGGGTKVEIK

FIG. 4A

Nucleotide Sequence of Heavy Chain Variable Domain ($V_H$) of 2-C8-A (SEQ ID NO: 11).

GAGGTGCAGCTGGTGGAGTCTGGGGGAGGCTTGGTCCAGCCTGGGGGGTCCCAG
AGACTCTCCTGTGCAGCCTCTGGATTCACCTTTAGTAGCTATTGGATGAACTGGG
TCCGCCAGGCTCCAGGGAAGGGGCTGGAGTGGGTGGCCAACATAAAGGAAGAT
GGAAGTGAGAAATACTATGTGGACTCTGTGAAGGGCCGATTCACCATCTCCAGA
GACAACGCCAAGAACTCACTGTATCTGCAAATGAACAGCCTGAGAGCCGAGGAC
ACGGCTGTGTATTACTGTGCGAGAGATCCGGGCTGGGCTCCCTTTGACTACTGGG
GCCAGGGAACCCTGGTCACCGTCTCCTCA

Amino Acid Sequence of Heavy Chain Variable Domain ($V_H$) of 2-C8-A (SEQ ID NO: 12).

EVQLVESGGGLVQPGGSQRLSCAASGFTFSSYWMNWVRQAPGKGLEWVANI<u>KEDG
S</u><u>EKYY</u>VDSVKGRFTISRDNAKNSLYLQMNSLRAEDTAVYYCAR*DPGWAPFDY*WGQ
GTLVTVSS

FIG. 4B

Nucleotide Sequence of Light Chain Variable Domain ($V_L$) of 2-C8-A (SEQ ID NO: 16).

GACATCCAGATGTCCCAGTCTCCATCCTCACTGTCTGCATCTGTAGGAGACAGAG
TCACCATCACTTGTCGGGCGAGTCAGGGCATTAGCAATTATTTAGCCTGGTTTCA
GCAGAAACCAGGGAAAGCCCCTAAGTCCCTGATCTATGCTGCATCCAGTTTGCA
AAGTGGGGTCCCATCAAAGTTCAGCGGCAGTGGATCTGGGACAGATTTCACTCTC
GCCATCAGCAGCCTGCAGCCTGAAGATTTTGCAACTTATTACTGCCAACAGTATA
ATAGTTTCCCGTACACTTTTGGCCAGGGGACCACGCTGGAGATCAAA

Amino Acid Sequence of Light Chain Variable Domain ($V_L$) of 2-C8-A (SEQ ID NO: 17).

DIQMSQSPSSLSASVGDRVTITCRASQGISNYLAWFQQKPGKAPKSLIY<u>AASSLQS</u>GV
PSKFSGSGSGTDFTLAISSLQPEDFATYYC*QQYNSFPYT*FGQGTTLEIK

FIG. 5A

Nucleotide Sequence of Heavy Chain Variable Domain ($V_H$) of 10-O18-A (SEQ ID NO: 21).

CAGGTGCAGCTGCAGGAGTCGGGCCCAGGACTGGTGAAGCCTTCGGAGACCCTG
TCCCTCACCTGCACTGTCTCTGGTGGCTCCATCAATAGTTACTACTGGAGCTGGA
TCCGGCAGCCCCCAGGGAAGGGACTGGAGTGGATTGGGTATATCTTTTACAGTG
GGATCACCAACTACAACCCCTCCCTCAAGAGTCGAGTCACCATATCATTAGACAC
GTCCAAGAACCAGTTCTCCCTGAAGCTGAGCTCTGTGACCGCTGCGGACACGGCC
GTGTATTACTGTGCGAGAATCGGCGTGGCTGGTTTTACTTTGACTACTGGGGCC
AGGGAACCCTGGTCACCGTCTCCTCA

Amino Acid Sequence of Heavy Chain Variable Domain ($V_H$) of 10-O18-A (SEQ ID NO: 22).

QVQLQESGPGLVKPSETLSLTCTVSGGSINSYYWSWIRQPPGKGLEWIGYI<u>FYSGIT</u>N
YNPSLKSRVTISLDTSKNQFSLKLSSVTAADTAVYYCAR<u>*IGVAGFYFDY*</u>WGQGTLVT
VSS

FIG. 5B

Nucleotide Sequence of Light Chain Variable Domain ($V_L$) of 10-O18-A (SEQ ID NO: 26).

GAAATTGTGTTGACGCAGTCTCCAGGCACCCTGTCTTTGTCTCCAGGGGAAAGAG
CCACCCTCTCCTGCAGGGCCAGTCAGAGTGTTAGCAGCAGCTACTTAGCCTGGTA
CCAGCAGAAACCTGGCCAGGCTCCCAGGCTCCTCATCTATGGTGCATCCAGCAG
GGCCACTGGCATCCCAGACAGGTTCAGTGGCAGTGGGTCTGGGACAGACTTCAC
TCTCACCATCAGCAGACTGGAGCCTGAAGATTTTGCAGTGTATTACTGTCAGCAG
TATGGTACCTCACCGCTCACTTTCGGCGGAGGGACCAAGGTGGAGATCAAA

Amino Acid Sequence of Light Chain Variable Domain ($V_L$) of 10-O18-A (SEQ ID NO: 27).

EIVLTQSPGTLSLSPGERATLSCRASQSVSSSYLAWYQQKPGQAPRLLIY<u>GASSRATG</u>
IPDRFSGSGSGTDFTLTISRLEPEDFAVYYC<u>*QQYGTSPLT*</u>FGGGTKVEIK

FIG. 6A

Nucleotide Sequence of Heavy Chain Variable Domain ($V_H$) of 6-G23-F (SEQ ID NO: 31).

CAGGTGCAGCTGGTGCAGTCTGGGGCTGAGGTGAAGAAGCCTGGGGCCTCAGTG
AAGGTTTCCTGCAAGGCATCTGGATACACCTTCACCAGCTACTATATACACTGGG
TGCGACAGGCCCCTGGACAAGGGCTTGAGTGGATGGGAATAATCGACCCAAGTG
ATGGTAGCACAAACTACGCACAGAAGTTCCAGGGCAGAGTCACCATGACCAGGG
ACACGTCCACGAGCACAGTCTACATGGAGCTGAGCAGCCTGAGATCTGAGGACA
CGGCCGTGTATTACTGTGCGAGAGATCGGGAATATAACTACTACGGTTTGGACGT
CTGGGGCCAAGGGACCACGGTCACCGTCTCCTCA

Amino Acid Sequence of Heavy Chain Variable Domain ($V_H$) of 6-G23-F (SEQ ID NO: 32).

QVQLVQSGAEVKKPGASVKVSCKASGYTFTSYYIHWVRQAPGQGLEWMGI<u>IDPSD
GSTNYAQKFQGR</u>VTMTRDTSTSTVYMELSSLRSEDTAVYYCAR*DREYNYYGLDV*WG
QGTTVTVSS

FIG. 6B

Nucleotide Sequence of Light Chain Variable Domain ($V_L$) of 6-G23-F (SEQ ID NO: 36).

GATGTTGTGATGACTCAGTCTCCACTCTCCCTGCCCGTCACCCTTGGACAGCCGG
CCTCCATCTCCTGCAGGTCTAGTCAAAGCCTCGTATACCGTGATGGAAACACCTA
CTTGAATTGGTTTCAGCAGAGGCCAGGCCAATCTCCAAGGCGCCTAATTTATAAG
GTTTCTAACCGGGACTCTGGGGTCCCAGACAGATTCGCGGCAGTGGGTCAGGC
ACTGATTTCACACTGAAAATCAGCCGGGTGGAGGCTGAGGATGTTGGGGTTTATT
ACTGCATGCAAGGTACACACTGGCCTCCGACGTTCGGCCAAGGGACCAAGGTGG
AAATCAAA

Amino Acid Sequence of Light Chain Variable Domain ($V_L$) of 6-G23-F (SEQ ID NO: 37).

DVVMTQSPLSLPVTLGQPASISCRSSQSLVYRDGNTYLNWFQQRPGQSPRRLIY<u>KVS
NRD</u>SGVPDRFRGSGSGTDFTLKISRVEAEDVGVYYC*MQGTHWPPT*FGQGTKVEIK

FIG. 7

| Monoclonal | DLL3 | DLL4 | DLL1 |
|---|---|---|---|
| 10-O18-A | 1.361 | 0.056 | 0.126 |
| 2-C8-A | 1.359 | 0.07 | 0.098 |
| 6-G23-F | 1.459 | 0.05 | 0.206 |
| 7-J1-B | 1.302 | 0.96 | 0.127 |
| Background (anti-mouse IgG HRPO) | 0.085 | 0.085 | 0.095 |

FIG. 8A

>NM_016941.4 Homo sapiens delta like canonical Notch ligand 3 (DLL3),
transcript variant 1, mRNA (SEQ ID NO: 55)
ACTCCCGAGACCCCCCCACCAGAAGGCCATGGTCTCCCCACGGATGTCCGGGCTCCTCTCCCAGACTGTG
ATCCTAGCGCTCATTTTCCTCCCCCAGACACGGCCCGCTGGCGTCTTCGAGCTGCAGATCCACTCTTTCG
GGCCGGGTCCAGGCCCTGGGGCCCCGCGGTCCCCCTGCAGCGCCCGGCTCCCCTGCCGCCTCTTCTTCAG
AGTCTGCCTGAAGCCTGGGCTCTCAGAGGAGGCCGCCGAGTCCCCGTGCGCCCTGGGCGCGGCGCTGAGT
GCGCGCGGACCGGTCTACACCGAGCAGCCCGGAGCGCCCGCGCCTGATCTCCCACTGCCCGACGGCCTCT
TGCAGGTGCCCTTCCGGGACGCCTGGCCTGGCACCTTCTCTTTCATCATCGAAACCTGGAGAGAGGAGTT
AGGAGACCAGATTGGAGGGCCCGCCTGGAGCCTGCTGGCGCGCGTGGCTGGCAGGCGGCGCTTGGCAGCC
GGAGGCCCGTGGGCCCGGGACATTCAGCGCGCAGGCGCCTGGGAGCTGCGCTTCTCGTACCGCGCGCGCT
GCGAGCCGCCTGCCGTCGGGACCGCGTGCACGCGCCTCTGCCGTCCGCGCAGCGCCCCCTCGCGGTGCGG
TCCGGGACTGCGCCCTGCGCACCGCTCGAGGACGAATGTGAGGCGCCGCTGGTGTGCCGAGCAGGCTGC
AGCCCTGAGCATGGCTTCTGTGAACAGCCCGGTGAATGCCGATGCCTAGAGGGCTGGACTGGACCCCTCT
GCACGGTCCCTGTCTCCACCAGCAGCTGCCTCAGCCCCAGGGGCCCGTCCTCTGCTACCACCGGATGCCT
TGTCCCTGGGCCTGGGCCCTGTGACGGGAACCCGTGTGCCAATGGAGGCAGCTGTAGTGAGACACCCAGG
TCCTTTGAATGCACCTGCCCGCGTGGGTTCTACGGGCTGCGGTGTGAGGTGAGCGGGGTGACATGTGCAG
ATGGACCCTGCTTCAACGGCGGCTTGTGTGTCGGGGGTGCAGACCCTGACTCTGCCTACATCTGCCACTG
CCCACCCGGTTTCCAAGGCTCCAACTGTGAGAAGAGGGTGGACCGGTGCAGCCTGCAGCCATGCCGCAAT
GGCGGACTCTGCCTGGACCTGGGCCACGCCCTGCGCTGCCGCTGCCGCGCCGGCTTCGCGGGTCCTCGCT
GCGAGCACGACCTGGACGACTGCGCGGGCCGCGCCTGCGCTAACGGCGGCACGTGTGTGGAGGGCGGCGG
CGCGCACCGCTGCTCCTGCGCGCTGGGCTTCGGCGGCCGCGACTGCCGCGAGCGCGCGGACCCGTGCGCC
GCGCGCCCCTGTGCTCACGGCGGCCGCTGCTACGCCCACTTCTCCGGCCTCGTCTGCGCTTGCGCTCCCG
GCTACATGGGAGCGCGGTGTGAGTTCCCAGTGCACCCCGACGGCGCAAGCGCCTTGCCCGCGGCCCCGCC
GGGCCTCAGGCCCGGGGACCCTCAGCGCTACCTTTTGCCTCCGGCTCTGGGACTGCTCGTGGCCGCGGGC
GTGGCCGGCGCTGCGCTCTTGCTGGTCCACGTGCGCCGCCGTGGCCACTCCCAGGATGCTGGGTCTCGCT
TGCTGGCTGGGACCCCGGAGCCGTCAGTCCACGCACTCCCGGATGCACTCAACAACCTAAGGACGCAGGA
GGGTTCCGGGGATGGTCCGAGCTCGTCCGTAGATTGGAATCGCCCTGAAGATGTAGACCCTCAAGGGATT
TATGTCATATCTGCTCCTTCCATCTACGCTCGGGAGGTAGCGACGCCCCTTTTCCCCCCGCTACACACTG
GGCGCGCTGGGCAGAGGCAGCACCTGCTTTTTCCCTACCCTTCCTCGATTCTGTCCGTGAAATGAATTGG
GTAGAGTCTCTGGAAGGTTTTAAGCCCATTTTCAGTTCAACTTACTTTCATCCTATTTTGCATCCCTCT
TATCGTTTTGAGCTACCTGCCATCTTCTCTTTGAAAAACCTATGGGCTTGAGGAGGTCACGATGCCGACT
CCGCCAGAGCTTTTCCACTGATTGTACTCAGCGGGGAGGCAGGGGAGGCAGAGGGGCAGCCTCTCTAATG
CTTCCTACTCATTTTGTTTCTAGGCCTGACGCGTCTCCTCCATCCGCACCTGGAGTCAGAGCGTGGATTT
TTGTATTTGCTCGGTGGTGCCCAGTCTCTGCCCCAGAGGCTTTGGAGTTCAATCTTGAAGGGGTGTCTGG
GGGAACTTTACTGTTGCAAGTTGTAAATAATGGTTATTTATATCCTATTTTTCTCACCCCATCTCTCTA
GAAACACCTATAAAGGCTATTATTGTGATCA >NP_058637.1 delta-like protein 3 isoform 1 precursor [Homo sapiens](SEQ ID
NO: 50)
MVSPRMSGLLSQTVILALIFLPQTRPAGVFELQIHSFGPGPGPGAPRSPCSARLPCRLFFRVCLKPGLSE
EAAESPCALGAALSARGPVYTEQPGAPAPDLPLPDGLLQVPFRDAWPGTFSFIIETWREELGDQIGGPAW
SLLARVAGRRRLAAGGPWARDIQRAGAWELRFSYRARCEPPAVGTACTRLCRPRSAPSRCGPGLRPCAPL
EDECEAPLVCRAGCSPEHGFCEQPGECRCLEGWTGPLCTVPVSTSSCLSPRGPSSATTGCLVPGPGPCDG
NPCANGGSCSETPRSFECTCPRGFYGLRCEVSGVTCADGPCFNGGLCVGGADPDSAYICHCPPGFQGSNC
EKRVDRCSLQPCRNGGLCLDLGHALRCRCRAGFAGPRCEHDLDDCAGRACANGGTCVEGGGAHRCSALG
FGGRDCRERADPCAARPCAHGGRCYAHFSGLVCACAPGYMGARCEFPVHPDGASALPAAPPGLRPGDPQR
YLLPPALGLLVAAGVAGAALLLVHVRRRGHSQDAGSRLLAGTPEPSVHALPDALNNLRTQEGSGDGPSSS
VDWNRPEDVDPQGIYVISAPSIYAREVATPLFPPLHTGRAGQRQHLLFPYPSSILSVK

FIG. 8B

>NM_203486.3 Homo sapiens delta like canonical Notch ligand 3 (DLL3),
transcript variant 2, mRNA (SEQ ID NO: 56)
ACTCCCGAGACCCCCCACCAGAAGGCCATGGTCTCCCCACGGATGTCCGGGCTCCTCTCCCAGACTGTG
ATCCTAGCGCTCATTTTCCTCCCCCAGACACGGCCCGCTGGCGTCTTCGAGCTGCAGATCCACTCTTTCG
GGCCGGGTCCAGGCCCTGGGGCCCCGCGGTCCCCCTGCAGCGCCCGGCTCCCCTGCCGCCTCTTCTTCAG
AGTCTGCCTGAAGCCTGGCTCTCAGAGGAGGCCGCCGAGTCCCCGTGCGCCCTGGGCGCGGCGCTGAGT
GCGCGCGGACCGGTCTACACCGAGCAGCCCGGAGCGCCCGCGCCTGATCTCCCACTGCCCGACGGCCTCT
TGCAGGTGCCCTTCCGGGACGCCTGGCCTGGCACCTTCTCTTTCATCATCGAAACCTGGAGAGAGGAGTT
AGGAGACCAGATTGGAGGGCCCGCCTGGAGCCTGCTGGCGCGCGTGGCTGGCAGGCGGCGCTTGGCAGCC
GGAGGCCCGTGGGCCCGGACATTCAGCGCGCAGGCGCCTGGGAGCTGCGCTTCTCGTACCGCGCGCGCT
GCGAGCCGCCTGCCGTCGGGACCGCGTGCACGCGCCTCTGCCGTCCGCGCAGCGCCCCCTCGCGGTGCGG
TCCGGGACTGCGCCCCTGCGCACCGCTCGAGGACGAATGTGAGGCGCCGCTGGTGTGCCGAGCAGGCTGC
AGCCCTGAGCATGGCTTCTGTGAACAGCCCGGTGAATGCCGATGCCTAGAGGGCTGGACTGGACCCCTCT
GCACGGTCCCTGTCTCCACCAGCAGCTGCCTCAGCCCCAGGGGCCCGTCCTCTGCTACCACCGGATGCCT
TGTCCCTGGGCCTGGGCCCTGTGACGGGAACCCGTGTGCCAATGGAGGCAGCTGTAGTGAGACACCCAGG
TCCTTTGAATGCACCTGCCCGCGTGGGTTCTACGGCTGCGGTGTGAGGTGAGCGGGGTGACATGTGCAG
ATGGACCCTGCTTCAACGGCGGCTTGTGTGTCGGGGGTGCAGACCCTGACTCTGCCTACATCTGCCACTG
CCCACCCGGTTTCCAAGGCTCCAACTGTGAGAAGAGGGTGGACCGGTGCAGCCTGCAGCCATGCCGCAAT
GGCGGACTCTGCCTGGACCTGGGCCACGCCCTGCGCTGCCGCTGCCGCGCCGGCTTCGCGGGTCCTCGCT
GCGAGCACGACCTGGACGACTGCGCGGGCCGCGCCTGCGCTAACGGCGGCACGTGTGTGGAGGGCGGCGG
CGCGCACCGCTGCTCCTGCGCGCTGGGCTTCGGCGGCCGCGACTGCCGCGAGCGCGCGGACCCGTGCGCC
GCGCGCCCCTGTGCTCACGGCGGCCGCTGCTACGCCCACTTCTCCGGCCTCGTCTGCGCTTGCGCTCCCG
GCTACATGGGAGCGCGGTGTGAGTTCCCAGTGCACCCCGACGGCGCAAGCGCCTTGCCCGCGGCCCCGCC
GGGCCTCAGGCCCGGGACCCTCAGCGCTACCTTTTGCCTCCGGCTCTGGGACTGCTCGTGGCCGCGGGC
GTGGCCGGCGCTGCGCTCTTGCTGGTCCACGTGCGCCGCCGTGGCCACTCCCAGGATGCTGGGTCTCGCT
TGCTGGCTGGGACCCCGGAGCCGTCAGTCCACGCACTCCCGGATGCACTCAACAACCTAAGGACGCAGGA
GGGTTCCGGGGATGGTCCGAGCTCGTCCGTAGATTGGAATCGCCCTGAAGATGTAGACCCTCAAGGGATT
TATGTCATATCTGCTCCTTCCATCTACGCTCGGGAGGCCTGACGCGTCTCCTCCATCCGCACCTGGAGTC
AGAGCGTGGATTTTTGTATTTGCTCGGTGGTGCCCAGTCTCTGCCCCAGAGGCTTTGGAGTTCAATCTTG
AAGGGGTGTCTGGGGGAACTTTACTGTTGCAAGTTGTAAATAATGGTTATTTATATCCTATTTTTCTCA
CCCCATCTCTCTAGAAACACCTATAAAGGCTATTATTGTGATCA >NP_982353.1 delta-like protein 3 isoform 2 precursor [Homo sapiens] (SEQ
ID NO: 51)
MVSPRMSGLLSQTVILALIFLPQTRPAGVFELQIHSFGPGPGPGAPRSPCSARLPCRLFFRVCLKPGLSE
EAAESPCALGAALSARGPVYTEQPGAPAPDLPLPDGLLQVPFRDAWPGTFSFIIETWREELGDQIGGPAW
SLLARVAGRRRLAAGGPWARDIQRAGAWELRFSYRARCEPPAVGTACTRLCRPRSAPSRCGPGLRPCAPL
EDECEAPLVCRAGCSPEHGFCEQPGECRLEGWTGPLCTVPVSTSSCLSPRGPSSATTGCLVPGPGPCDG
NPCANGGSCSETPRSFECTCPRGFYGLRCEVSGVTCADGPCFNGGLCVGGADPDSAYICHCPPGFQGSNC
EKRVDRCSLQPCRNGGLCLDLGHALRCRCRAGFAGPRCEHDLDDCAGRACANGGTCVEGGGAHRCSCALG
FGGRDCRERADPCAARPCAHGGRCYAHFSGLVCACAPGYMGARCEFPVHPDGASALPAAPPGLRPGDPQR
YLLPPALGLLVAAGVGAALLLVHVRRRGHSQDAGSRLLAGTPEPSVHALPDALNNLRTQEGSGDPSSS
VDWNRPEDVDPQGIYVISAPSIYAREA

SEQUENCE LISTING

<160> NUMBER OF SEQ ID NOS: 59

<210> SEQ ID NO 1
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1
gaggtgcagc tggtggagtc tgggggggc ttggtaaagc ctgggggtc ccttagactc      60 tcctgtgcag cctctggatt cactttcagt aacacctgga tgagctgggt ccgccaggct     120
ccagggaagg ggctggagtg ggttggccgt attaaaagca aatctgatgg tgggacaaca     180
gactacgctg cacccgtgaa aggcagattc accatctcaa gagatgattc aaaaaacacg     240
ctgtatctgc aaatgaacag cctgaaaacc gaggacacag ccgtgtatta ctgtacccag     300
tattattgga actcctttga ctactggggc cagggaaccc tggtcaccgt ctcctca        357

<210> SEQ ID NO 2
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asn Thr
            20                  25                  30

Trp Met Ser Trp Val Arg Gln Ala Pro Gly Lys Gly Leu Glu Trp Val
        35                  40                  45

Gly Arg Ile Lys Ser Lys Ser Asp Gly Gly Thr Thr Asp Tyr Ala Ala
    50                  55                  60

Pro Val Lys Gly Arg Phe Thr Ile Ser Arg Asp Asp Ser Lys Asn Thr
65                  70                  75                  80

Leu Tyr Leu Gln Met Asn Ser Leu Lys Thr Glu Asp Thr Ala Val Tyr
                85                  90                  95

Tyr Cys Thr Gln Tyr Tyr Trp Asn Ser Phe Asp Tyr Trp Gly Gln Gly
            100                 105                 110

Thr Leu Val Thr Val Ser Ser
        115

<210> SEQ ID NO 3
<211> LENGTH: 8
<212> TYPE: PRT
<213> ORGANISM: Artificial Sequence -continued
<220> FEATURE:
<223> OTHER INFORMATION: Description of Artificial Sequence: Synthetic
      peptide

<400> SEQUENCE: 3

Gly Phe Thr Phe Ser Asn Thr Trp
1               5

<210> SEQ ID NO 4
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Ile Lys Ser Lys Ser Asp Gly Gly Thr Thr
1               5                   10

<210> SEQ ID NO 5
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Thr Gln Tyr Tyr Trp Asn Ser Phe Asp Tyr
1               5                   10

<210> SEQ ID NO 6
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 6
gacatccaga tgacccagtc tccatcctcc ctgtctgcat ctgtaggaga cagagtcacc      60
atcacttgcc aggcgagtca ggacattagc aactatttaa attggtatca gcagaaacca     120
gggaaagccc ctaagctcct gatctacgat gcatccaatt tggaaacagg gtcccatca      180 aggttcagtg gaagtggatc tgggacagat tttactttca ccatcagcag cctgcagcct     240
gaagatattg caacatatta ctgtcaacag tatgataatc tcccgctcac tttcggcgga     300
gggaccaagg tggagatcaa a                                                321

<210> SEQ ID NO 7
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
            20                  25                  30

Leu Asn Trp Tyr Gln Gln Lys Pro Gly Lys Ala Pro Lys Leu Leu Ile
        35                  40                  45

Tyr Asp Ala Ser Asn Leu Glu Thr Gly Val Pro Ser Arg Phe Ser Gly
            50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Asp Asn Leu Pro Leu
                85                  90                  95

Thr Phe Gly Gly Gly Thr Lys Val Glu Ile Lys
            100                 105

<210> SEQ ID NO 8
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Gln Ala Ser Gln Asp Ile Ser Asn Tyr Leu Asn
1               5                   10

<210> SEQ ID NO 9
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Asp Ala Ser Asn Leu Glu Thr
1               5

<210> SEQ ID NO 10
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Gln Gln Tyr Asp Asn Leu Pro Leu Thr
1               5

<210> SEQ ID NO 11
<211> LENGTH: 354
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
gaggtgcagc tggtggagtc tgggggaggc ttggtccagc ctggggggtc ccagagactc      60
tcctgtgcag cctctggatt caccttagt agctattgga tgaactgggt ccgccaggct     120
ccagggaagg ggctggagtg gtggccaac ataaaggaag atggaagtga aaatactat     180 gtggactctg tgaagggccg attcaccatc tccagagaca acgccaagaa ctcactgtat     240
ctgcaaatga acagcctgag agccgaggac acggctgtgt attactgtgc gagagatccg     300
ggctgggctc cctttgacta ctggggccag ggaaccctgg tcaccgtctc ctca          354

```
<210> SEQ ID NO 12
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Glu Val Gln Leu Val Glu Ser Gly Gly Gly Leu Val Gln Pro Gly Gly
1               5                   10                  15

Ser Gln Arg Leu Ser Cys Ala Ala Ser Gly Phe Thr Phe Ser Ser Tyr
            20                  25                  30

Trp Met Asn Trp Val Arg Gln Ala Pro Gly Lys Gly Leu Glu Trp Val
        35                  40                  45

Ala Asn Ile Lys Glu Asp Gly Ser Glu Lys Tyr Tyr Val Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Asp Pro Gly Trp Ala Pro Phe Asp Tyr Trp Gly Gln Gly Thr
            100                 105                 110

Leu Val Thr Val Ser Ser
        115

<210> SEQ ID NO 13
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Gly Phe Thr Phe Ser Ser Tyr
1               5

<210> SEQ ID NO 14
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Lys Glu Asp Gly Ser Glu
1               5

<210> SEQ ID NO 15
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Asp Pro Gly Trp Ala Pro Phe Asp Tyr
1               5

<210> SEQ ID NO 16
<211> LENGTH: 321
```

```
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 16
gacatccaga tgtcccagtc tccatcctca ctgtctgcat ctgtaggaga cagagtcacc    60
atcacttgtc gggcgagtca gggcattagc aattatttag cctggtttca gcagaaacca   120
gggaaagccc ctaagtccct gatctatgct gcatccagtt tgcaaagtgg ggtcccatca   180
aagttcagcg gcagtggatc tgggacagat ttcactctcg ccatcagcag cctgcagcct   240
gaagattttg caacttatta ctgccaacag tataatagtt tcccgtacac ttttggccag   300
gggaccacgc tggagatcaa a                                             321

<210> SEQ ID NO 17
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Asp Ile Gln Met Ser Gln Ser Pro Ser Ser Leu Ser Ala Ser Val Gly
1               5                   10                  15

Asp Arg Val Thr Ile Thr Cys Arg Ala Ser Gln Gly Ile Ser Asn Tyr
            20                  25                  30

Leu Ala Trp Phe Gln Gln Lys Pro Gly Lys Ala Pro Lys Ser Leu Ile
        35                  40                  45

Tyr Ala Ala Ser Ser Leu Gln Ser Gly Val Pro Ser Lys Phe Ser Gly
    50                  55                  60

Ser Gly Ser Gly Thr Asp Phe Thr Leu Ala Ile Ser Ser Leu Gln Pro
65                  70                  75                  80

Glu Asp Phe Ala Thr Tyr Tyr Cys Gln Gln Tyr Asn Ser Phe Pro Tyr
                85                  90                  95

Thr Phe Gly Gln Gly Thr Thr Leu Glu Ile Lys
            100                 105

<210> SEQ ID NO 18
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Arg Ala Ser Gln Gly Ile Ser Asn Tyr Leu Ala
1               5                   10

<210> SEQ ID NO 19
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ala Ala Ser Ser Leu Gln Ser
1               5
```

<210> SEQ ID NO 20
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Gln Gln Tyr Asn Ser Phe Pro Tyr Thr
1               5

<210> SEQ ID NO 21
<211> LENGTH: 354
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 21
caggtgcagc tgcaggagtc gggcccagga ctggtgaagc cttcggagac cctgtccctc      60
acctgcactg tctctggtgg ctccatcaat agttactact ggagctggat ccggcagccc     120
ccagggaagg gactggagtg gattgggtat atcttttaca gtgggatcac caactacaac     180
ccctccctca gagtcgagt caccatatca ttagacacgt ccaagaacca gttctccctg     240
aagctgagct ctgtgaccgc tgcggacacg gccgtgtatt actgtgcgag aatcggcgtg     300
gctggttttt actttgacta ctggggccag ggaaccctgg tcaccgtctc ctca          354

<210> SEQ ID NO 22
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Asn Ser Tyr
            20                  25                  30

Tyr Trp Ser Trp Ile Arg Gln Pro Pro Gly Lys Gly Leu Glu Trp Ile
        35                  40                  45

Gly Tyr Ile Phe Tyr Ser Gly Ile Thr Asn Tyr Asn Pro Ser Leu Lys
    50                  55                  60

Ser Arg Val Thr Ile Ser Leu Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Ile Gly Val Ala Gly Phe Tyr Phe Asp Tyr Trp Gly Gln Gly Thr
            100                 105                 110

Leu Val Thr Val Ser Ser
        115

<210> SEQ ID NO 23
<211> LENGTH: 7
<212> TYPE: PRT
<213> ORGANISM: Artificial Sequence
<220> FEATURE:

```
<223> OTHER INFORMATION: Description of Artificial Sequence: Synthetic
      peptide

<400> SEQUENCE: 23

Gly Gly Ser Ile Asn Ser Tyr
1               5

<210> SEQ ID NO 24
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Phe Tyr Ser Gly Ile
1               5

<210> SEQ ID NO 25
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Ile Gly Val Ala Gly Phe Tyr Phe Asp Tyr
1               5                   10

<210> SEQ ID NO 26
<211> LENGTH: 324
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 26
gaaattgtgt tgacgcagtc tccaggcacc ctgtctttgt ctccagggga aagagccacc      60
ctctcctgca gggccagtca gagtgttagc agcagctact tagcctggta ccagcagaaa     120
cctggccagg ctcccaggct cctcatctat ggtgcatcca gcagggccac tggcatccca     180
gacaggttca gtggcagtgg gtctgggaca gacttcactc tcaccatcag cagactggag     240
cctgaagatt ttgcagtgta ttactgtcag cagtatggta cctcaccgct cactttcggc     300
ggagggacca aggtggagat caaa                                            324

<210> SEQ ID NO 27
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
                20                  25                  30

Tyr Leu Ala Trp Tyr Gln Gln Lys Pro Gly Gln Ala Pro Arg Leu Leu
            35                  40                  45
```

```
Ile Tyr Gly Ala Ser Ser Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Thr Ser Pro
                 85                  90                  95

Leu Thr Phe Gly Gly Gly Thr Lys Val Glu Ile Lys
            100                 105

<210> SEQ ID NO 28
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Arg Ala Ser Gln Ser Val Ser Ser Ser Tyr Leu Ala
 1               5                  10

<210> SEQ ID NO 29
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Gly Ala Ser Ser Arg Ala Thr
 1               5

<210> SEQ ID NO 30
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Gln Gln Tyr Gly Thr Ser Pro Leu Thr
 1               5

<210> SEQ ID NO 31
<211> LENGTH: 360
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 31
caggtgcagc tggtgcagtc tggggctgag gtgaagaagc ctggggcctc agtgaaggtt      60
tcctgcaagg catctggata caccttcacc agctactata tacactgggt gcgacaggcc    120
cctggacaag gcttgagtg gatgggaata atcgacccaa gtgatggtag cacaaactac    180
gcacagaagt tccagggcag agtcaccatg accaggggaca cgtccacgag cacagtctac    240
atggagctga gcagcctgag atctgaggac acggccgtgt attactgtgc gagagatcgg    300
gaatataact actacggttt ggacgtctgg ggccaaggga ccacggtcac cgtctcctca    360

<210> SEQ ID NO 32
```

```
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Tyr Ile His Trp Val Arg Gln Ala Pro Gly Gln Gly Leu Glu Trp Met
        35                  40                  45

Gly Ile Ile Asp Pro Ser Asp Gly Ser Thr Asn Tyr Ala Gln Lys Phe
    50                  55                  60

Gln Gly Arg Val Thr Met Thr Arg Asp Thr Ser Ser Thr Val Tyr
65                  70                  75                  80

Met Glu Leu Ser Ser Leu Arg Ser Glu Asp Thr Ala Val Tyr Tyr Cys
                85                  90                  95

Ala Arg Asp Arg Glu Tyr Asn Tyr Tyr Gly Leu Asp Val Trp Gly Gln
            100                 105                 110

Gly Thr Thr Val Thr Val Ser Ser
        115                 120

<210> SEQ ID NO 33
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Gly Tyr Thr Phe Thr Ser Tyr
1               5

<210> SEQ ID NO 34
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Asp Pro Ser Asp Gly Ser
1               5

<210> SEQ ID NO 35
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Asp Arg Glu Tyr Asn Tyr Tyr Gly Leu Asp Val
1               5                   10

<210> SEQ ID NO 36
<211> LENGTH: 336
<212> TYPE: DNA
```

<213> ORGANISM: Artificial Sequence
<220> FEATURE:
<223> OTHER INFORMATION: Description of Artificial Sequence: Synthetic polynucleotide

<400> SEQUENCE: 36

```
gatgttgtga tgactcagtc tccactctcc ctgcccgtca cccttggaca gccggcctcc    60
atctcctgca ggtctagtca aagcctcgta taccgtgatg gaaacaccta cttgaattgg   120
tttcagcaga ggccaggcca atctccaagg cgcctaattt ataaggtttc taaccgggac   180
tctggggtcc cagacagatt ccgcggcagt gggtcaggca ctgatttcac actgaaaatc   240
agccgggtgg aggctgagga tgttggggtt tattactgca tgcaaggtac acactggcct   300
ccgacgttcg gccaagggac caaggtggaa atcaaa                             336
```

<210> SEQ ID NO 37
<211> LENGTH: 112
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 37

```
Asp Val Val Met Thr Gln Ser Pro Leu Ser Leu Pro Val Thr Leu Gly
1               5                   10                  15
Gln Pro Ala Ser Ile Ser Cys Arg Ser Ser Gln Ser Leu Val Tyr Arg
            20                  25                  30
Asp Gly Asn Thr Tyr Leu Asn Trp Phe Gln Gln Arg Pro Gly Gln Ser
        35                  40                  45
Pro Arg Arg Leu Ile Tyr Lys Val Ser Asn Arg Asp Ser Gly Val Pro
    50                  55                  60
Asp Arg Phe Arg Gly Ser Gly Ser Gly Thr Asp Phe Thr Leu Lys Ile
65                  70                  75                  80
Ser Arg Val Glu Ala Glu Asp Val Gly Val Tyr Tyr Cys Met Gln Gly
                85                  90                  95
Thr His Trp Pro Pro Thr Phe Gly Gln Gly Thr Lys Val Glu Ile Lys
            100                 105                 110
```

<210> SEQ ID NO 38
<211> LENGTH: 16
<212> TYPE: PRT
<213> ORGANISM: Artificial Sequence
<220> FEATURE:
<223> OTHER INFORMATION: Description of Artificial Sequence: Synthetic peptide

<400> SEQUENCE: 38

```
Arg Ser Ser Gln Ser Leu Val Tyr Arg Asp Gly Asn Thr Tyr Leu Asn
1               5                   10                  15
```

<210> SEQ ID NO 39
<211> LENGTH: 7
<212> TYPE: PRT
<213> ORGANISM: Artificial Sequence
<220> FEATURE:
<223> OTHER INFORMATION: Description of Artificial Sequence: Synthetic peptide

<400> SEQUENCE: 39

```
Lys Val Ser Asn Arg Asp Ser
1               5
```

<210> SEQ ID NO 40
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

Met Gln Gly Thr His Trp Pro Pro Thr
1               5

<210> SEQ ID NO 41
<211> LENGTH: 384
<212> TYPE: PRT
<213> ORGANISM: Homo sapiens

<400> SEQUENCE: 41

Ala Pro Thr Lys Ala Pro Asp Val Phe Pro Ile Ile Ser Gly Cys Arg
1               5                   10                  15

His Pro Lys Asp Asn Ser Pro Val Val Leu Ala Cys Leu Ile Thr Gly
                20                  25                  30

Tyr His Pro Thr Ser Val Thr Val Thr Trp Tyr Met Gly Thr Gln Ser
            35                  40                  45

Gln Pro Gln Arg Thr Phe Pro Glu Ile Gln Arg Arg Asp Ser Tyr Tyr
        50                  55                  60

Met Thr Ser Ser Gln Leu Ser Thr Pro Leu Gln Gln Trp Arg Gln Gly
65                  70                  75                  80

Glu Tyr Lys Cys Val Val Gln His Thr Ala Ser Lys Ser Lys Lys Glu
                85                  90                  95

Ile Phe Arg Trp Pro Glu Ser Pro Lys Ala Gln Ala Ser Ser Val Pro
            100                 105                 110

Thr Ala Gln Pro Gln Ala Glu Gly Ser Leu Ala Lys Ala Thr Thr Ala
        115                 120                 125

Pro Ala Thr Thr Arg Asn Thr Gly Arg Gly Gly Glu Glu Lys Lys Lys
130                 135                 140

Glu Lys Glu Lys Glu Glu Gln Glu Glu Arg Glu Thr Lys Thr Pro Glu
145                 150                 155                 160

Cys Pro Ser His Thr Gln Pro Leu Gly Val Tyr Leu Leu Thr Pro Ala
                165                 170                 175

Val Gln Asp Leu Trp Leu Arg Asp Lys Ala Thr Phe Thr Cys Phe Val
            180                 185                 190

Val Gly Ser Asp Leu Lys Asp Ala His Leu Thr Trp Glu Val Ala Gly
        195                 200                 205

Lys Val Pro Thr Gly Gly Val Glu Glu Gly Leu Leu Glu Arg His Ser
210                 215                 220

Asn Gly Ser Gln Ser Gln His Ser Arg Leu Thr Leu Pro Arg Ser Leu
225                 230                 235                 240

Trp Asn Ala Gly Thr Ser Val Thr Cys Thr Leu Asn His Pro Ser Leu
                245                 250                 255

Pro Pro Gln Arg Leu Met Ala Leu Arg Glu Pro Ala Ala Gln Ala Pro
            260                 265                 270

Val Lys Leu Ser Leu Asn Leu Leu Ala Ser Ser Asp Pro Pro Glu Ala
        275                 280                 285

Ala Ser Trp Leu Leu Cys Glu Val Ser Gly Phe Ser Pro Pro Asn Ile
        290                 295                 300

-continued

Leu Leu Met Trp Leu Glu Asp Gln Arg Glu Val Asn Thr Ser Gly Phe
305                 310                 315                 320

Ala Pro Ala Arg Pro Pro Gln Pro Gly Ser Thr Thr Phe Trp Ala
            325                 330                 335

Trp Ser Val Leu Arg Val Pro Ala Pro Pro Ser Pro Gln Pro Ala Thr
            340                 345                 350

Tyr Thr Cys Val Val Ser His Glu Asp Ser Arg Thr Leu Leu Asn Ala
            355                 360                 365

Ser Arg Ser Leu Glu Val Ser Tyr Val Thr Asp His Gly Pro Met Lys
370                 375                 380

<210> SEQ ID NO 42
<211> LENGTH: 330
<212> TYPE: PRT
<213> ORGANISM: Homo sapiens

<400> SEQUENCE: 42

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

```
Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 43
<211> LENGTH: 326
<212> TYPE: PRT
<213> ORGANISM: Homo sapiens

<400> SEQUENCE: 43

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ser Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
290                 295                 300

Ser Val Met His Glu Ala Leu His Asn His Tyr Thr Gln Lys Ser Leu
305                 310                 315                 320

Ser Leu Ser Pro Gly Lys
            325
```

```
<210> SEQ ID NO 44
<211> LENGTH: 377
<212> TYPE: PRT
<213> ORGANISM: Homo sapiens

<400> SEQUENCE: 44
```

| | | | | | | | | | | | | | | |
|---|---|---|---|---|---|---|---|---|---|---|---|---|---|---|
| Ala | Ser | Thr | Lys | Gly | Pro | Ser | Val | Phe | Pro | Leu | Ala | Pro | Cys | Ser | Arg |
| 1 | | | | 5 | | | | | 10 | | | | | 15 |
| Ser | Thr | Ser | Gly | Gly | Thr | Ala | Ala | Leu | Gly | Cys | Leu | Val | Lys | Asp | Tyr |
| | | | 20 | | | | | 25 | | | | | 30 | | |
| Phe | Pro | Glu | Pro | Val | Thr | Val | Ser | Trp | Asn | Ser | Gly | Ala | Leu | Thr | Ser |
| | | 35 | | | | | 40 | | | | | 45 | | | |
| Gly | Val | His | Thr | Phe | Pro | Ala | Val | Leu | Gln | Ser | Ser | Gly | Leu | Tyr | Ser |
| | 50 | | | | | 55 | | | | | 60 | | | | |
| Leu | Ser | Ser | Val | Val | Thr | Val | Pro | Ser | Ser | Ser | Leu | Gly | Thr | Gln | Thr |
| 65 | | | | | 70 | | | | | 75 | | | | | 80 |
| Tyr | Thr | Cys | Asn | Val | Asn | His | Lys | Pro | Ser | Asn | Thr | Lys | Val | Asp | Lys |
| | | | | 85 | | | | | 90 | | | | | 95 | |
| Arg | Val | Glu | Leu | Lys | Thr | Pro | Leu | Gly | Asp | Thr | Thr | His | Thr | Cys | Pro |
| | | | 100 | | | | | 105 | | | | | 110 | | |
| Arg | Cys | Pro | Glu | Pro | Lys | Ser | Cys | Asp | Thr | Pro | Pro | Pro | Cys | Pro | Arg |
| | | 115 | | | | | 120 | | | | | 125 | | | |
| Cys | Pro | Glu | Pro | Lys | Ser | Cys | Asp | Thr | Pro | Pro | Pro | Cys | Pro | Arg | Cys |
| 130 | | | | | 135 | | | | | 140 | | | | | |
| Pro | Glu | Pro | Lys | Ser | Cys | Asp | Thr | Pro | Pro | Pro | Cys | Pro | Arg | Cys | Pro |
| 145 | | | | | 150 | | | | | 155 | | | | | 160 |
| Ala | Pro | Glu | Leu | Leu | Gly | Gly | Pro | Ser | Val | Phe | Leu | Phe | Pro | Pro | Lys |
| | | | | 165 | | | | | 170 | | | | | 175 | |
| Pro | Lys | Asp | Thr | Leu | Met | Ile | Ser | Arg | Thr | Pro | Glu | Val | Thr | Cys | Val |
| | | | 180 | | | | | 185 | | | | | 190 | | |
| Val | Val | Asp | Val | Ser | His | Glu | Asp | Pro | Glu | Val | Gln | Phe | Lys | Trp | Tyr |
| | | 195 | | | | | 200 | | | | | 205 | | | |
| Val | Asp | Gly | Val | Glu | Val | His | Asn | Ala | Lys | Thr | Lys | Pro | Arg | Glu | Glu |
| 210 | | | | | 215 | | | | | 220 | | | | | |
| Gln | Tyr | Asn | Ser | Thr | Phe | Arg | Val | Val | Ser | Val | Leu | Thr | Val | Leu | His |
| 225 | | | | | 230 | | | | | 235 | | | | | 240 |
| Gln | Asp | Trp | Leu | Asn | Gly | Lys | Glu | Tyr | Lys | Cys | Lys | Val | Ser | Asn | Lys |
| | | | | 245 | | | | | 250 | | | | | 255 | |
| Ala | Leu | Pro | Ala | Pro | Ile | Glu | Lys | Thr | Ile | Ser | Lys | Thr | Lys | Gly | Gln |
| | | | 260 | | | | | 265 | | | | | 270 | | |
| Pro | Arg | Glu | Pro | Gln | Val | Tyr | Thr | Leu | Pro | Pro | Ser | Arg | Glu | Glu | Met |
| | | 275 | | | | | 280 | | | | | 285 | | | |
| Thr | Lys | Asn | Gln | Val | Ser | Leu | Thr | Cys | Leu | Val | Lys | Gly | Phe | Tyr | Pro |
| 290 | | | | | 295 | | | | | 300 | | | | | |
| Ser | Asp | Ile | Ala | Val | Glu | Trp | Glu | Ser | Ser | Gly | Gln | Pro | Glu | Asn | Asn |
| 305 | | | | | 310 | | | | | 315 | | | | | 320 |
| Tyr | Asn | Thr | Thr | Pro | Pro | Met | Leu | Asp | Ser | Asp | Gly | Ser | Phe | Phe | Leu |
| | | | | 325 | | | | | 330 | | | | | 335 | |
| Tyr | Ser | Lys | Leu | Thr | Val | Asp | Lys | Ser | Arg | Trp | Gln | Gln | Gly | Asn | Ile |
| | | | 340 | | | | | 345 | | | | | 350 | | |
| Phe | Ser | Cys | Ser | Val | Met | His | Glu | Ala | Leu | His | Asn | Arg | Phe | Thr | Gln |
| | | 355 | | | | | 360 | | | | | 365 | | | |
| Lys | Ser | Leu | Ser | Leu | Ser | Pro | Gly | Lys |
| | 370 | | | | | 375 | | |

```
<210> SEQ ID NO 45
<211> LENGTH: 452
<212> TYPE: PRT
<213> ORGANISM: Homo sapiens

<400> SEQUENCE: 45

Gly Ser Ala Ser Ala Pro Thr Leu Phe Pro Leu Val Ser Cys Glu Asn
1               5                   10                  15

Ser Pro Ser Asp Thr Ser Ser Val Ala Val Gly Cys Leu Ala Gln Asp
                20                  25                  30

Phe Leu Pro Asp Ser Ile Thr Leu Ser Trp Lys Tyr Lys Asn Asn Ser
            35                  40                  45

Asp Ile Ser Ser Thr Arg Gly Phe Pro Ser Val Leu Arg Gly Gly Lys
50                  55                  60

Tyr Ala Ala Thr Ser Gln Val Leu Leu Pro Ser Lys Asp Val Met Gln
65                  70                  75                  80

Gly Thr Asp Glu His Val Val Cys Lys Val Gln His Pro Asn Gly Asn
                85                  90                  95

Lys Glu Lys Asn Val Pro Leu Pro Val Ile Ala Glu Leu Pro Pro Lys
            100                 105                 110

Val Ser Val Phe Val Pro Pro Arg Asp Gly Phe Phe Gly Asn Pro Arg
        115                 120                 125

Lys Ser Lys Leu Ile Cys Gln Ala Thr Gly Phe Ser Pro Arg Gln Ile
130                 135                 140

Gln Val Ser Trp Leu Arg Glu Gly Lys Gln Val Gly Ser Gly Val Thr
145                 150                 155                 160

Thr Asp Gln Val Gln Ala Glu Ala Lys Glu Ser Gly Pro Thr Thr Tyr
                165                 170                 175

Lys Val Thr Ser Thr Leu Thr Ile Lys Glu Ser Asp Trp Leu Gly Gln
            180                 185                 190

Ser Met Phe Thr Cys Arg Val Asp His Arg Gly Leu Thr Phe Gln Gln
        195                 200                 205

Asn Ala Ser Ser Met Cys Val Pro Asp Gln Asp Thr Ala Ile Arg Val
210                 215                 220

Phe Ala Ile Pro Pro Ser Phe Ala Ser Ile Phe Leu Thr Lys Ser Thr
225                 230                 235                 240

Lys Leu Thr Cys Leu Val Thr Asp Leu Thr Thr Tyr Asp Ser Val Thr
                245                 250                 255

Ile Ser Trp Thr Arg Gln Asn Gly Glu Ala Val Lys Thr His Thr Asn
            260                 265                 270

Ile Ser Glu Ser His Pro Asn Ala Thr Phe Ser Ala Val Gly Glu Ala
        275                 280                 285

Ser Ile Cys Glu Asp Asp Trp Asn Ser Gly Glu Arg Phe Thr Cys Thr
290                 295                 300

Val Thr His Thr Asp Leu Pro Ser Pro Leu Lys Gln Thr Ile Ser Arg
305                 310                 315                 320

Pro Lys Gly Val Ala Leu His Arg Pro Asp Val Tyr Leu Leu Pro Pro
                325                 330                 335

Ala Arg Glu Gln Leu Asn Leu Arg Glu Ser Ala Thr Ile Thr Cys Leu
            340                 345                 350

Val Thr Gly Phe Ser Pro Ala Asp Val Phe Val Gln Trp Met Gln Arg
        355                 360                 365

Gly Gln Pro Leu Ser Pro Glu Lys Tyr Val Thr Ser Ala Pro Met Pro
370                 375                 380
```

Glu Pro Gln Ala Pro Gly Arg Tyr Phe Ala His Ser Ile Leu Thr Val
385                 390                 395                 400

Ser Glu Glu Glu Trp Asn Thr Gly Glu Thr Tyr Thr Cys Val Ala His
            405                 410                 415

Glu Ala Leu Pro Asn Arg Val Thr Glu Arg Thr Val Asp Lys Ser Thr
            420                 425                 430

Gly Lys Pro Thr Leu Tyr Asn Val Ser Leu Val Met Ser Asp Thr Ala
            435                 440                 445

Gly Thr Cys Tyr
            450

<210> SEQ ID NO 46
<211> LENGTH: 327
<212> TYPE: PRT
<213> ORGANISM: Homo sapiens

<400> SEQUENCE: 46

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser

```
            290                 295                 300
Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 47
<211> LENGTH: 353
<212> TYPE: PRT
<213> ORGANISM: Homo sapiens

<400> SEQUENCE: 47

Ala Ser Pro Thr Ser Pro Lys Val Phe Pro Leu Ser Leu Cys Ser Thr
1               5                   10                  15

Gln Pro Asp Gly Asn Val Val Ile Ala Cys Leu Val Gln Gly Phe Phe
            20                  25                  30

Pro Gln Glu Pro Leu Ser Val Thr Trp Ser Glu Ser Gly Gln Gly Val
        35                  40                  45

Thr Ala Arg Asn Phe Pro Pro Ser Gln Asp Ala Ser Gly Asp Leu Tyr
    50                  55                  60

Thr Thr Ser Ser Gln Leu Thr Leu Pro Ala Thr Gln Cys Leu Ala Gly
65                  70                  75                  80

Lys Ser Val Thr Cys His Val Lys His Tyr Thr Asn Pro Ser Gln Asp
                85                  90                  95

Val Thr Val Pro Cys Pro Val Pro Ser Thr Pro Pro Thr Pro Ser Pro
            100                 105                 110

Ser Thr Pro Pro Thr Pro Ser Pro Ser Cys Cys His Pro Arg Leu Ser
        115                 120                 125

Leu His Arg Pro Ala Leu Glu Asp Leu Leu Leu Gly Ser Glu Ala Asn
130                 135                 140

Leu Thr Cys Thr Leu Thr Gly Leu Arg Asp Ala Ser Gly Val Thr Phe
145                 150                 155                 160

Thr Trp Thr Pro Ser Ser Gly Lys Ser Ala Val Gln Gly Pro Pro Glu
                165                 170                 175

Arg Asp Leu Cys Gly Cys Tyr Ser Val Ser Ser Val Leu Pro Gly Cys
            180                 185                 190

Ala Glu Pro Trp Asn His Gly Lys Thr Phe Thr Cys Thr Ala Ala Tyr
        195                 200                 205

Pro Glu Ser Lys Thr Pro Leu Thr Ala Thr Leu Ser Lys Ser Gly Asn
    210                 215                 220

Thr Phe Arg Pro Glu Val His Leu Leu Pro Pro Pro Ser Glu Glu Leu
225                 230                 235                 240

Ala Leu Asn Glu Leu Val Thr Leu Thr Cys Leu Ala Arg Gly Phe Ser
                245                 250                 255

Pro Lys Asp Val Leu Val Arg Trp Leu Gln Gly Ser Gln Glu Leu Pro
            260                 265                 270

Arg Glu Lys Tyr Leu Thr Trp Ala Ser Arg Gln Glu Pro Ser Gln Gly
        275                 280                 285

Thr Thr Thr Phe Ala Val Thr Ser Ile Leu Arg Val Ala Ala Glu Asp
    290                 295                 300

Trp Lys Lys Gly Asp Thr Phe Ser Cys Met Val Gly His Glu Ala Leu
305                 310                 315                 320

Pro Leu Ala Phe Thr Gln Lys Thr Ile Asp Arg Leu Ala Gly Lys Pro
                325                 330                 335
```

-continued

```
Thr His Val Asn Val Ser Val Val Met Ala Glu Val Asp Gly Thr Cys
            340             345             350
Tyr

<210> SEQ ID NO 48
<211> LENGTH: 340
<212> TYPE: PRT
<213> ORGANISM: Homo sapiens

<400> SEQUENCE: 48

Ala Ser Pro Thr Ser Pro Lys Val Phe Pro Leu Ser Leu Asp Ser Thr
1               5                   10                  15

Pro Gln Asp Gly Asn Val Val Ala Cys Leu Val Gln Gly Phe Phe
            20                  25                  30

Pro Gln Glu Pro Leu Ser Val Thr Trp Ser Glu Ser Gly Gln Asn Val
        35                  40                  45

Thr Ala Arg Asn Phe Pro Pro Ser Gln Asp Ala Ser Gly Asp Leu Tyr
    50                  55                  60

Thr Thr Ser Ser Gln Leu Thr Leu Pro Ala Thr Gln Cys Pro Asp Gly
65                  70                  75                  80

Lys Ser Val Thr Cys His Val Lys His Tyr Thr Asn Pro Ser Gln Asp
                85                  90                  95

Val Thr Val Pro Cys Pro Val Pro Pro Pro Pro Cys Cys His Pro
            100                 105                 110

Arg Leu Ser Leu His Arg Pro Ala Leu Glu Asp Leu Leu Leu Gly Ser
        115                 120                 125

Glu Ala Asn Leu Thr Cys Thr Leu Thr Gly Leu Arg Asp Ala Ser Gly
    130                 135                 140

Ala Thr Phe Thr Trp Thr Pro Ser Ser Gly Lys Ser Ala Val Gln Gly
145                 150                 155                 160

Pro Pro Glu Arg Asp Leu Cys Gly Cys Tyr Ser Val Ser Ser Val Leu
                165                 170                 175

Pro Gly Cys Ala Gln Pro Trp Asn His Gly Glu Thr Phe Thr Cys Thr
            180                 185                 190

Ala Ala His Pro Glu Leu Lys Thr Pro Leu Thr Ala Asn Ile Thr Lys
        195                 200                 205

Ser Gly Asn Thr Phe Arg Pro Glu Val His Leu Leu Pro Pro Pro Ser
    210                 215                 220

Glu Glu Leu Ala Leu Asn Glu Leu Val Thr Leu Thr Cys Leu Ala Arg
225                 230                 235                 240

Gly Phe Ser Pro Lys Asp Val Leu Val Arg Trp Leu Gln Gly Ser Gln
                245                 250                 255

Glu Leu Pro Arg Glu Lys Tyr Leu Thr Trp Ala Ser Arg Gln Glu Pro
            260                 265                 270

Ser Gln Gly Thr Thr Thr Phe Ala Val Thr Ser Ile Leu Arg Val Ala
        275                 280                 285

Ala Glu Asp Trp Lys Lys Gly Asp Thr Phe Ser Cys Met Val Gly His
    290                 295                 300

Glu Ala Leu Pro Leu Ala Phe Thr Gln Lys Thr Ile Asp Arg Met Ala
305                 310                 315                 320

Gly Lys Pro Thr His Val Asn Val Ser Val Val Met Ala Glu Val Asp
                325                 330                 335

Gly Thr Cys Tyr
            340
```

<210> SEQ ID NO 49
<211> LENGTH: 106
<212> TYPE: PRT
<213> ORGANISM: Homo sapiens

<400> SEQUENCE: 49

Thr Val Ala Ala Pro Ser Val Phe Ile Phe Pro Pro Ser Asp Glu Gln
1               5                   10                  15

Leu Lys Ser Gly Thr Ala Ser Val Val Cys Leu Leu Asn Asn Phe Tyr
            20                  25                  30

Pro Arg Glu Ala Lys Val Gln Trp Lys Val Asp Asn Ala Leu Gln Ser
        35                  40                  45

Gly Asn Ser Gln Glu Ser Val Thr Glu Gln Asp Ser Lys Asp Ser Thr
    50                  55                  60

Tyr Ser Leu Ser Ser Thr Leu Thr Leu Ser Lys Ala Asp Tyr Glu Lys
65                  70                  75                  80

His Lys Val Tyr Ala Cys Glu Val Thr His Gln Gly Leu Ser Ser Pro
                85                  90                  95

Val Thr Lys Ser Phe Asn Arg Gly Glu Cys
            100                 105

<210> SEQ ID NO 50
<211> LENGTH: 618
<212> TYPE: PRT
<213> ORGANISM: Homo sapiens

<400> SEQUENCE: 50

Met Val Ser Pro Arg Met Ser Gly Leu Leu Ser Gln Thr Val Ile Leu
1               5                   10                  15

Ala Leu Ile Phe Leu Pro Gln Thr Arg Pro Ala Gly Val Phe Glu Leu
            20                  25                  30

Gln Ile His Ser Phe Gly Pro Gly Pro Gly Ala Pro Arg Ser
        35                  40                  45

Pro Cys Ser Ala Arg Leu Pro Cys Arg Leu Phe Phe Arg Val Cys Leu
    50                  55                  60

Lys Pro Gly Leu Ser Glu Ala Ala Glu Ser Pro Cys Ala Leu Gly
65                  70                  75                  80

Ala Ala Leu Ser Ala Arg Gly Pro Val Tyr Thr Glu Gln Pro Gly Ala
                85                  90                  95

Pro Ala Pro Asp Leu Pro Leu Pro Asp Gly Leu Leu Gln Val Pro Phe
            100                 105                 110

Arg Asp Ala Trp Pro Gly Thr Phe Ser Phe Ile Ile Glu Thr Trp Arg
        115                 120                 125

Glu Glu Leu Gly Asp Gln Ile Gly Gly Pro Ala Trp Ser Leu Leu Ala
    130                 135                 140

Arg Val Ala Gly Arg Arg Arg Leu Ala Ala Gly Gly Pro Trp Ala Arg
145                 150                 155                 160

Asp Ile Gln Arg Ala Gly Ala Trp Glu Leu Arg Phe Ser Tyr Arg Ala
                165                 170                 175

Arg Cys Glu Pro Pro Ala Val Gly Thr Ala Cys Thr Arg Leu Cys Arg
            180                 185                 190

Pro Arg Ser Ala Pro Ser Arg Cys Gly Pro Gly Leu Arg Pro Cys Ala
        195                 200                 205

Pro Leu Glu Asp Glu Cys Glu Ala Pro Leu Val Cys Arg Ala Gly Cys
    210                 215                 220

-continued

```
Ser Pro Glu His Gly Phe Cys Glu Gln Pro Gly Glu Cys Arg Cys Leu
225                 230                 235                 240

Glu Gly Trp Thr Gly Pro Leu Cys Thr Val Pro Val Ser Thr Ser Ser
            245                 250                 255

Cys Leu Ser Pro Arg Gly Pro Ser Ser Ala Thr Thr Gly Cys Leu Val
        260                 265                 270

Pro Gly Pro Gly Pro Cys Asp Gly Asn Pro Cys Ala Asn Gly Gly Ser
    275                 280                 285

Cys Ser Glu Thr Pro Arg Ser Phe Glu Cys Thr Cys Pro Arg Gly Phe
290                 295                 300

Tyr Gly Leu Arg Cys Glu Val Ser Gly Val Thr Cys Ala Asp Gly Pro
305                 310                 315                 320

Cys Phe Asn Gly Gly Leu Cys Val Gly Ala Asp Pro Asp Ser Ala
                325                 330                 335

Tyr Ile Cys His Cys Pro Pro Gly Phe Gln Gly Ser Asn Cys Glu Lys
            340                 345                 350

Arg Val Asp Arg Cys Ser Leu Gln Pro Cys Arg Asn Gly Gly Leu Cys
        355                 360                 365

Leu Asp Leu Gly His Ala Leu Arg Cys Arg Cys Arg Ala Gly Phe Ala
370                 375                 380

Gly Pro Arg Cys Glu His Asp Leu Asp Asp Cys Ala Gly Arg Ala Cys
385                 390                 395                 400

Ala Asn Gly Gly Thr Cys Val Glu Gly Gly Ala His Arg Cys Ser
                405                 410                 415

Cys Ala Leu Gly Phe Gly Gly Arg Asp Cys Arg Glu Arg Ala Asp Pro
        420                 425                 430

Cys Ala Ala Arg Pro Cys Ala His Gly Gly Arg Cys Tyr Ala His Phe
    435                 440                 445

Ser Gly Leu Val Cys Ala Cys Ala Pro Gly Tyr Met Gly Ala Arg Cys
450                 455                 460

Glu Phe Pro Val His Pro Asp Gly Ala Ser Ala Leu Pro Ala Ala Pro
465                 470                 475                 480

Pro Gly Leu Arg Pro Gly Asp Pro Gln Arg Tyr Leu Pro Pro Ala
                485                 490                 495

Leu Gly Leu Leu Val Ala Ala Gly Val Ala Gly Ala Ala Leu Leu Leu
            500                 505                 510

Val His Val Arg Arg Gly His Ser Gln Asp Ala Gly Ser Arg Leu
            515                 520                 525

Leu Ala Gly Thr Pro Glu Pro Ser Val His Ala Leu Pro Asp Ala Leu
530                 535                 540

Asn Asn Leu Arg Thr Gln Glu Gly Ser Gly Asp Gly Pro Ser Ser Ser
545                 550                 555                 560

Val Asp Trp Asn Arg Pro Glu Asp Val Asp Pro Gln Gly Ile Tyr Val
            565                 570                 575

Ile Ser Ala Pro Ser Ile Tyr Ala Arg Glu Val Ala Thr Pro Leu Phe
            580                 585                 590

Pro Pro Leu His Thr Gly Arg Ala Gly Gln Arg Gln His Leu Leu Phe
            595                 600                 605

Pro Tyr Pro Ser Ser Ile Leu Ser Val Lys
            610                 615
```

<210> SEQ ID NO 51
<211> LENGTH: 587
<212> TYPE: PRT

<213> ORGANISM: Homo sapiens

<400> SEQUENCE: 51

Met Val Ser Pro Arg Met Ser Gly Leu Leu Ser Gln Thr Val Ile Leu
1               5                   10                  15

Ala Leu Ile Phe Leu Pro Gln Thr Arg Pro Ala Gly Val Phe Glu Leu
            20                  25                  30

Gln Ile His Ser Phe Gly Pro Gly Pro Gly Ala Pro Arg Ser
            35                  40                  45

Pro Cys Ser Ala Arg Leu Pro Cys Arg Leu Phe Phe Arg Val Cys Leu
        50                  55                  60

Lys Pro Gly Leu Ser Glu Glu Ala Ala Glu Ser Pro Cys Ala Leu Gly
65                  70                  75                  80

Ala Ala Leu Ser Ala Arg Gly Pro Val Tyr Thr Glu Gln Pro Gly Ala
                85                  90                  95

Pro Ala Pro Asp Leu Pro Leu Pro Asp Gly Leu Leu Gln Val Pro Phe
            100                 105                 110

Arg Asp Ala Trp Pro Gly Thr Phe Ser Phe Ile Ile Glu Thr Trp Arg
            115                 120                 125

Glu Glu Leu Gly Asp Gln Ile Gly Gly Pro Ala Trp Ser Leu Leu Ala
130                 135                 140

Arg Val Ala Gly Arg Arg Arg Leu Ala Ala Gly Gly Pro Trp Ala Arg
145                 150                 155                 160

Asp Ile Gln Arg Ala Gly Ala Trp Glu Leu Arg Phe Ser Tyr Arg Ala
                165                 170                 175

Arg Cys Glu Pro Pro Ala Val Gly Thr Ala Cys Thr Arg Leu Cys Arg
            180                 185                 190

Pro Arg Ser Ala Pro Ser Arg Cys Gly Pro Gly Leu Arg Pro Cys Ala
            195                 200                 205

Pro Leu Glu Asp Glu Cys Glu Ala Pro Leu Val Cys Arg Ala Gly Cys
    210                 215                 220

Ser Pro Glu His Gly Phe Cys Glu Gln Pro Gly Glu Cys Arg Cys Leu
225                 230                 235                 240

Glu Gly Trp Thr Gly Pro Leu Cys Thr Val Pro Val Ser Thr Ser Ser
                245                 250                 255

Cys Leu Ser Pro Arg Gly Pro Ser Ser Ala Thr Thr Gly Cys Leu Val
            260                 265                 270

Pro Gly Pro Gly Pro Cys Asp Gly Asn Pro Cys Ala Asn Gly Gly Ser
            275                 280                 285

Cys Ser Glu Thr Pro Arg Ser Phe Glu Cys Thr Cys Pro Arg Gly Phe
    290                 295                 300

Tyr Gly Leu Arg Cys Glu Val Ser Gly Val Thr Cys Ala Asp Gly Pro
305                 310                 315                 320

Cys Phe Asn Gly Gly Leu Cys Val Gly Ala Asp Pro Asp Ser Ala
                325                 330                 335

Tyr Ile Cys His Cys Pro Pro Gly Phe Gln Gly Ser Asn Cys Glu Lys
            340                 345                 350

Arg Val Asp Arg Cys Ser Leu Gln Pro Cys Arg Asn Gly Gly Leu Cys
            355                 360                 365

Leu Asp Leu Gly His Ala Leu Arg Cys Arg Cys Arg Ala Gly Phe Ala
    370                 375                 380

Gly Pro Arg Cys Glu His Asp Leu Asp Asp Cys Ala Gly Arg Ala Cys
385                 390                 395                 400

-continued

```
Ala Asn Gly Gly Thr Cys Val Glu Gly Gly Ala His Arg Cys Ser
            405                 410                 415

Cys Ala Leu Gly Phe Gly Gly Arg Asp Cys Arg Glu Arg Ala Asp Pro
        420                 425                 430

Cys Ala Ala Arg Pro Cys Ala His Gly Gly Arg Cys Tyr Ala His Phe
            435                 440                 445

Ser Gly Leu Val Cys Ala Cys Ala Pro Gly Tyr Met Gly Ala Arg Cys
    450                 455                 460

Glu Phe Pro Val His Pro Asp Gly Ala Ser Ala Leu Pro Ala Ala Pro
465                 470                 475                 480

Pro Gly Leu Arg Pro Gly Asp Pro Gln Arg Tyr Leu Leu Pro Pro Ala
                485                 490                 495

Leu Gly Leu Leu Val Ala Ala Gly Val Ala Gly Ala Ala Leu Leu Leu
                500                 505                 510

Val His Val Arg Arg Arg Gly His Ser Gln Asp Ala Gly Ser Arg Leu
            515                 520                 525

Leu Ala Gly Thr Pro Glu Pro Ser Val His Ala Leu Pro Asp Ala Leu
        530                 535                 540

Asn Asn Leu Arg Thr Gln Glu Gly Ser Gly Asp Gly Pro Ser Ser Ser
545                 550                 555                 560

Val Asp Trp Asn Arg Pro Glu Asp Val Asp Pro Gln Gly Ile Tyr Val
                565                 570                 575

Ile Ser Ala Pro Ser Ile Tyr Ala Arg Glu Ala
                580                 585

<210> SEQ ID NO 52
<211> LENGTH: 587
<212> TYPE: PRT
<213> ORGANISM: Pan troglodytes

<400> SEQUENCE: 52

Met Val Ser Pro Arg Met Ser Arg Leu Leu Ser Gln Thr Val Ile Leu
1               5                   10                  15

Ala Leu Ile Phe Leu Pro Gln Thr Arg Pro Ala Gly Val Phe Glu Leu
            20                  25                  30

Gln Ile His Ser Phe Gly Pro Gly Pro Gly Ala Pro Arg Ser
        35                  40                  45

Pro Cys Ser Ala Arg Val Pro Cys Arg Leu Phe Phe Arg Val Cys Leu
    50                  55                  60

Lys Pro Gly Leu Ser Glu Glu Ala Ala Glu Ser Pro Cys Ala Leu Gly
65                  70                  75                  80

Ala Ala Leu Ser Ala Arg Gly Pro Val Tyr Thr Glu Gln Pro Gly Ala
                85                  90                  95

Pro Ala Pro Asp Leu Pro Leu Pro Asp Gly Leu Leu Gln Val Pro Phe
            100                 105                 110

Arg Asp Ala Trp Pro Gly Thr Phe Ser Phe Ile Ile Glu Thr Trp Arg
        115                 120                 125

Glu Glu Leu Gly Asp Gln Ile Gly Gly Pro Ala Trp Ser Leu Leu Ala
    130                 135                 140

Arg Val Ala Gly Arg Arg Leu Ala Ala Gly Gly Thr Trp Ala Arg
145                 150                 155                 160

Asp Ile Gln Arg Ala Gly Ala Trp Glu Leu Arg Phe Ser Tyr Arg Ala
                165                 170                 175

Arg Cys Glu Pro Pro Ala Val Gly Thr Ala Cys Thr Arg Leu Cys Arg
            180                 185                 190
```

Pro Arg Ser Ala Pro Ser Arg Cys Gly Pro Gly Leu Arg Pro Cys Ala
    195                 200                 205

Pro Leu Glu Asp Glu Cys Glu Ala Pro Val Cys Arg Ala Gly Cys
210                 215                 220

Ser Pro Glu His Gly Phe Cys Glu Gln Pro Gly Glu Cys Arg Cys Leu
225                 230                 235                 240

Glu Gly Trp Thr Gly Pro Leu Cys Thr Val Pro Val Ser Thr Ser Ser
                245                 250                 255

Cys Leu Ser Pro Arg Gly Pro Ser Ser Ala Thr Thr Gly Cys Leu Val
            260                 265                 270

Pro Gly Pro Gly Pro Cys Asp Gly Asn Pro Cys Ala Asn Gly Gly Ser
        275                 280                 285

Cys Ser Glu Thr Pro Gly Ser Phe Glu Cys Ala Cys Pro Arg Gly Phe
    290                 295                 300

Tyr Gly Leu Arg Cys Glu Val Ser Gly Val Thr Cys Ala Asp Gly Pro
305                 310                 315                 320

Cys Phe Asn Gly Gly Leu Cys Val Gly Gly Ala Asp Pro Asp Ser Ala
                325                 330                 335

Tyr Ile Cys His Cys Pro Pro Gly Phe Gln Gly Ser Asn Cys Glu Lys
            340                 345                 350

Arg Val Asp Arg Cys Ser Leu Gln Pro Cys Arg Asn Gly Gly Leu Cys
        355                 360                 365

Leu Asp Leu Gly His Ala Leu Arg Cys Arg Cys Arg Ala Gly Phe Ala
    370                 375                 380

Gly Pro Arg Cys Glu His Asp Leu Asp Cys Ala Gly Arg Ala Cys
385                 390                 395                 400

Ala Asn Gly Gly Thr Cys Val Glu Gly Gly Ala His Arg Cys Ser
                405                 410                 415

Cys Ala Leu Gly Phe Gly Gly Arg Asp Cys Arg Glu Arg Ala Asp Pro
            420                 425                 430

Cys Ala Ala Arg Pro Cys Ala His Gly Gly Arg Cys Tyr Ala His Phe
        435                 440                 445

Ser Gly Leu Val Cys Ala Cys Ala Pro Gly Tyr Met Gly Ala Arg Cys
    450                 455                 460

Glu Phe Pro Val His Pro Asp Gly Ala Ser Ala Leu Pro Ala Ala Pro
465                 470                 475                 480

Pro Gly Leu Arg Pro Gly Asp Pro Gln Arg Tyr Leu Pro Pro Ala
                485                 490                 495

Leu Gly Leu Leu Val Ala Ala Gly Val Ala Gly Ala Ala Leu Leu Leu
            500                 505                 510

Val His Val Arg Arg Gly His Ala Gln Asp Ala Gly Ala Arg Leu
        515                 520                 525

Leu Ala Gly Thr Pro Glu Pro Ser Val His Ala Leu Pro Asp Ala Leu
    530                 535                 540

Asn Asn Leu Arg Thr Gln Glu Gly Ala Gly Asp Gly Pro Ser Ser Ser
545                 550                 555                 560

Val Asp Trp Asn Arg Pro Glu Asp Val Asp Pro Arg Gly Ile Tyr Val
                565                 570                 575

Ile Ser Ala Pro Ser Ile Tyr Ala Arg Glu Ala
            580                 585

<210> SEQ ID NO 53
<211> LENGTH: 585

<212> TYPE: PRT
<213> ORGANISM: Mus musculus

<400> SEQUENCE: 53

```
Met Val Ser Leu Gln Val Ser Pro Leu Ser Gln Thr Leu Ile Leu Ala
1               5                   10                  15

Phe Leu Leu Pro Gln Ala Leu Pro Ala Gly Val Phe Glu Leu Gln Ile
            20                  25                  30

His Ser Phe Gly Pro Gly Pro Gly Leu Gly Thr Pro Arg Ser Pro Cys
        35                  40                  45

Asn Ala Arg Gly Pro Cys Arg Leu Phe Phe Arg Val Cys Leu Lys Pro
    50                  55                  60

Gly Val Ser Gln Glu Ala Thr Glu Ser Leu Cys Ala Leu Gly Ala Ala
65                  70                  75                  80

Leu Ser Thr Ser Val Pro Val Tyr Thr Glu His Pro Gly Glu Ser Ala
                85                  90                  95

Ala Ala Leu Pro Leu Pro Asp Gly Leu Val Arg Val Pro Phe Arg Asp
            100                 105                 110

Ala Trp Pro Gly Thr Phe Ser Leu Val Ile Glu Thr Trp Arg Glu Gln
        115                 120                 125

Leu Gly Glu His Ala Gly Gly Pro Ala Trp Asn Leu Leu Ala Arg Val
    130                 135                 140

Val Gly Arg Arg Leu Ala Ala Gly Gly Pro Trp Ala Arg Asp Val
145                 150                 155                 160

Gln Arg Thr Gly Thr Trp Glu Leu His Phe Ser Tyr Arg Ala Arg Cys
                165                 170                 175

Glu Pro Pro Ala Val Gly Ala Ala Cys Ala Arg Leu Cys Arg Ser Arg
            180                 185                 190

Ser Ala Pro Ser Arg Cys Gly Pro Gly Leu Arg Pro Cys Thr Pro Phe
        195                 200                 205

Pro Asp Glu Cys Glu Ala Pro Ser Val Cys Arg Pro Gly Cys Ser Pro
    210                 215                 220

Glu His Gly Tyr Cys Glu Glu Pro Asp Glu Cys Arg Cys Leu Glu Gly
225                 230                 235                 240

Trp Thr Gly Pro Leu Cys Thr Val Pro Val Ser Thr Ser Ser Cys Leu
                245                 250                 255

Asn Ser Arg Val Pro Gly Pro Ala Ser Thr Gly Cys Leu Leu Pro Gly
            260                 265                 270

Pro Gly Pro Cys Asp Gly Asn Pro Cys Ala Asn Gly Gly Ser Cys Ser
        275                 280                 285

Glu Thr Ser Gly Ser Phe Glu Cys Ala Cys Pro Arg Gly Phe Tyr Gly
    290                 295                 300

Leu Arg Cys Glu Val Ser Gly Val Thr Cys Ala Asp Gly Pro Cys Phe
305                 310                 315                 320

Asn Gly Gly Leu Cys Val Gly Gly Glu Asp Pro Asp Ser Ala Tyr Val
                325                 330                 335

Cys His Cys Pro Pro Gly Phe Gln Gly Ser Asn Cys Glu Lys Arg Val
            340                 345                 350

Asp Arg Cys Ser Leu Gln Pro Cys Gln Asn Gly Gly Leu Cys Leu Asp
        355                 360                 365

Leu Gly His Ala Leu Arg Cys Arg Cys Arg Ala Gly Phe Ala Gly Pro
    370                 375                 380

Arg Cys Glu His Asp Leu Asp Asp Cys Ala Gly Arg Ala Cys Ala Asn
385                 390                 395                 400
```

```
Gly Gly Thr Cys Val Glu Gly Gly Ser Arg Arg Cys Ser Cys Ala
            405                 410                 415

Leu Gly Phe Gly Gly Arg Asp Cys Arg Glu Arg Ala Asp Pro Cys Ala
            420                 425                 430

Ser Arg Pro Cys Ala His Gly Gly Arg Cys Tyr Ala His Phe Ser Gly
            435                 440                 445

Leu Val Cys Ala Cys Ala Pro Gly Tyr Met Gly Val Arg Cys Glu Phe
450                 455                 460

Ala Val Arg Pro Asp Gly Ala Asp Ala Val Pro Ala Ala Pro Arg Gly
465                 470                 475                 480

Leu Arg Gln Ala Asp Pro Gln Arg Phe Leu Leu Pro Pro Ala Leu Gly
            485                 490                 495

Leu Leu Val Ala Ala Gly Leu Ala Gly Ala Ala Leu Leu Val Ile His
            500                 505                 510

Val Arg Arg Arg Gly Pro Gly Gln Asp Thr Gly Thr Arg Leu Leu Ser
            515                 520                 525

Gly Thr Arg Glu Pro Ser Val His Thr Leu Pro Asp Ala Leu Asn Asn
            530                 535                 540

Leu Arg Leu Gln Asp Gly Ala Gly Asp Gly Pro Ser Ser Ser Ala Asp
545                 550                 555                 560

Trp Asn His Pro Glu Asp Gly Asp Ser Arg Ser Ile Tyr Val Ile Pro
            565                 570                 575

Ala Pro Ser Ile Tyr Ala Arg Glu Ala
            580                 585

<210> SEQ ID NO 54
<211> LENGTH: 589
<212> TYPE: PRT
<213> ORGANISM: Rattus norvegicus

<400> SEQUENCE: 54

Met Val Ser Leu Gln Val Ser Ser Leu Pro Gln Thr Leu Ile Leu Ala
1               5                   10                  15

Phe Leu Leu Pro Gln Ala Leu Pro Ala Gly Val Phe Glu Leu Gln Ile
            20                  25                  30

His Ser Phe Gly Pro Gly Pro Gly Thr Pro Arg Ser Pro Cys
            35                  40                  45

Asn Ala Arg Gly Pro Cys Arg Leu Phe Phe Arg Val Cys Leu Lys Pro
50                  55                  60

Gly Val Ser Gln Glu Ala Ala Glu Ser Leu Cys Ala Leu Gly Ala Ala
65                  70                  75                  80

Leu Ser Thr Ser Gly Pro Val Tyr Thr Glu Gln Pro Gly Val Pro Ala
            85                  90                  95

Ala Ala Leu Ser Leu Pro Asp Gly Leu Val Arg Val Pro Phe Leu Asp
            100                 105                 110

Ala Trp Pro Gly Thr Phe Ser Leu Ile Ile Glu Thr Trp Arg Glu Gln
            115                 120                 125

Leu Gly Glu Arg Ala Ala Gly Pro Ala Trp Asn Leu Leu Ala Arg Val
            130                 135                 140

Ala Gly Arg Arg Arg Leu Ala Ala Gly Ala Pro Trp Ala Arg Asp Val
145                 150                 155                 160

Gln Arg Thr Gly Ala Trp Glu Leu His Phe Ser Tyr Arg Ala Arg Cys
            165                 170                 175

Glu Pro Pro Ala Val Gly Ala Ala Cys Ala Arg Leu Cys Arg Ser Arg
```

```
                180             185             190
Ser Ala Pro Ser Arg Cys Gly Pro Gly Leu Arg Pro Cys Thr Pro Phe
            195             200             205

Pro Asp Glu Cys Glu Ala Pro Arg Glu Ser Leu Thr Val Cys Arg Ala
            210             215             220

Gly Cys Ser Pro Glu His Gly Tyr Cys Glu Pro Asp Glu Cys His
225             230             235             240

Cys Leu Glu Gly Trp Thr Gly Pro Leu Cys Thr Val Pro Val Ser Thr
            245             250             255

Ser Ser Cys Leu Asn Ser Arg Val Ser Gly Pro Ala Gly Thr Gly Cys
            260             265             270

Leu Leu Pro Gly Pro Gly Pro Cys Asp Gly Asn Pro Cys Ala Asn Gly
            275             280             285

Gly Ser Cys Ser Glu Thr Pro Gly Ser Phe Glu Cys Ala Cys Pro Arg
            290             295             300

Gly Phe Tyr Gly Pro Arg Cys Glu Val Ser Gly Val Thr Cys Ala Asp
305             310             315             320

Gly Pro Cys Phe Asn Gly Gly Leu Cys Val Gly Gly Glu Asp Pro Asp
            325             330             335

Ser Ala Tyr Val Cys His Cys Pro Pro Ala Phe Gln Gly Ser Asn Cys
            340             345             350

Glu Arg Arg Val Asp Arg Cys Ser Leu Gln Pro Cys Gln Asn Gly Gly
            355             360             365

Leu Cys Leu Asp Leu Gly His Ala Leu Arg Cys Arg Cys Arg Ala Gly
            370             375             380

Phe Ala Gly Pro Arg Cys Glu His Asp Leu Asp Asp Cys Ala Gly Arg
385             390             395             400

Ala Cys Ala Asn Gly Gly Thr Cys Val Glu Gly Gly Ala Arg Arg
            405             410             415

Cys Ser Cys Ala Leu Gly Phe Gly Gly Arg Asp Cys Arg Glu Arg Ala
            420             425             430

Asp Pro Cys Ala Ser Arg Pro Cys Ala His Gly Gly Arg Cys Tyr Ala
            435             440             445

His Phe Ser Gly Leu Val Cys Ala Cys Ala Pro Gly Tyr Met Gly Val
            450             455             460

Arg Cys Glu Phe Ala Val Arg Pro Asp Gly Ala Asp Ala Val Pro Ala
465             470             475             480

Ala Pro Arg Gly Leu Arg Gln Ala Asp Ser Gln Arg Phe Leu Leu Pro
            485             490             495

Pro Ala Leu Gly Leu Leu Ala Ala Ala Ala Leu Ala Gly Ala Ala Leu
            500             505             510

Leu Leu Ile His Val Arg Arg Arg Gly Pro Gly Arg Asp Thr Gly Thr
            515             520             525

Arg Leu Leu Ser Gly Thr Arg Glu Pro Ser Val His Thr Leu Pro Asp
            530             535             540

Ala Leu Asn Asn Leu Arg Leu Gln Asp Gly Ala Gly Asp Gly Pro Thr
545             550             555             560

Ser Ser Ala Asp Trp Asn His Pro Glu Asp Gly Asp Ser Arg Ser Ile
            565             570             575

Tyr Val Ile Pro Ala Pro Ser Ile Tyr Ala Arg Glu Ala
            580             585

<210> SEQ ID NO 55
```

```
<211> LENGTH: 2341
<212> TYPE: DNA
<213> ORGANISM: Homo sapiens

<400> SEQUENCE: 55
actcccgaga ccccccacc agaaggccat ggtctcccca cggatgtccg ggctcctctc      60
ccagactgtg atcctagcgc tcattttcct ccccagaca cggcccgctg cgtcttcga      120 gctgcagatc cactctttcg ggccgggtcc aggccctggg gccccgcggt ccccctgcag    180
cgcccggctc ccctgccgcc tcttcttcag agtctgcctg aagcctgggc tctcagagga   240
ggccgccgag tccccgtgcg ccctgggcgc ggcgctgagt gcgcgcggac cggtctacac   300
cgagcagccc ggagcgcccg cgcctgatct cccactgccc gacggcctct tgcaggtgcc   360
cttccgggac gcctggcctg gcaccttctc tttcatcatc gaaacctgga gagaggagtt   420
aggagaccag attggagggc cgcctggag cctgctggcg cgcgtggctg gcaggcggcg    480
cttggcagcc ggaggccgt gggcccggga cattcagcgc gcaggcgcct gggagctgcg    540
cttctcgtac cgcgcgcgct gcgagccgcc tgccgtcggg accgcgtgca cgcgcctctg    600
ccgtccgcgc agcgccccct cgcggtgcgg tccgggactg cgcccctgcg caccgctcga   660
ggacgaatgt gaggcgccgc tggtgtgccg agcaggctgc agcctgagc atggcttctg     720 tgaacagccc ggtgaatgcc gatgcctaga gggctggact ggaccctct gcacggtccc    780 tgtctccacc agcagctgcc tcagcccag ggcccgtcc tctgctacca ccggatgcct     840
tgtccctggg cctgggccct gtgacgggaa cccgtgtgcc aatggaggca gctgtagtga   900
gacacccagg tcctttgaat gcacctgccc gcgtgggttc tacgggctgc ggtgtgaggt   960
gagcggggtg acatgtgcag atggaccctg cttcaacggc ggcttgtgtg tcggggtgc   1020 agaccctgac tctgcctaca tctgccactg cccacccggt ttccaaggct ccaactgtga  1080
gaagagggtg gaccggtgca gcctgcagcc atgccgcaat ggcggactct gcctggacct  1140
gggccacgcc ctgcgctgcc gctgccgcgc cggcttcgcg gtcctcgct gcgagcacga   1200 cctggacgac tgcgcgggcc gcgcctgcgc taacggcggc acgtgtgtgg agggcggcgg  1260
cgcgcaccgc tgctcctgcg cgctgggctt cggcggccgc gactgccgcg agcgcgcgga  1320
cccgtgcgcc gcgcgcccct gtgctcacgg cggccgctgc tacgcccact tctccggcct  1380
cgtctgcgct tgcgctcccg gctacatggg agcgcggtgt gagttcccag tgcaccccga  1440
cggcgcaagc gccttgcccg cggccccgcc gggcctcagg cccggggacc ctcagcgcta  1500
ccttttgcct ccggctctgg gactgctcgt ggccgcgggc gtggccggcg ctgcgctctt  1560
gctggtccac gtgcgccgcc gtggccactc ccaggatgct gggtctcgct tgctggctgg  1620
gaccccggag ccgtcagtcc acgcactccc ggatgcactc aacaacctaa ggacgcagga  1680
gggttccggg gatggtccga gctcgtccgt agattggaat cgccctgaag atgtagaccc  1740
tcaagggatt tatgtcatat ctgctccttc catctacgct cggaggtag cgacgccct    1800 tttccccccg ctacacactg ggcgcgctgg gcagaggcag cacctgcttt ttccctaccc  1860
ttcctcgatt ctgtccgtga aatgaattgg gtagagtctc tggaaggttt taagcccatt  1920
ttcagttcta acttactttc atcctatttt gcatccctct tatcgttttg agctacctgc  1980
catcttctct ttgaaaaacc tatgggcttg aggaggtcac gatgccgact ccgccagagc  2040
ttttccactg attgtactca gcggggaggc aggggaggca gagggcagc ctctctaatg   2100 cttcctactc attttgtttc taggcctgac gcgtctcctc catccgcacc tggagtcaga  2160
gcgtggattt ttgtatttgc tcggtggtgc ccagtctctg ccccagaggc tttggagttc  2220
```

-continued

| | |
|---|---|
| aatcttgaag gggtgtctgg gggaacttta ctgttgcaag ttgtaaataa tggttattta | 2280 |
| tatcctattt tttctcaccc catctctcta gaaacaccta taaaggctat tattgtgatc | 2340 |
| a | 2341 |

<210> SEQ ID NO 56
<211> LENGTH: 2004
<212> TYPE: DNA
<213> ORGANISM: Homo sapiens

<400> SEQUENCE: 56

| | |
|---|---|
| actcccgaga ccccccacc agaaggccat ggtctcccca cggatgtccg ggctcctctc | 60 |
| ccagactgtg atcctagcgc tcattttcct ccccagaca cggcccgctg cgtcttcga | 120 |
| gctgcagatc cactctttcg ggccgggtcc aggccctggg gccccgcggt cccctgcag | 180 |
| cgcccggctc cctgccgcc tcttcttcag agtctgcctg aagcctgggc tctcagagga | 240 |
| ggccgccgag tccccgtgcg ccctgggcgc ggcgctgagt gcgcgcggac cggtctacac | 300 |
| cgagcagccc ggagcgcccg cgcctgatct cccactgccc gacggcctct gcaggtgcc | 360 |
| cttccgggac gcctggcctg gcaccttctc tttcatcatc gaaacctgga gagaggagtt | 420 |
| aggagaccag attggagggc cgcctggag cctgctggcg cgcgtggctg caggcggcg | 480 |
| cttggcagcc ggaggcccgt gggcccggga cattcagcgc gcaggcgcct gggagctgcg | 540 |
| cttctcgtac cgcgcgcgct gcgagccgcc tgccgtcggg accgcgtgca cgcgcctctg | 600 |
| ccgtccgcgc agcgccccct cgcggtgcgg tccgggactg cgcccctgcg caccgctcga | 660 |
| ggacgaatgt gaggcgccgc tggtgtgccg agcaggctgc agccctgagc atggcttctg | 720 |
| tgaacagccc ggtgaatgcc gatgcctaga gggctggact ggaccctct gcacggtccc | 780 |
| tgtctccacc agcagctgcc tcagcccag gggcccgtcc tctgctacca ccggatgcct | 840 |
| tgtccctggg cctgggccct gtgacgggaa cccgtgtgcc aatggaggca gctgtagtga | 900 |
| gacacccagg tcctttgaat gcacctgccc gcgtgggttc tacgggctgc ggtgtgaggt | 960 |
| gagcggggtg acatgtgcag atggaccctg cttcaacggc ggcttgtgtg tcggggtgc | 1020 |
| agaccctgac tctgcctaca tctgccactg cccaccggt ttccaaggct ccaactgtga | 1080 |
| gaagagggtg gaccggtgca gcctgcagcc atgccgcaat ggcggactct gcctggacct | 1140 |
| gggccacgcc ctgcgctgcc gctgccgcgc cggcttcgcg gtcctcgct gcgagcacga | 1200 |
| cctggacgac tgcgcgggcc gcgcctgcgc taacggcggc acgtgtgtgg agggcggcgg | 1260 |
| cgcgcaccgc tgctcctgcg cgctgggctt cggcggccgc gactgccgcg agcgcgcgga | 1320 |
| cccgtgcgcc gcgcgcccct gtgctcacgg cggccgctgc tacgcccact tctccggcct | 1380 |
| cgtctgcgct tgcgctcccg gctacatggg agcgcggtgt gagttccag tgcacccga | 1440 |
| cggcgcaagc gccttgcccg cggccccgcc gggcctcagg cccggggacc ctcagcgcta | 1500 |
| ccttttgcct ccggctctgg gactgctcgt ggccgcgggc gtggccggcg ctgcgctctt | 1560 |
| gctggtccac gtgcgccgcc gtggccactc ccaggatgct gggtctcgct tgctggctgg | 1620 |
| gaccccggag ccgtcagtcc acgcactccc ggatgcactc aacaacctaa ggacgcagga | 1680 |
| gggttccggg gatggtccga gctcgtccgt agattggaat cgcccctgaag atgtagaccc | 1740 |
| tcaagggatt tatgtcatat ctgctccttc catctacgct cgggaggcct gacgcgtctc | 1800 |
| ctccatccgc acctggagtc agagcgtgga ttttttgtatt tgctcggtgg tgcccagtct | 1860 |
| ctgccccaga ggctttggag ttcaatcttg aaggggtgtc tggggggaact ttactgttgc | 1920 |

```
aagttgtaaa taatggttat ttatatccta tttttctca ccccatctct ctagaaacac    1980
ctataaaggc tattattgtg atca                                          2004
```

<210> SEQ ID NO 57
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 57

```
Gly Gly Gly Gly Ser
1               5
```

<210> SEQ ID NO 58
<211> LENGTH: 75
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (1)..(75)
<223> OTHER INFORMATION: This sequence may encompass 1-15 "Gly Gly Gly
      Gly Ser" repeating units
<220> FEATURE:
<223> OTHER INFORMATION: See specification as filed for detailed
      description of substitutions and preferred embodiments

<400> SEQUENCE: 58

```
Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly
        35                  40                  45

Gly Ser Gly Gly Gly Gly Ser Gly Gly Gly Gly Ser Gly Gly Gly Gly
    50                  55                  60

Ser Gly Gly Gly Gly Ser Gly Gly Gly Ser
65                  70                  75
```

<210> SEQ ID NO 59
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 59

```
His His His His His His
1               5
```

DLL3-TARGETING ANTIBODIES AND USES THEREOF

CROSS-REFERENCE TO RELATED APPLICATIONS

This application is a U.S. National Stage Application under 35 U.S.C. § 371 of International Patent Application No. PCT/US2020/041282, filed on Jul. 8, 2020, which claims the benefit of and priority to U.S. Provisional Patent Application No. 62/872,915, filed Jul. 11, 2019, the entire contents of which are incorporated herein by reference.

STATEMENT OF GOVERNMENT SUPPORT

This invention was made with government support under CA213448, awarded by the National Institutes of Health. The government has certain rights in the invention.

TECHNICAL FIELD

The present technology relates generally to the preparation of immunoglobulin-related compositions (e.g., antibodies or antigen binding fragments thereof) that specifically bind delta-like protein 3 (DLL3) and uses of the same. In particular, the present technology relates to the preparation of DLL3 binding antibodies and their use in detecting and treating DLL3 associated cancers, including small cell lung carcinoma (SCLC), extrapulmonary neuroendocrine cancers, and large cell neuroendocrine carcinoma (LCNEC).

SEQUENCE LISTING

The instant application contains a Sequence Listing which has been submitted electronically in ASCII format and is hereby incorporated by reference in its entirety. Said ASCII copy, created on Jul. 31, 2020, is named 115872-0910_SL.txt and is 78,665 bytes in size.

BACKGROUND

The following description of the background of the present technology is provided simply as an aid in understanding the present technology and is not admitted to describe or constitute prior art to the present technology.

Neuroendocrine tumors of the lung (Lu-NETs) embrace a heterogeneous family of neoplasms classified into four histological variants, namely typical carcinoid (TC), atypical carcinoid (AC), large cell neuroendocrine carcinoma (LCNEC) and small cell lung carcinoma (SCLC). Both SCLC and pulmonary LCNEC are high-grade and poor-prognosis tumors, with higher incidence in smokers. Pulmonary LCNEC exhibits biologically aggressive behavior, similarly to SCLC. Stage by stage, survival curves of pulmonary LCNEC and SCLC overlap, and in addition, survival is lower than other NSCLCs. Prognosis is poor even in patients with potentially resectable stage I lung cancer with 5-year survival rates ranging from 27% to 67%. See Iyoda A. et al., *J Thorac Cardiovasc Surg.* 138:446-453 (2009).

SUMMARY OF THE PRESENT TECHNOLOGY

In one aspect, the present disclosure provides an antibody or antigen binding fragment thereof comprising a heavy chain immunoglobulin variable domain ($V_H$) and a light chain immunoglobulin variable domain ($V_L$), wherein (a) the $V_H$ comprises a $V_H$-CDR1 sequence, a $V_H$-CDR2 sequence, and a $V_H$-CDR3 sequence selected from the group consisting of (i) SEQ ID NO: 3, SEQ ID NO: 4, and SEQ ID NO: 5, respectively; (ii) SEQ ID NO: 13, SEQ ID NO: 14, and SEQ ID NO: 15, respectively; (iii) SEQ ID NO: 23, SEQ ID NO: 24, and SEQ ID NO: 25, respectively; and (iv) SEQ ID NO: 33, SEQ ID NO: 34, and SEQ ID NO: 35, respectively; and/or (b) the $V_L$ comprises a $V_L$-CDR1 sequence, a $V_L$-CDR2 sequence, and a $V_L$-CDR3 sequence selected from the group consisting of (i) SEQ ID NO: 8, SEQ ID NO: 9, and SEQ ID NO: 10, respectively; (ii) SEQ ID NO: 18, SEQ ID NO: 19, and SEQ ID NO: 20, respectively; (iii) SEQ ID NO: 28, SEQ ID NO: 29, and SEQ ID NO: 30, respectively; and (iv) SEQ ID NO: 38, SEQ ID NO: 39, and SEQ ID NO: 40, respectively. In certain embodiments, the antibody or antigen binding fragment includes one or more of the following characteristics: (a) a light chain immunoglobulin variable domain sequence that is at least 80%, at least 85%, at least 90%, at least 95%, or at least 99% identical to the light chain immunoglobulin variable domain sequence present in any one of SEQ ID NOs: 7, 17, 27, or 37; and/or (b) a heavy chain immunoglobulin variable domain sequence that is at least 80%, at least 85%, at least 90%, at least 95%, or at least 99% identical to the heavy chain immunoglobulin variable domain sequence present in any one of SEQ ID NOs: 2, 12, 22, or 32.

In another aspect, the present disclosure provides an antibody or antigen binding fragment thereof comprising a heavy chain immunoglobulin variable domain ($V_H$) and a light chain immunoglobulin variable domain ($V_L$), wherein: (a) the $V_H$ comprises an amino acid sequence selected from the group consisting of SEQ ID NO: 2, SEQ ID NO: 12, SEQ ID NO: 22, and SEQ ID NO: 32; and/or (b) the $V_L$ comprises an amino acid sequence selected from the group consisting of SEQ ID NO: 7, SEQ ID NO: 17, SEQ ID NO: 27, and SEQ ID NO: 37. In some embodiments of the antibody or antigen binding fragment, the $V_H$ amino acid sequence and the $V_L$ amino acid sequence is selected from the group consisting of: SEQ ID NO: 2 and SEQ ID NO: 7 (7-I1-B), respectively; SEQ ID NO: 12 and SEQ ID NO: 17 (2-C8-A), respectively; SEQ ID NO: 22 and SEQ ID NO: 27 (10-O18-A), respectively; and SEQ ID NO: 32 and SEQ ID NO: 37 (6-G23-F), respectively.

Additionally or alternatively, in certain embodiments, the antibody or antigen binding fragment of the present technology binds to an epitope present in a mammalian DLL3 polypeptide. The epitope may be a conformational epitope or a non-conformational epitope. Additionally or alternatively, in some embodiments, the mammalian DLL3 polypeptide comprises an amino acid sequence selected from the group consisting of SEQ ID NO: 50, SEQ ID NO: 51, SEQ ID NO: 52, SEQ ID NO: 53, and SEQ ID NO: 54. In some embodiments, the mammalian DLL3 polypeptide has an amino acid sequence comprising amino acid residues 27-492 of SEQ ID NO: 50 or SEQ ID NO: 51 (e.g., the mammalian DLL3 polypeptide may include the extracellular domain of human DLL3). Additionally, or alternatively, in some embodiments, the antibody or antigen binding fragment undergoes intracellular internalization when the antibody or antigen binding fragment bound to a DLL3 polypeptide expressed on a cell surface (e.g., a tumor cell surface).

Additionally, or alternatively, in any of the embodiments disclosed herein, the antibody or antigen binding fragment further comprises a Fc domain of an isotype selected from the group consisting of IgG1, IgG2, IgG3, IgG4, IgA1, IgA2, IgM, IgD, and IgE. Additionally, or alternatively, in any of the embodiments disclosed herein, the antigen binding fragment thereof is selected from the group consisting of Fab, F(ab')2, Fab', scF$_v$, and F$_v$. Additionally, or alternatively, in some embodiments, the antibody or antigen binding fragment of the present technology is a monoclonal antibody, a chimeric antibody, a humanized antibody, or a bispecific antibody.

In one aspect, the present disclosure provides a recombinant nucleic acid sequence encoding any of the antibodies or antigen binding fragments described herein. In some embodiments, the recombinant nucleic acid sequence is selected from the group consisting of: SEQ ID NOs: 1, 6, 11, 16, 21, 26, 31, and 36.

In another aspect, the present disclosure provides a host cell or vector comprising any of the recombinant nucleic acid sequences disclosed herein.

In one aspect, the present disclosure provides a composition comprising the antibody or antigen binding fragment of the present technology and a pharmaceutically-acceptable carrier, wherein the antibody or antigen binding fragment is optionally conjugated to an agent selected from the group consisting of isotopes, dyes, chromagens, contrast agents, drugs, toxins, cytokines, enzymes, enzyme inhibitors, hormones, hormone antagonists, growth factors, radionuclides, metals, liposomes, nanoparticles, RNA, DNA or any combination thereof.

In one aspect, the present disclosure provides a method for treating a DLL3-associated cancer in a subject in need thereof, comprising administering to the subject a therapeutically effective amount of an antibody or antigen binding fragment of the present technology, wherein the antibody or antigen binding fragment is conjugated to at least one additional therapeutic agent. Examples of such additional therapeutic agents include, but are not limited to, isotopes, drugs, toxins, cytokines, enzymes, enzyme inhibitors, hormones, hormone antagonists, growth factors, radionuclides, metals, liposomes, nanoparticles, RNA, DNA or any combination thereof. The DLL3-associated cancer may be small-cell lung cancer, large cell neuroendocrine carcinoma, pulmonary neuroendocrine cancer, extrapulmonary neuroendocrine cancers, or melanoma.

In another aspect, the present disclosure provides a method for detecting DLL3 protein expression levels in a biological sample comprising contacting the biological sample with an antibody or antigen binding fragment described herein, wherein the antibody or antigen binding fragment is conjugated to a detectable label; and detecting the signal generated by the detectable label in the biological sample.

Also disclosed herein are kits for the detection and/or treatment of DLL3-associated cancers comprising at least one immunoglobulin-related composition of the present technology (e.g., any antibody or antigen binding fragment described herein), or a functional variant (e.g., substitutional variant) thereof and instructions for use. In certain embodiments, the immunoglobulin-related composition is coupled to one or more detectable labels. In one embodiment, the one or more detectable labels comprise a radioactive label, a fluorescent label, or a chromogenic label.

Additionally or alternatively, in some embodiments, the kit further comprises a secondary antibody that specifically binds to an anti-DLL3 immunoglobulin-related composition described herein. In some embodiments, the secondary antibody is coupled to at least one detectable label selected from the group consisting of a radioactive label, a fluorescent label, or a chromogenic label.

BRIEF DESCRIPTION OF THE DRAWINGS

FIG. 1 shows the results of the Fab ZAP assay, a cytotoxicity-based internalization assay, conducted to assay internalization of DLL3 by the indicated antibodies. A reference DLL3 monoclonal antibody SC16 was used as a positive control. See WO2015127407. All tested anti-DLL3 antibodies exhibited killing activity that was comparable to the reference monoclonal antibody. A hook effect was observed at higher concentrations of the anti-DLL3 antibodies as free anti-DLL3 competed with cell bound anti-DLL3 for the Fab ZAP.

FIG. 2E shows the values for dissociation constants ($K_D$) for the four monoclonal antibodies described herein (6-G23-F, 2-C8-A, 7-I1-B and 10-O18-A), which were calculated using the binding curves shown in FIGS. 2A-2D and applying a monovalent (1:1) binding model.

FIG. 3A shows the nucleotide sequence and the amino acid sequence of the $V_H$ domain of the antibody 7-I1-B, represented as SEQ ID NO: 1 and SEQ ID NO: 2, respectively. The $V_H$ CDR1 (SEQ ID NO: 3) is shown in a boldface font, $V_H$ CDR2 (SEQ ID NO: 4) is underlined, and $V_H$ CDR3 (SEQ ID NO: 5) is indicated in italicized, underlined font.

FIG. 3B shows the nucleotide sequence and the amino acid sequence of the $V_L$ domain of the antibody 7-I1-B, represented as SEQ ID NO: 6 and SEQ ID NO: 7, respectively. The $V_L$ CDR1 (SEQ ID NO: 8) is shown in a boldface font, $V_L$ CDR2 (SEQ ID NO: 9) is underlined, and $V_L$ CDR3 (SEQ ID NO: 10) is indicated in italicized, underlined font.

FIG. 4A shows the nucleotide sequence and the amino acid sequence of the $V_H$ domain of the antibody 2-C8-A, represented as SEQ ID NO: 11 and SEQ ID NO: 12, respectively. The $V_H$ CDR1 (SEQ ID NO: 13) is shown in a boldface font, $V_H$ CDR2 (SEQ ID NO: 14) is underlined, and $V_H$ CDR3 (SEQ ID NO: 15) is indicated in italicized, underlined font.

FIG. 4B shows the nucleotide sequence and the amino acid sequence of the $V_L$ domain of the antibody 2-C8-A, represented as SEQ ID NO: 16 and SEQ ID NO: 17, respectively. The $V_L$ CDR1 (SEQ ID NO: 18) is shown in a boldface font, $V_L$ CDR2 (SEQ ID NO: 19) is underlined, and $V_L$ CDR3 (SEQ ID NO: 20) is indicated in italicized, underlined font.

FIG. 5A shows the nucleotide sequence and the amino acid sequence of the $V_H$ domain of the antibody 10-O18-A, represented as SEQ ID NO: 21 and SEQ ID NO: 22, respectively. The $V_H$ CDR1 (SEQ ID NO: 23) is shown in a boldface font, $V_H$ CDR2 (SEQ ID NO: 24) is underlined, and $V_H$ CDR3 (SEQ ID NO: 25) is indicated in italicized, underlined font.

FIG. 5B shows the nucleotide sequence and the amino acid sequence of the $V_L$ domain of the antibody 10-O18-A, represented as SEQ ID NO: 26 and SEQ ID NO: 27, respectively. The $V_L$ CDR1 (SEQ ID NO: 28) is shown in a boldface font, $V_L$ CDR2 (SEQ ID NO: 29) is underlined, and $V_L$ CDR3 (SEQ ID NO: 30) is indicated in italicized, underlined font.

FIG. 6A shows the nucleotide sequence and the amino acid sequence of the $V_H$ domain of the antibody 6-G23-F, represented as SEQ ID NO: 31 and SEQ ID NO: 32, respectively. The $V_H$ CDR1 (SEQ ID NO: 33) is shown in a boldface font, $V_H$ CDR2 (SEQ ID NO: 34) is underlined, and $V_H$ CDR3 (SEQ ID NO: 35) is indicated in italicized, underlined font.

FIG. 6B shows the nucleotide sequence and the amino acid sequence of the $V_L$ domain of the antibody 6-G23-F, represented as SEQ ID NO: 36 and SEQ ID NO: 37, respectively. The $V_L$ CDR1 (SEQ ID NO: 38) is shown in a boldface font, $V_L$ CDR2 (SEQ ID NO: 39) is underlined, and $V_L$ CDR3 (SEQ ID NO: 40) is indicated in italicized, underlined font.

FIG. 7 shows that the 6-G23-F, 10-O18-A, and 2-C8-A monoclonal antibodies (mAbs) selectively bind DLL3, but not DLL1 or DLL4. The 7-I1-B mAb binds both DLL3 and DLL4, but not DLL1.

FIG. 8A shows the nucleotide sequence and the amino acid sequence of *Homo sapiens* delta like canonical Notch ligand 3 (DLL3) isoform 1, represented as SEQ ID NO: 55 and SEQ ID NO: 50, respectively. FIG. 8B shows the nucleotide sequence and the amino acid sequence of *Homo sapiens* delta like canonical Notch ligand 3 (DLL3) isoform 2, represented as SEQ ID NO: 56 and SEQ ID NO: 51, respectively.

DETAILED DESCRIPTION

Figure 2A:
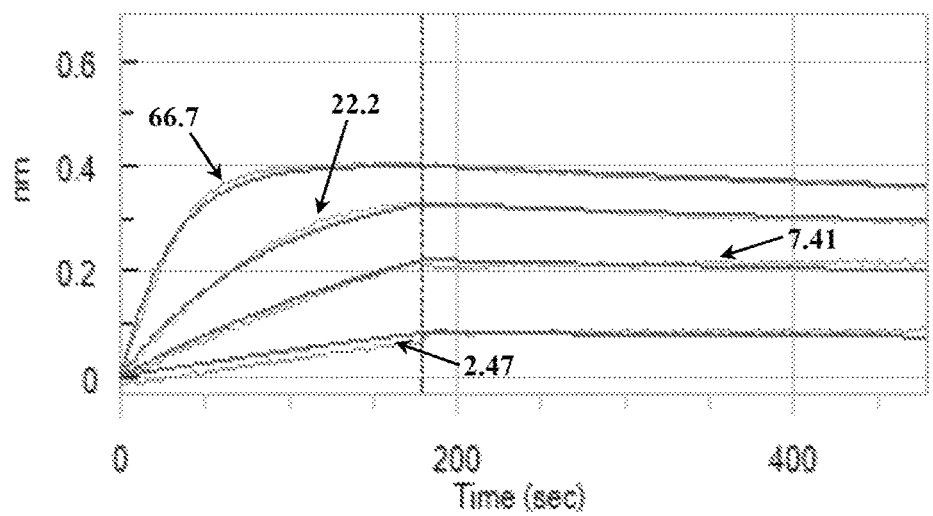
FIGS. 2A-2D show binding curves for the antibodies 7-I1-B (FIG. 2A), 6-G23-F (FIG. 2B), 10-O18-A (FIG. 2C), and 2-C8-A (FIG. 2D), as measured via the Octet HTX at 25° C. using PBS 0.1% BSA 0.02% Tween 20 as the binding buffer and 10 mM Glycine pH 1.7 as the regeneration buffer. The monoclonal antibodies (5 μg/mL each) were loaded onto anti-mouse Fc sensors, and the loaded sensors were dipped into the indicated dilutions of Recombinant Human DLL3 Protein, (amino acids Ala27-Ala479, Cat #9749-DL, R&D Systems) at a 200 nM starting concentration, with 7 serial 1:3 dilutions. For each DLL3 dilution, the actual measurement and curve fits are shown.
Figure 2B:
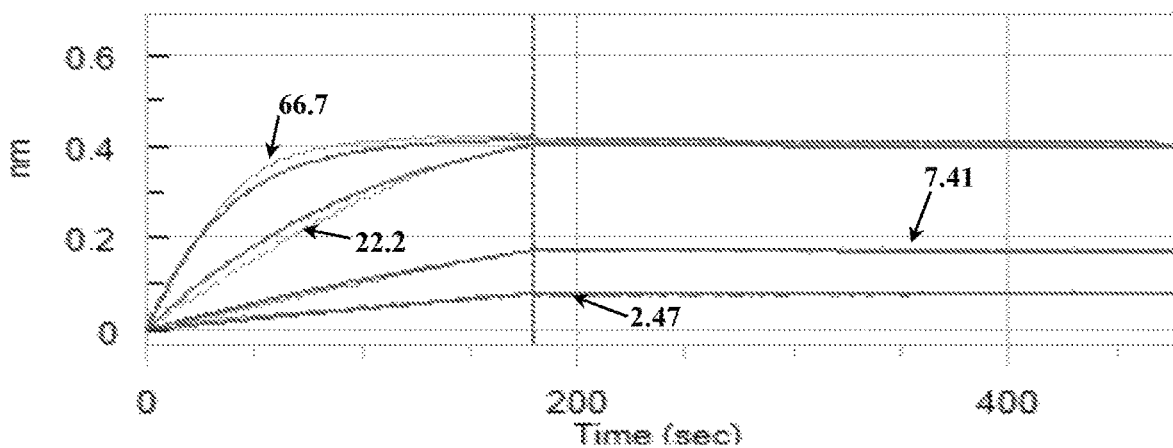
Figure 2C:
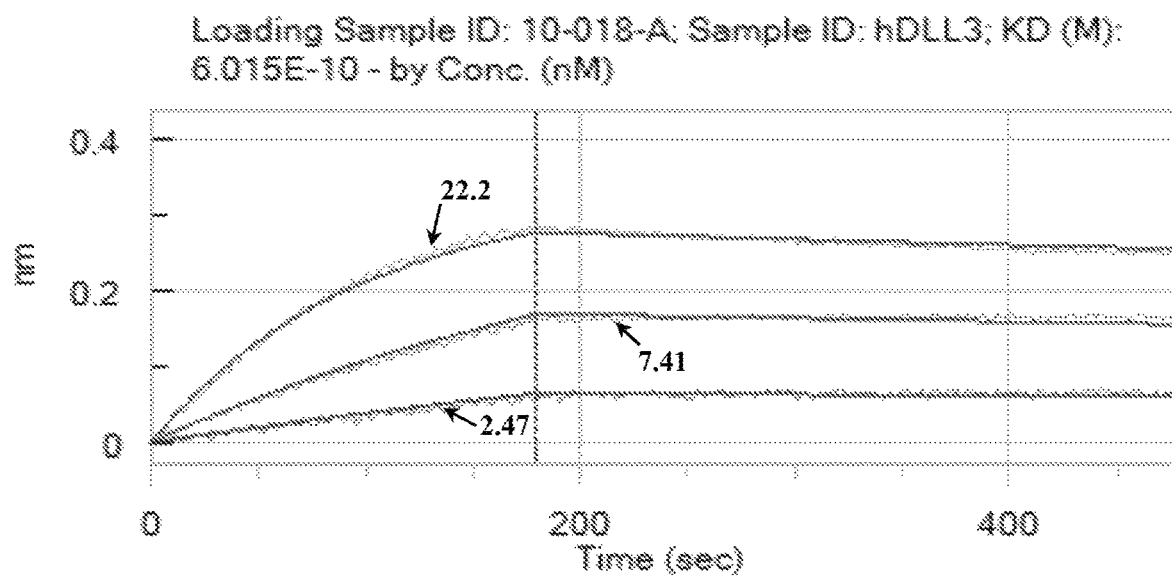
Figure 2D:
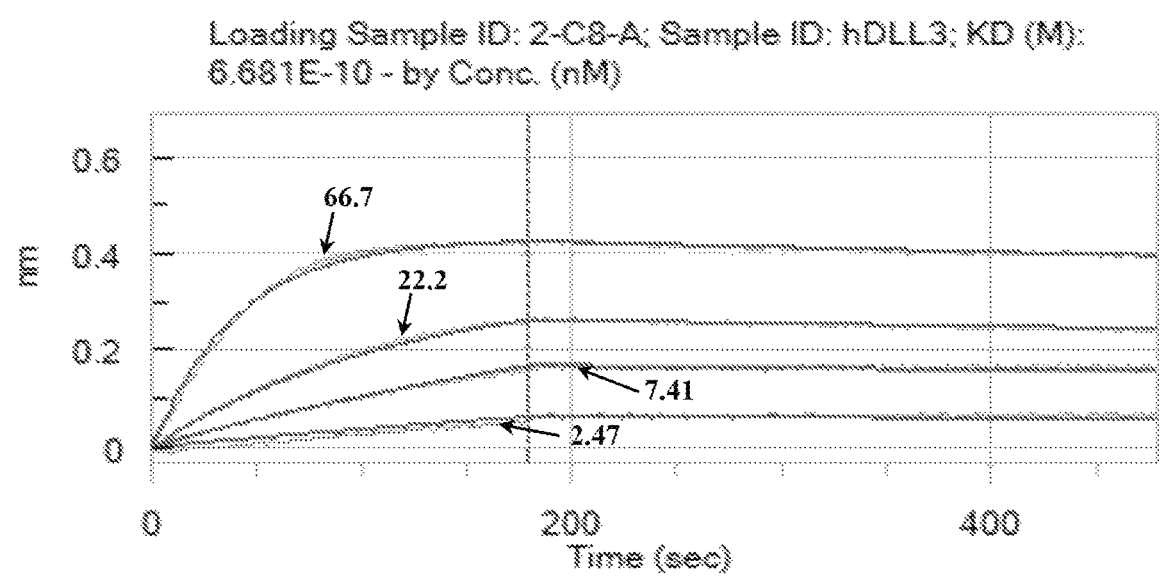

It is to be appreciated that certain aspects, modes, embodiments, variations and features of the present technology are described below in various levels of detail in order to provide a substantial understanding of the present technology.

In practicing the present methods, many conventional techniques in molecular biology, protein biochemistry, cell biology, immunology, microbiology and recombinant DNA are used. See, e.g., Sambrook and Russell eds. (2001) *Molecular Cloning: A Laboratory Manual*, 3rd edition; the series Ausubel et al. eds. (2007) *Current Protocols in Molecular Biology*; the series *Methods in Enzymology* (Academic Press, Inc., N.Y.); MacPherson et al. (1991) *PCR 1: A Practical Approach* (IRL Press at Oxford University Press); MacPherson et al. (1995) *PCR 2: A Practical Approach*; Harlow and Lane eds. (1999) *Antibodies, A Laboratory Manual*; Freshney (2005) *Culture of Animal Cells: A Manual of Basic Technique*, 5th edition; Gait ed. (1984) *Oligonucleotide Synthesis*; U.S. Pat. No. 4,683,195; Hames and Higgins eds. (1984) *Nucleic Acid Hybridization*; Anderson (1999) *Nucleic Acid Hybridization*; Hames and Higgins eds. (1984) *Transcription and Translation; Immobilized Cells and Enzymes* (IRL Press (1986)); Perbal (1984) *A Practical Guide to Molecular Cloning*; Miller and Calos eds. (1987) *Gene Transfer Vectors for Mammalian Cells* (Cold Spring Harbor Laboratory); Makrides ed. (2003) *Gene Transfer and Expression in Mammalian Cells*; Mayer and Walker eds. (1987) *Immunochemical Methods in Cell and Molecular Biology* (Academic Press, London); and Herzenberg et al. eds (1996) *Weir's Handbook of Experimental Immunology*. Methods to detect and measure levels of polypeptide gene expression products (i.e., gene translation level) are well-known in the art and include the use of polypeptide detection methods such as antibody detection and quantification techniques. (See also, Strachan & Read, *Human Molecular Genetics*, Second Edition. (John Wiley and Sons, Inc., NY, 1999)).

DLL3 is selectively expressed in high grade pulmonary neuroendocrine tumors including SCLC and LCNEC. Increased expression of DLL3 was observed in SCLC and LCNEC patient-derived xenograft tumors and was also confirmed in primary tumors. See Saunders et al., *Sci Translational Medicine* 7(302): 302ra136 (2015). Increased expression of DLL3 has also been observed in extrapulmonary neuroendocrine cancers including prostate neuroendocrine carcinoma (Puca et al., *Sci Transl Med* 11(484): pii: eaav0891 (2019). While DLL3 is expressed on the surface of such tumor cells, it is not expressed in normal tissues. The present disclosure provides immunoglobulin-related compositions (e.g., antibodies or antigen binding fragments thereof), which internalize on binding to DLL3 on tumor cells, and are thus useful for delivering a toxic payload to these tumor cells. The immunoglobulin-related compositions of the present technology are useful in methods for detecting or treating DLL3-associated cancers in a subject in need thereof. Accordingly, the various aspects of the present methods relate to the preparation, characterization, and manipulation of anti-DLL3 antibodies. The immunoglobulin-related compositions of the present technology are useful alone or in combination with additional therapeutic agents for treating cancer. In some embodiments, the immunoglobulin-related composition is a humanized antibody, a chimeric antibody, or a bispecific antibody.

Definitions

The definitions of certain terms as used in this specification are provided below. Unless defined otherwise, all technical and scientific terms used herein generally have the same meaning as commonly understood by one of ordinary skill in the art to which the present technology belongs.

As used in this specification and the appended claims, the singular forms "a", "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art.

As used herein, the term "about" in reference to a number is generally taken to include numbers that fall within a range of 1%, 5%, or 10% in either direction (greater than or less than) of the number unless otherwise stated or otherwise evident from the context (except where such number would be less than 0% or exceed 100% of a possible value).

As used herein, the "administration" of an agent or drug to a subject includes any route of introducing or delivering to a subject a compound to perform its intended function. Administration can be carried out by any suitable route, including orally, intranasally, parenterally (intravenously, intramuscularly, intraperitoneally, or subcutaneously), rectally, intrathecally, intratumorally, or topically. Administration includes self-administration and the administration by another.

An "adjuvant" refers to one or more substances that cause stimulation of the immune system. In this context, an adjuvant is used to enhance an immune response to one or more vaccine antigens or antibodies. An adjuvant may be administered to a subject before, in combination with, or after administration of the vaccine. Examples of chemical compounds used as adjuvants include aluminum compounds, oils, block polymers, immune stimulating complexes, vitamins and minerals (e.g., vitamin E, vitamin A, selenium, and vitamin B12), Quil A (saponins), bacterial and fungal cell wall components (e.g., lipopolysaccharides, lipoproteins, and glycoproteins), hormones, cytokines, and co-stimulatory factors.

As used herein, the term "amino acid" is used to refer to any organic molecule that contains at least one amino group and at least one carboxyl group. Typically, at least one amino group is at the α position relative to a carboxyl group. The term "amino acid" includes naturally-occurring amino acids and synthetic amino acids, as well as amino acid analogs and amino acid mimetics that function in a manner similar to the naturally-occurring amino acids. Naturally-occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally-occurring amino acid, i.e., an α-carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally-occurring amino acid. Amino acid mimetics refer to chemical compounds that have a structure that is different from the general chemical structure of an amino acid, but that functions in a manner similar to a naturally-occurring amino acid. Amino acids can be referred to herein by either their commonly known three letter symbols or by the one-letter symbols recommended by the IUPAC-IUB Biochemical Nomenclature Commission.

As used herein, the term "antibody" collectively refers to immunoglobulins or immunoglobulin-like molecules including by way of example and without limitation, IgA, IgD, IgE, IgG and IgM, combinations thereof, and similar molecules produced during an immune response in any vertebrate, for example, in mammals such as humans, goats, rabbits and mice, as well as non-mammalian species, such as shark immunoglobulins. As used herein, "antibodies" (includes intact immunoglobulins) and "antigen binding fragments" specifically bind to a molecule of interest (or a group of highly similar molecules of interest) to the substantial exclusion of binding to other molecules (for example, antibodies and antibody fragments that have a binding constant for the molecule of interest that is at least $10^3$ $M^{-1}$ greater, at least $10^4$ $M^{-1}$ greater or at least $10^5$ $M^{-1}$ greater than a binding constant for other molecules in a biological sample). The term "antibody" also includes genetically engineered forms such as chimeric antibodies (for example, humanized murine antibodies), heteroconjugate antibodies (such as, bispecific antibodies). See also, Pierce Catalog and Handbook, 1994-1995 (Pierce Chemical Co., Rockford, Ill.); Kuby, J., *Immunology*, $3^{rd}$ Ed., W.H. Freeman & Co., New York, 1997.

More particularly, antibody refers to a polypeptide ligand comprising at least a light chain immunoglobulin variable region or heavy chain immunoglobulin variable region which specifically recognizes and binds an epitope of an antigen. Antibodies are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody. Typically, an immunoglobulin has heavy (H) chains and light (L) chains interconnected by disulfide bonds. There are two types of light chain, lambda (λ) and kappa (κ). There are five main heavy chain classes (or isotypes) which determine the functional activity of an antibody molecule: IgM, IgD, IgG, IgA and IgE. Each heavy and light chain contains a constant region and a variable region, (the regions are also known as "domains"). In combination, the heavy and the light chain variable regions specifically bind the antigen. Light and heavy chain variable regions contain a "framework" region interrupted by three hypervariable regions, also called "complementarity-determining regions" or "CDRs". The extent of the framework region and CDRs have been defined (see, Kabat et al., *Sequences of Proteins of Immunological Interest*, U.S. Department of Health and Human Services, 1991, which is hereby incorporated by reference). The Kabat database is now maintained online. The sequences of the framework regions of different light or heavy chains are relatively conserved within a species. The framework region of an antibody, that is the combined framework regions of the constituent light and heavy chains, largely adopt a β-sheet conformation and the CDRs form loops which connect, and in some cases form part of, the β-sheet structure. Thus, framework regions act to form a scaffold that provides for positioning the CDRs in correct orientation by inter-chain, non-covalent interactions.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds DLL3 protein will have a specific $V_H$ region and the $V_L$ region sequence, and thus specific CDR sequences. Antibodies with different specificities (i.e. different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs). "Immunoglobulin-related compositions" as used herein, refers to antibodies (including monoclonal antibodies, polyclonal antibodies, humanized antibodies, chimeric antibodies, recombinant antibodies, multispecific antibodies, bispecific antibodies, etc.) as well as antibody fragments. An antibody or antigen binding fragment thereof specifically binds to an antigen.

As used herein, the term "antibody-related polypeptide" means antigen-binding antibody fragments, including single-chain antibodies, that can comprise the variable region(s) alone, or in combination, with all or part of the following polypeptide elements: hinge region, $CH_1$, $CH_2$, and $CH_3$ domains of an antibody molecule. Also included in the technology are any combinations of variable region(s) and hinge region, $CH_1$, $CH_2$, and $CH_3$ domains. Antibody-related molecules useful in the present methods, e.g., but are not limited to, Fab, Fab' and F(ab')2, Fd, single-chain Fvs (scFv), single-chain antibodies, disulfide-linked Fvs (sdFv) and fragments comprising either a $V_L$ or $V_H$ domain. Examples include: (i) a Fab fragment, a monovalent fragment consisting of the $V_L$, $V_H$, $C_L$ and $CH_1$ domains; (ii) a F(ab')2 fragment, a bivalent fragment comprising two Fab fragments linked by a disulfide bridge at the hinge region; (iii) a Fd fragment consisting of the $V_H$ and $CH_1$ domains; (iv) a Fv fragment consisting of the $V_L$ and $V_H$ domains of a single arm of an antibody, (v) a dAb fragment (Ward et al., *Nature* 341: 544-546, 1989), which consists of a $V_H$ domain; and (vi) an isolated complementarity determining region (CDR). As such "antibody fragments" or "antigen binding fragments" can comprise a portion of a full length antibody, generally the antigen binding or variable region thereof. Examples of antibody fragments or antigen binding fragments include Fab, Fab', F(ab')2, and Fv fragments; diabodies; linear antibodies; single-chain antibody molecules; and multispecific antibodies formed from antibody fragments.

"Bispecific antibody" or "BsAb", as used herein, refers to an antibody that can bind simultaneously to two targets that have a distinct structure, e.g., two different target antigens, two different epitopes on the same target antigen. A variety of different bispecific antibody structures are known in the art. In some embodiments, each antigen binding moiety in a bispecific antibody includes $V_H$ and/or $V_L$ regions; in some such embodiments, the $V_H$ and/or $V_L$ regions are those found in a particular monoclonal antibody. In some embodiments, the bispecific antibody contains two antigen binding moieties, each including $V_H$ and/or $V_L$ regions from different monoclonal antibodies. In some embodiments, the bispecific antibody contains two antigen binding moieties, wherein one of the two antigen binding moieties includes an immunoglobulin molecule having $V_H$ and/or $V_L$ regions that contain CDRs from a first monoclonal antibody, and the other antigen binding moiety includes an antibody fragment (e.g., Fab, F(ab'), F(ab')2, Fd, Fv, dAB, scFv, etc.) having $V_H$ and/or $V_L$ regions that contain CDRs from a second monoclonal antibody.

As used herein, the term "conjugated" refers to the association of two molecules by any method known to those in the art. Suitable types of associations include chemical bonds and physical bonds. Chemical bonds include, for example, covalent bonds and coordinate bonds. Physical bonds include, for instance, hydrogen bonds, dipolar interactions, van der Waal forces, electrostatic interactions, hydrophobic interactions and aromatic stacking.

As used herein, the term "diabodies" refers to small antibody fragments with two antigen-binding sites, which fragments comprise a heavy-chain variable domain ($V_H$) connected to a light-chain variable domain ($V_L$) in the same polypeptide chain ($V_H V_L$). By using a linker that is too short to allow pairing between the two domains on the same chain, the domains are forced to pair with the complementary domains of another chain and create two antigen binding sites. Diabodies are described more fully in, e.g., EP 404,097; WO 93/11161; and Hollinger et al., *Proc. Natl. Acad. Sci. USA*, 90: 6444-6448 (1993).

As used herein, the terms "single-chain antibodies" or "single-chain Fv (scFv)" refer to an antibody fusion molecule of the two domains of the Fv fragment, $V_L$ and $V_H$. Single-chain antibody molecules may comprise a polymer with a number of individual molecules, for example, dimer, trimer or other polymers. Furthermore, although the two domains of the Fv fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single-chain Fv (scFv)). Bird et al. (1988) *Science* 242:423-426 and Huston et al. (1988) *Proc. Natl. Acad Sci. USA* 85:5879-5883. Such single-chain antibodies can be prepared by recombinant techniques or enzymatic or chemical cleavage of intact antibodies.

Any of the above-noted antibody fragments are obtained using conventional techniques known to those of skill in the art, and the fragments are screened for binding specificity and neutralization activity in the same manner as are intact antibodies.

As used herein, an "antigen" refers to a molecule to which an antibody (or antigen binding fragment thereof) can selectively bind. The target antigen may be a protein, carbohydrate, nucleic acid, lipid, hapten, or other naturally occurring or synthetic compound. In some embodiments, the target antigen may be a polypeptide (e.g., a DLL3 polypeptide including the DLL3 extracellular domain). An antigen may also be administered to an animal to generate an immune response in the animal.

The term "antigen binding fragment" refers to a fragment of the whole immunoglobulin structure which possesses a part of a polypeptide responsible for binding to antigen. Examples of the antigen binding fragment useful in the present technology include scFv, (scFv)$_2$, scFv-Fc, Fab, Fab' and F(ab')$_2$, but are not limited thereto.

By "binding affinity" is meant the strength of the total noncovalent interactions between a single binding site of a molecule (e.g., an antibody) and its binding partner (e.g., an antigen or antigenic peptide). The affinity of a molecule X for its partner Y can generally be represented by the dissociation constant ($K_D$). Affinity can be measured by standard methods known in the art, including those described herein. A low-affinity complex contains an antibody that generally tends to dissociate readily from the antigen, whereas a high-affinity complex contains an antibody that generally tends to remain bound to the antigen for a longer duration.

As used herein, the term "biological sample" means sample material derived from living cells. Biological samples may include tissues, cells, protein or membrane extracts of cells, and biological fluids (e.g., ascites fluid or cerebrospinal fluid (CSF)) isolated from a subject, as well as tissues, cells and fluids present within a subject. Biological samples of the present technology include, but are not limited to, samples taken from breast tissue, renal tissue, the uterine cervix, the endometrium, the head or neck, the gallbladder, parotid tissue, the prostate, the brain, the pituitary gland, kidney tissue, muscle, the esophagus, the stomach, the small intestine, the colon, the liver, the spleen, the pancreas, thyroid tissue, heart tissue, lung tissue, the bladder, adipose tissue, lymph node tissue, the uterus, ovarian tissue, adrenal tissue, testis tissue, the tonsils, thymus, blood, hair, buccal, skin, serum, plasma, CSF, semen, prostate fluid, seminal fluid, urine, feces, sweat, saliva, sputum, mucus, bone marrow, lymph, and tears. Biological samples can also be obtained from biopsies of internal organs or from cancers. Biological samples can be obtained from subjects for diagnosis or research or can be obtained from non-diseased individuals, as controls or for basic research. Samples may be obtained by standard methods including, e.g., venous puncture and surgical biopsy. In certain embodiments, the biological sample is a sputum sample, or a tissue sample obtained by needle biopsy or surgical biopsy.

As used herein, the term "CDR-grafted antibody" means an antibody in which at least one CDR of an "acceptor" antibody is replaced by a CDR "graft" from a "donor" antibody possessing a desirable antigen specificity.

As used herein, the term "chimeric antibody" means an antibody in which the Fc constant region of a monoclonal antibody from one species (e.g., a mouse Fc constant region) is replaced, using recombinant DNA techniques, with an Fc constant region from an antibody of another species (e.g., a human Fc constant region). See generally, Robinson et al., PCT/US86/02269; Akira et al., European Patent Application 184,187; Taniguchi, European Patent Application 171,496; Morrison et al., European Patent Application 173,494; Neuberger et al., WO 86/01533; Cabilly et al. U.S. Pat. No. 4,816,567; Cabilly et al., European Patent Application 0125, 023; Better et al., *Science* 240: 1041-1043, 1988; Liu et al., *Proc. Natl. Acad. Sci. USA* 84: 3439-3443, 1987; Liu et al., *J. Immunol* 139: 3521-3526, 1987; Sun et al., *Proc. Natl. Acad. Sci. USA* 84: 214-218, 1987; Nishimura et al., *Cancer Res* 47: 999-1005, 1987; Wood et al., *Nature* 314: 446-449, 1885; and Shaw et al., *J. Natl. Cancer Inst.* 80: 1553-1559, 1988.

As used herein, the term "consensus FR" means a framework (FR) antibody region in a consensus immunoglobulin sequence. The FR regions of an antibody do not contact the antigen.

As used herein, a "control" is an alternative sample used in an experiment for comparison purpose. A control can be "positive" or "negative." For example, where the purpose of the experiment is to determine a correlation of the efficacy of a therapeutic agent for the treatment for a particular type of disease, a positive control (a compound or composition known to exhibit the desired therapeutic effect) and a negative control (a subject or a sample that does not receive the therapy or receives a placebo) are typically employed.

As used herein, the term "effective amount" refers to a quantity sufficient to achieve a desired therapeutic and/or prophylactic effect, e.g., an amount which results in the prevention of, or a decrease in a disease or condition described herein or one or more signs or symptoms associated with a disease or condition described herein. In the context of therapeutic or prophylactic applications, the amount of a composition administered to the subject will vary depending on the composition, the degree, type, and severity of the disease and on the characteristics of the individual, such as general health, age, sex, body weight and tolerance to drugs. The skilled artisan will be able to determine appropriate dosages depending on these and other factors. The compositions can also be administered in combination with one or more additional therapeutic compounds. In the methods described herein, the therapeutic compositions may be administered to a subject having one or more signs or symptoms of a disease or condition described herein. As used herein, a "therapeutically effective amount" of a composition refers to composition levels in which the physiological effects of a disease or condition are ameliorated or eliminated. A therapeutically effective amount can be given in one or more administrations.

An "isolated" or "purified" polypeptide or peptide is substantially free of cellular material or other contaminating polypeptides from the cell or tissue source from which the agent is derived, or substantially free from chemical precursors or other chemicals when chemically synthesized. For example, isolated anti-DLL3 antibodies or antigen binding fragments of the present technology would be free of materials that would interfere with diagnostic or therapeutic uses of the agent. Such interfering materials may include enzymes, hormones and other proteinaceous and nonproteinaceous solutes.

As used herein, the term "epitope" means a protein determinant capable of specific binding to an antibody. Epitopes usually consist of chemically active surface groupings of molecules such as amino acids or sugar side chains and usually have specific three dimensional structural characteristics, as well as specific charge characteristics. Conformational and non-conformational epitopes are distinguished in that the binding to the former but not the latter is lost in the presence of denaturing solvents. In some embodiments, an "epitope" of the DLL3 protein is a region of the protein to which the anti-DLL3 antibodies of the present technology specifically bind. In some embodiments, the epitope is a conformational epitope or a non-conformational epitope. To screen for anti-DLL3 antibodies which bind to an epitope, a routine cross-blocking assay such as that described in Antibodies, *A Laboratory Manual*, Cold Spring Harbor Laboratory, Ed Harlow and David Lane (1988), can be performed. This assay can be used to determine if an anti-DLL3 antibody binds the same site or epitope as an anti-DLL3 antibody of the present technology. Alternatively, or additionally, epitope mapping can be performed by methods known in the art. For example, the antibody sequence can be mutagenized such as by alanine scanning, to identify contact residues. In a different method, peptides corresponding to different regions of DLL3 protein can be used in competition assays with the test antibodies or with a test antibody and an antibody with a characterized or known epitope.

As used herein, "expression" includes one or more of the following: transcription of the gene into precursor mRNA; splicing and other processing of the precursor mRNA to produce mature mRNA; mRNA stability; translation of the mature mRNA into protein (including codon usage and tRNA availability); and glycosylation and/or other modifications of the translation product, if required for proper expression and function.

As used herein, the term "gene" means a segment of DNA that contains all the information for the regulated biosynthesis of an RNA product, including promoters, exons, introns, and other untranslated regions that control expression.

As used herein, "homology" or "identity" or "similarity" refers to sequence similarity between two peptides or between two nucleic acid molecules. Homology can be determined by comparing a position in each sequence which may be aligned for purposes of comparison. When a position in the compared sequence is occupied by the same base or amino acid, then the molecules are homologous at that position. A degree of homology between sequences is a function of the number of matching or homologous positions shared by the sequences. A polynucleotide or polynucleotide region (or a polypeptide or polypeptide region) has a certain percentage (for example, at least 60%, 65%, 70%, 75%, 80%, 85%, 90%, 95%, 98% or 99%) of "sequence identity" to another sequence means that, when aligned, that percentage of bases (or amino acids) are the same in comparing the two sequences. This alignment and the percent homology or sequence identity can be determined using software programs known in the art. In some embodiments, default parameters are used for alignment. One alignment program is BLAST, using default parameters. In particular, programs are BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR. Details of these programs can be found at the National Center for Biotechnology Information. Biologically equivalent polynucleotides are those having the specified percent homology and encoding a polypeptide having the same or similar biological activity. Two sequences are deemed "unrelated" or "non-homologous" if they share less than 40% identity, or less than 25% identity, with each other.

As used herein, "humanized" forms of non-human (e.g., murine) antibodies are chimeric antibodies which contain minimal sequence derived from non-human immunoglobulin. For the most part, humanized antibodies are human immunoglobulins in which hypervariable region residues of the recipient are replaced by hypervariable region residues from a non-human species (donor antibody) such as mouse, rat, rabbit or nonhuman primate having the desired specificity, affinity, and capacity. In some embodiments, Fv framework region (FR) residues of the human immunoglobulin are replaced by corresponding non-human residues. Furthermore, humanized antibodies may comprise residues which are not found in the recipient antibody or in the donor antibody. These modifications are made to further refine antibody performance such as binding affinity. Generally, the humanized antibody will comprise substantially all of at least one, and typically two, variable domains (e.g., Fab, Fab', F(ab')$_2$, or Fv), in which all or substantially all of the hypervariable loops correspond to those of a non-human immunoglobulin and all or substantially all of the FR regions are those of a human immunoglobulin consensus FR sequence although the FR regions may include one or more amino acid substitutions that improve binding affinity. The number of these amino acid substitutions in the FR are typically no more than 6 in the H chain, and in the L chain, no more than 3. The humanized antibody optionally may also comprise at least a portion of an immunoglobulin constant region (Fc), typically that of a human immunoglobulin. For further details, see Jones et al., *Nature* 321: 522-525 (1986); Riechmann et al., *Nature* 332: 323-327 (1988); and Presta, *Curr. Op. Struct. Biol.* 2:593-596 (1992). See e.g., Ahmed & Cheung, *FEBS Letters* 588(2):288-297 (2014); Saxena & Wu, *Frontiers in immunology* 7: 580 (2016).

As used herein, the term "hypervariable region" refers to the amino acid residues of an antibody which are responsible for antigen-binding. The hypervariable region generally comprises amino acid residues from a "complementarity determining region" or "CDR" (e.g., around about residues 24-34 (L1), 50-56 (L2) and 89-97 (L3) in the $V_L$, and around about 31-35B (H1), 50-65 (H2) and 95-102 (H3) in the $V_H$ (Kabat et al., *Sequences of Proteins of ImmunologicalInterest,* 5th Ed. Public Health Service, National Institutes of Health, Bethesda, MD. (1991)) and/or those residues from a "hypervariable loop" (e.g., residues 26-32 (L1), 50-52 (L2) and 91-96 (L3) in the $V_L$, and 26-32 (H1), 52A-55 (H2) and 96-101 (H3) in the $V_H$ (Chothia and Lesk *J. Mol. Biol.* 196:901-917 (1987)).

As used herein, the terms "identical" or percent "identity", when used in the context of two or more nucleic acids or polypeptide sequences, refer to two or more sequences or subsequences that are the same or have a specified percentage of amino acid residues or nucleotides that are the same (i.e., about 60%, 65%, 70%, 75%, 80%, 85%, 90%, 91%, 92%, 93%, 94%, 95%, 96%, 97%, 98%, 99%, or higher identity over a specified region (e.g., nucleotide sequence encoding an antibody described herein or amino acid sequence of an antibody described herein)), when compared and aligned for maximum correspondence over a comparison window or designated region as measured using a BLAST or BLAST 2.0 sequence comparison algorithms with default parameters described below, or by manual alignment and visual inspection (e.g., NCBI web site). Such sequences are then said to be "substantially identical." This term also refers to, or can be applied to, the complement of a test sequence. The term also includes sequences that have deletions and/or additions, as well as those that have substitutions. In some embodiments, identity exists over a region that is at least about 25 amino acids or nucleotides in length, or 50-100 amino acids or nucleotides in length.

As used herein, the term "intact antibody" or "intact immunoglobulin" means an antibody that has at least two heavy (H) chain polypeptides and two light (L) chain polypeptides interconnected by disulfide bonds. Each heavy chain is comprised of a heavy chain variable region (abbreviated herein as HCVR or $V_H$) and a heavy chain constant region. The heavy chain constant region is comprised of three domains, $CH_1$, $CH_2$ and $CH_3$. Each light chain is comprised of a light chain variable region (abbreviated herein as LCVR or $V_L$) and a light chain constant region. The light chain constant region is comprised of one domain, $C_L$. The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxyl-terminus in the following order: $FR_1$, $CDR_1$, $FR_2$, $CDR_2$, $FR_3$, $CDR_3$, $FR_4$. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

As used herein, the terms "individual", "patient", or "subject" can be an individual organism, a vertebrate, a mammal, or a human. In some embodiments, the individual, patient or subject is a human.

The term "monoclonal antibody" as used herein refers to an antibody obtained from a population of substantially homogeneous antibodies, i.e., the individual antibodies comprising the population are identical except for possible naturally occurring mutations that may be present in minor amounts. For example, a monoclonal antibody can be an antibody that is derived from a single clone, including any eukaryotic, prokaryotic, or phage clone, and not the method by which it is produced. A monoclonal antibody composition displays a single binding specificity and affinity for a particular epitope. Monoclonal antibodies are highly specific, being directed against a single antigenic site. Furthermore, in contrast to conventional (polyclonal) antibody preparations which typically include different antibodies directed against different determinants (epitopes), each monoclonal antibody is directed against a single determinant on the antigen. The modifier "monoclonal" indicates the character of the antibody as being obtained from a substantially homogeneous population of antibodies, and is not to be construed as requiring production of the antibody by any particular method. Monoclonal antibodies can be prepared using a wide variety of techniques known in the art including, e.g., but not limited to, hybridoma, recombinant, and phage display technologies. For example, the monoclonal antibodies to be used in accordance with the present methods may be made by the hybridoma method first described by Kohler et al., Nature 256:495 (1975), or may be made by recombinant DNA methods (See, e.g., U.S. Pat. No. 4,816, 567). The "monoclonal antibodies" may also be isolated from phage antibody libraries using the techniques described in Clackson et al., *Nature* 352:624-628 (1991) and Marks et al., *J. Mol. Biol.* 222:581-597 (1991), for example.

As used herein, the term "pharmaceutically-acceptable carrier" is intended to include any and all solvents, dispersion media, coatings, antibacterial and antifungal compounds, isotonic and absorption delaying compounds, and the like, compatible with pharmaceutical administration. Pharmaceutically-acceptable carriers and their formulations are known to one skilled in the art and are described, for example, in Remington's Pharmaceutical Sciences (20$^{th}$ edition, ed. A. Gennaro, 2000, Lippincott, Williams & Wilkins, Philadelphia, PA).

As used herein, the term "polyclonal antibody" means a preparation of antibodies derived from at least two (2) different antibody-producing cell lines. The use of this term includes preparations of at least two (2) antibodies that contain antibodies that specifically bind to different epitopes or regions of an antigen.

As used herein, the term "polynucleotide" or "nucleic acid" means any RNA or DNA, which may be unmodified or modified RNA or DNA. Polynucleotides include, without limitation, single- and double-stranded DNA, DNA that is a mixture of single- and double-stranded regions, single- and double-stranded RNA, RNA that is mixture of single- and double-stranded regions, and hybrid molecules comprising DNA and RNA that may be single-stranded or, more typically, double-stranded or a mixture of single- and double-stranded regions. In addition, polynucleotide refers to triple-stranded regions comprising RNA or DNA or both RNA and DNA. The term polynucleotide also includes DNAs or RNAs containing one or more modified bases and DNAs or RNAs with backbones modified for stability or for other reasons.

As used herein, the terms "polypeptide," "peptide," and "protein" are used interchangeably herein to mean a polymer comprising two or more amino acids joined to each other by peptide bonds or modified peptide bonds, i.e., peptide isosteres. Polypeptide refers to both short chains, commonly referred to as peptides, glycopeptides or oligomers, and to longer chains, generally referred to as proteins. Polypeptides may contain amino acids other than the 20 gene-encoded amino acids. Polypeptides include amino acid sequences modified either by natural processes, such as post-translational processing, or by chemical modification techniques that are well known in the art.

As used herein, "prevention" or "preventing" of a disorder or condition refers to a compound that, in a statistical sample, reduces the occurrence of the disorder or condition in the treated sample relative to an untreated control sample, or delays the onset or reduces the severity of one or more symptoms of the disorder or condition relative to the untreated control sample.

As used herein, the term "recombinant" when used with reference, e.g., to a cell, or nucleic acid, protein, or vector, indicates that the cell, nucleic acid, protein or vector, has been modified by the introduction of a heterologous nucleic acid or protein or the alteration of a native nucleic acid or protein, or that the material is derived from a cell so modified. Thus, for example, recombinant cells express genes that are not found within the native (non-recombinant) form of the cell or express native genes that are otherwise abnormally expressed, under expressed or not expressed at all.

As used herein, the term "separate" therapeutic use refers to an administration of at least two active ingredients at the same time or at substantially the same time by different routes.

As used herein, the term "sequential" therapeutic use refers to administration of at least two active ingredients at different times, the administration route being identical or different. More particularly, sequential use refers to the whole administration of one of the active ingredients before administration of the other or others commences. It is thus possible to administer one of the active ingredients over several minutes, hours, or days before administering the other active ingredient or ingredients. There is no simultaneous treatment in this case.

As used herein, the term "simultaneous" therapeutic use refers to the administration of at least two active ingredients by the same route and at the same time or at substantially the same time.

As used herein, "specifically binds" refers to a molecule (e.g., an antibody or antigen binding fragment thereof) which recognizes and binds another molecule (e.g., an antigen), but that does not substantially recognize and bind other molecules. The terms "specific binding," "specifically binds to," or is "specific for" a particular molecule (e.g., a polypeptide, or an epitope on a polypeptide), as used herein, can be exhibited, for example, by a molecule having a $K_D$ for the molecule to which it binds to of about $10^{-4}$ M, $10^{-5}$ M, $10^{-6}$ M, $10^{-7}$ M, $10^{-8}$ M, $10^{-9}$ M, $10^{-10}$ M, $10^{-11}$ M, or $10^{-12}$ M. The term "specifically binds" may also refer to binding where a molecule (e.g., an antibody or antigen binding fragment thereof) binds to a particular polypeptide (e.g., a DLL3 polypeptide), or an epitope on a particular polypeptide, without substantially binding to any other polypeptide, or polypeptide epitope.

As used herein, the term "therapeutic agent" is intended to mean a compound that, when present in an effective amount, produces a desired therapeutic effect on a subject in need thereof.

"Treating" or "treatment" as used herein covers the treatment of a disease or disorder described herein, in a subject, such as a human, and includes: (i) inhibiting a disease or disorder, i.e., arresting its development; (ii) relieving a disease or disorder, i.e., causing regression of the disorder; (iii) slowing progression of the disorder; and/or (iv) inhibiting, relieving, or slowing progression of one or more symptoms of the disease or disorder. In some embodiments, treatment means that the symptoms associated with the disease are, e.g., alleviated, reduced, cured, or placed in a state of remission.

It is also to be appreciated that the various modes of treatment of disorders as described herein are intended to mean "substantial," which includes total but also less than total treatment, and wherein some biologically or medically relevant result is achieved. The treatment may be a continuous prolonged treatment for a chronic disease or a single, or few time administrations for the treatment of an acute condition.

Amino acid sequence modification(s) of the anti-DLL3 antibodies described herein are contemplated. For example, it may be desirable to improve the binding affinity and/or other biological properties of the antibody. Amino acid sequence variants of an anti-DLL3 antibody are prepared by introducing appropriate nucleotide changes into the antibody nucleic acid, or by peptide synthesis. Such modifications include, for example, deletions from, and/or insertions into and/or substitutions of, residues within the amino acid sequences of the antibody. Any combination of deletion, insertion, and substitution is made to obtain the antibody of interest, as long as the obtained antibody possesses the desired properties. The modification also includes the change of the pattern of glycosylation of the protein. The sites of greatest interest for substitutional mutagenesis include the hypervariable regions, but FR alterations are also contemplated. "Conservative substitutions" are shown in the Table below.

| Amino Acid Substitutions | | |
|---|---|---|
| Original Residue | Exemplary Substitutions | Conservative Substitutions |
| Ala (A) | val; leu; ile | val |
| Arg (R) | lys; gln; asn | lys |
| Asn (N) | gln; his; asp, lys; arg | gln |
| Asp (D) | glu; asn | glu |
| Cys (C) | ser; ala | ser |
| Gln (Q) | asn; glu | asn |
| Glu (E) | asp; gln | asp |
| Gly (G) | ala | ala |
| His (H) | asn; gln; lys; arg | arg |
| Ile (I) | leu; val; met; ala; phe; norleucine | leu |
| Leu (L) | norleucine; ile; val; met; ala; phe | ile |
| Lys (K) | arg; gln; asn | arg |
| Met (M) | leu; phe; ile | leu |
| Phe (F) | leu; val; ile; ala; tyr | tyr |
| Pro (P) | ala | ala |
| Ser (S) | thr | thr |
| Thr (T) | ser | ser |
| Trp (W) | tyr; phe | tyr |
| Tyr (Y) | trp; phe; thr; ser | phe |
| Val (V) | ile; leu; met; phe; ala; norleucine | leu |

One type of substitutional variant involves substituting one or more hypervariable region residues of a parent antibody. A convenient way for generating such substitutional variants involves affinity maturation using phage display. Specifically, several hypervariable region sites (e.g., 6-7 sites) are mutated to generate all possible amino acid substitutions at each site. The antibody variants thus generated are displayed in a monovalent fashion from filamentous phage particles as fusions to the gene III product of M13 packaged within each particle. The phage-displayed variants are then screened for their biological activity (e.g., binding affinity) as herein disclosed. In order to identify candidate hypervariable region sites for modification, alanine scanning mutagenesis can be performed to identify hypervariable region residues contributing significantly to antigen binding. Alternatively, or additionally, it may be beneficial to analyze a crystal structure of the antigen-antibody complex to identify contact points between the antibody and the antigen. Such contact residues and neighboring residues are candidates for substitution according to the techniques elaborated herein. Once such variants are generated, the panel of variants is subjected to screening as described herein and antibodies with similar or superior properties in one or more relevant assays may be selected for further development.

Delta-Like 3 (DLL3)

In *Drosophila*, Notch signaling is mediated primarily by the Notch receptor. Delta is one of the *Drosophila* ligands of Notch that activate signaling in adjacent cells. Humans have four known Notch receptors (NOTCH1 to NOTCH4), and three homologs of Delta, termed delta-like ligands: DLL1, DLL3 and DLL4. It has been reported that unlike DLL1 and DLL4, DLL3 inhibits Notch signaling rather than activating it.

DLL3 (also known as Delta-like 3 or SCDO1) is a member of the Delta-like family of Notch DSL ligands. Representative DLL3 protein orthologs include, but are not limited to, human (Accession Nos. NP_058637 (SEQ ID NO: 50) and NP_982353 (SEQ ID NO: 51)), chimpanzee (Accession No. XP_003316395 (SEQ ID NO: 52)), mouse (Accession No. NP_031892 (SEQ ID NO: 53)), and rat (Accession No. NP_446118 (SEQ ID NO: 54)). In humans, the DLL3 gene consists of 8 exons spanning 9.5 kBp located on chromosome 19q13. Alternate splicing within the last exon gives rise to a 2389 bp transcript (Accession No. NM_016941 (SEQ ID NO: 55)) and a 2052 bp transcript (Accession No. NM_203486 (SEQ ID NO: 56)). The former transcript encodes a protein that is 618 amino acids in length (Accession No. NP_058637 (SEQ ID NO: 50)), whereas the latter encodes a protein that is 587 amino acids in length (Accession No. NP_982353 (SEQ ID NO: 51)). See FIGS. 8A-8B. These two protein isoforms of DLL3 share overall 100% identity across their extracellular domains and their transmembrane domains, differing only in that the longer isoform contains an extended cytoplasmic tail containing 32 additional residues at the carboxy terminus of the protein.

Both isoforms can be detected in tumor cells. In fact aberrant DLL3 expression (genotypic and/or phenotypic) is associated with various tumorigenic cell subpopulations such as cancer stem cells and tumor initiating cells. Accordingly, the present disclosure provides DLL3 antibodies that may be particularly useful for targeting such cells (e.g., cancer stem cells, tumor initiating cells, and cancers, e.g., small-cell lung cancer, large cell neuroendocrine carcinoma, pulmonary neuroendocrine cancers, extrapulmonary neuroendocrine cancers, and melanoma), thereby facilitating the treatment, management or prevention of neoplastic disorders.

Immunoglobulin-Related Compositions of the Present Technology

The present technology describes methods and compositions for the generation and use of anti-DLL3 immunoglobulin-related compositions (e.g., anti-DLL3 antibodies or antigen binding fragments thereof). The anti-DLL3 immunoglobulin-related compositions of the present disclosure may be useful in the diagnosis, or treatment of the DLL3 associated cancers (e.g., small-cell lung cancer, large cell neuroendocrine carcinoma, pulmonary neuroendocrine cancers, extrapulmonary neuroendocrine cancers, and melanoma). Anti-DLL3 immunoglobulin-related compositions within the scope of the present technology include, e.g., but are not limited to, monoclonal, chimeric, humanized, bispecific antibodies and diabodies that specifically bind the target polypeptide, a homolog, derivative or a fragment thereof. The present disclosure also provides antigen binding fragments of any of the anti-DLL3 antibodies disclosed herein, wherein the antigen binding fragment is selected from the group consisting of Fab, F(ab)'2, Fab', scF$_v$, and F$_v$.

The present technology discloses anti-DLL3 antibodies that can promote internalization of DLL3-antibody complex and are thus useful for delivering toxic payloads to tumor cells.

FIGS. 3-6 provides the nucleotide and amino acid sequences for V$_H$ and V$_L$ as well as the CDR sequences for the antibodies discloses herein (SEQ TD NOs: 1-40). The Table below also provides amino acid sequences for V$_H$ and V$_L$ as well as the CDR sequences for the antibodies discloses herein.

| SEQ ID NO: | Description | Sequence |
|---|---|---|
| SEQ ID NO: 2 | Amino acid Sequence of V$_H$ of 7-I1-B | EVQLVESGGGLVKPGGSLRLSCAASGFTFSNT WMSWVRQAPGKGLEWVGRIKSKSDGGTTDY |

-continued

| SEQ ID NO: | Description | Sequence |
|---|---|---|
| | | AAPVKGRFTISRDDSKNTLYLQMNSLKTEDTA VYYCTQYYWNSFDYWGQGTLVTVSS |
| SEQ ID NO: 3 | Amino acid Sequence of $V_H$ CDR1 of 7-I1-B | GFTFSNTW |
| SEQ ID NO: 4 | Amino acid Sequence of $V_H$ CDR2 of 7-I1-B | IKSKSDGGTT |
| SEQ ID NO: 5 | Amino acid Sequence of $V_H$ CDR3 of 7-I1-B | TQYYWNSFDY |
| SEQ ID NO: 7 | Amino acid Sequence of $V_L$ of 7-I1-B | DIQMTQSPSSLSASVGDRVTITCQASQDISNYL NWYQQKPGKAPKLLIYDASNLETGVPSRFSGS GSGTDFTFTISSLQPEDIATYYCQQYDNLPLTF GGGTKVEIK |
| SEQ ID NO: 8 | Amino acid Sequence of $V_L$ CDR1 of 7-I1-B | QASQDISNYLN |
| SEQ ID NO: 9 | Amino acid Sequence of $V_L$ CDR2 of 7-I1-B | DASNLET |
| SEQ ID NO: 10 | Amino acid Sequence of $V_L$ CDR3 of 7-I1-B | QQYDNLPLT |
| SEQ ID NO: 12 | Amino acid Sequence of $V_H$ of 2-C8-A | EVQLVESGGGLVQPGGSQRLSCAASGFTFSSY WMNWVRQAPGKGLEWVANIKEDGSEKYYV DSVKGRFTISRDNAKNSLYLQMNSLRAEDTA VYYCARDPGWAPFDYWGQGTLVTVSS |
| SEQ ID NO: 13 | Amino acid Sequence of $V_H$ CDR1 of 2-C8-A | GFTFSSY |
| SEQ ID NO: 14 | Amino acid Sequence of $V_H$ CDR2 of 2-C8-A | KEDGSE |
| SEQ ID NO: 15 | Amino acid Sequence of $V_H$ CDR3 of 2-C8-A | DPGWAPFDY |
| SEQ ID NO: 17 | Amino acid Sequence of $V_L$ of 2-C8-A | DIQMSQSPSSLSASVGDRVTITCRASQGISNYL AWFQQKPGKAPKSLIYAASSLQSGVPSKFSGS GSGTDFTLAISSLQPEDFATYYCQQYNSFPYTF GQGTTLEIK |
| SEQ ID NO: 18 | Amino acid Sequence of $V_L$ CDR1 of 2-C8-A | RASQGISNYLA |
| SEQ ID NO: 19 | Amino acid Sequence of $V_L$ CDR2 of 2-C8-A | AASSLQS |
| SEQ ID NO: 20 | Amino acid Sequence of $V_L$ CDR3 of 2-C8-A | QQYNSFPYT |
| SEQ ID NO: 22 | Amino acid Sequence of $V_H$ of 10-O18-A | QVQLQESGPGLVKPSETLSLTCTVSGGSINSYY WSWIRQPPGKGLEWIGYIFYSGITNYNPSLKSR VTISLDTSKNQFSLKLSSVTAADTAVYYCARI GVAGFYFDYWGQGTLVTVSS |
| SEQ ID NO: 23 | Amino acid Sequence of $V_H$ CDR1 of 10-O18-A | GGSINSY |
| SEQ ID NO: 24 | Amino acid Sequence of $V_H$ CDR2 of 10-O18-A | FYSGI |
| SEQ ID NO: 25 | Amino acid Sequence of $V_H$ CDR3 of 10-O18-A | IGVAGFYFDY |
| SEQ ID NO: 27 | Amino acid Sequence of $V_L$ of 10-O18-A | EIVLTQSPGTLSLSPGERATLSCRASQSVSSSYL AWYQQKPGQAPRLLIYGASSRATGIPDRFSGS GSGTDFTLTISRLEPEDFAVYYCQQYGTSPLTF GGGTKVEIK |
| SEQ ID NO: 28 | Amino acid Sequence of $V_L$ CDR1 of 10-O18-A | RASQSVSSSYLA |

| SEQ ID NO: | Description | Sequence |
|---|---|---|
| SEQ ID NO: 29 | Amino acid Sequence of V$_L$ CDR2 of 10-018-A | GASSRAT |
| SEQ ID NO: 30 | Amino acid Sequence of V$_L$ CDR3 of 10-018-A | QQYGTSPLT |
| SEQ ID NO: 32 | Amino acid Sequence of V$_H$ of 6-G23-F | QVQLVQSGAEVKKPGASVKVSCKASGYTFTS YYIHWVRQAPGQGLEWMGIIDPSDGSTNYAQ KFQGRVTMTRDTSTSTVYMELSSLRSEDTAV YYCARDREYNYYGLDVWGQGTTVTVSS |
| SEQ ID NO: 33 | Amino acid Sequence of V$_H$ CDR1 of 6-G23-F | GYTFTSY |
| SEQ ID NO: 34 | Amino acid Sequence of V$_H$ CDR2 of 6-G23-F | DPSDGS |
| SEQ ID NO: 35 | Amino acid Sequence of V$_H$ CDR3 of 6-G23-F | DREYNYYGLDV |
| SEQ ID NO: 37 | Amino acid Sequence of V$_L$ of 6-G23-F | DVVMTQSPLSLPVTLGQPASISCRSSQSLVYR DGNTYLNWFQQRPGQSPRRLIYKVSNRDSGV PDRFRGSGSGTDFTLKISRVEAEDVGVYYCM QGTHWPPTFGQGTKVEIK |
| SEQ ID NO: 38 | Amino acid Sequence of V$_L$ CDR1 of 6-G23-F | RSSQSLVYRDGNTYLN |
| SEQ ID NO: 39 | Amino acid Sequence of V$_L$ CDR2 of 6-G23-F | KVSNRDS |
| SEQ ID NO: 40 | Amino acid Sequence of V$_L$ CDR3 of 6-G23-F | MQGTHWPPT |

In one aspect, the present disclosure provides an antibody or antigen binding fragment thereof comprising a heavy chain immunoglobulin variable domain (V$_H$) and a light chain immunoglobulin variable domain (V$_L$), wherein (a) the V$_H$ comprises a V$_H$-CDR1 sequence, a V$_H$-CDR2 sequence, and a V$_H$-CDR3 sequence selected from the group consisting of (i) SEQ ID NO: 3, SEQ ID NO: 4, and SEQ ID NO: 5, respectively; (ii) SEQ ID NO: 13, SEQ ID NO: 14, and SEQ ID NO: 15, respectively; (iii) SEQ ID NO: 23, SEQ ID NO: 24, and SEQ ID NO: 25, respectively; and (iv) SEQ ID NO: 33, SEQ ID NO: 34, and SEQ ID NO: 35, respectively; and/or (b) the V$_L$ comprises a V$_L$-CDR1 sequence, a V$_L$-CDR2 sequence, and a V$_L$-CDR3 sequence selected from the group consisting of (i) SEQ ID NO: 8, SEQ ID NO: 9, and SEQ ID NO: 10, respectively; (ii) SEQ ID NO: 18, SEQ ID NO: 19, and SEQ ID NO: 20, respectively; (iii) SEQ ID NO: 28, SEQ ID NO: 29, and SEQ ID NO: 30, respectively; and (iv) SEQ ID NO: 38, SEQ ID NO: 39, and SEQ ID NO: 40, respectively. In some embodiments, the antibody further comprises a Fc domain of any isotype, e.g., but are not limited to, IgG (including IgG1, IgG2, IgG3, and IgG4), IgA (including IgA1 and IgA2), IgD, IgE, or IgM, and IgY. Non-limiting examples of constant region sequences include:

Human IgD constant region, Uniprot: P01880
(SEQ ID NO: 41)
APTKAPDVFPIISGCRHPKDNSPVVLACLITGYHPTSVTVTWYMGTQSQPQRT

FPEIQRRDSYYMTSSQLSTPLQQWRQGEYKCVVQHTASKSKKEIFRWPESPKAQASS

VPTAQPQAEGSLAKATTAPATTRNTGRGGEEKKKEKEKEEQEERETKTPECPSHTQP

LGVYLLTPAVQDLWLRDKATFTCFVVGSDLKDAHLTWEVAGKVPTGGVEEGLLER

HSNGSQSQHSRLTLPRSLWNAGTSVTCTLNHPSLPPQRLMALREPAAQAPVKLSLNL

LASSDPPEAASWLLCEVSGFSPPNILLMWLEDQREVNTSGFAPARPPPQPGSTTFWA

WSVLRVPAPPSPQPATYTCVVSHEDSRTLLNASRSLEVSYVTDHGPMK

Human IgG1 constant region, Uniprot: P01857
(SEQ ID NO: 42)
ASTKGPSVFPLAPSSKSTSGGTAALGCLVKDYFPEPVTVSWNSGALTSGVHTF

PAVLQSSGLYSLSSVVTVPSSSLGTQTYICNVNHKPSNTKVDKKVEPKSCDKTHTCPP

CPAPELLGGPSVFLFPPKPKDTLMISRTPEVTCVVVDVSHEDPEVKFNWYVDGVEVH

-continued

NAKTKPREEQYNSTYRVVSVLTVLHQDWLNGKEYKCKVSNKALPAPIEKTISKAKG

QPREPQVYTLPPSRDELTKNQVSLTCLVKGFYPSDIAVEWESNGQPENNYKTTPPVL

DSDGSFFLYSKLTVDKSRWQQGNVFSCSVMHEALHNHYTQKSLSLSPGK

Human IgG2 constant region, Uniprot: P01859
(SEQ ID NO: 43)
ASTKGPSVFPLAPCSRSTSESTAALGCLVKDYFPEPVTVSWNSGALTSGVHTF

PAVLQSSGLYSLSSVVTVPSSNFGTQTYTCNVDHKPSNTKVDKTVERKCCVECPPCP

APPVAGPSVFLFPPKPKDTLMISRTPEVTCVVVDVSHEDPEVQFNWYVDGVEVHNA

KTKPREEQFNSTFRVVSVLTVVHQDWLNGKEYKCKVSNKGLPAPIEKTISKTKGQPR

EPQVYTLPPSREEMTKNQVSLTCLVKGFYPSDISVEWESNGQPENNYKTTPPMLDSD

GSFFLYSKLTVDKSRWQQGNVFSCSVMHEALHNHYTQKSLSLSPGK

Human IgG3 constant region, Uniprot: P01860
(SEQ ID NO: 44)
ASTKGPSVFPLAPCSRSTSGGTAALGCLVKDYFPEPVTVSWNSGALTSGVHTF

PAVLQSSGLYSLSSVVTVPSSSLGTQTYTCNVNHKPSNTKVDKRVELKTPLGDTTHT

CPRCPEPKSCDTPPPCPRCPEPKSCDTPPPCPRCPEPKSCDTPPPCPRCPAPELLGGPSV

FLFPPKPKDTLMISRTPEVTCVVVDVSHEDPEVQFKWYVDGVEVHNAKTKPREEQY

NSTFRVVSVLTVLHQDWLNGKEYKCKVSNKALPAPIEKTISKTKGQPREPQVYTLPP

SREEMTKNQVSLTCLVKGFYPSDIAVEWESSGQPENNYNTTPPMLDSDGSFFLYSKL

TVDKSRWQQGNIFSCSVMHEALHNRFTQKSLSLSPGK

Human IgM constant region, Uniprot: P01871
(SEQ ID NO: 45)
GSASAPTLFPLVSCENSPSDTSSVAVGCLAQDFLPDSITLSWKYKNNSDISSTR

GFPSVLRGGKYAATSQVLLPSKDVMQGTDEHVVCKVQHPNGNKEKNVPLPVIAELP

PKVSVFVPPRDGFFGNPRKSKLICQATGFSPRQIQVSWLREGKQVGSGVTTDQVQAE

AKESGPTTYKVTSTLTIKESDWLGQSMFTCRVDHRGLTFQQNASSMCVPDQDTAIRV

FAIPPSFASIFLTKSTKLTCLVTDLTTYDSVTISWTRQNGEAVKTHTNISESHPNATFSA

VGEASICEDDWNSGERFTCTVTHTDLPSPLKQTISRPKGVALHRPDVYLLPPAREQLN

LRESATITCLVTGFSPADVFVQWMQRGQPLSPEKYVTSAPMPEPQAPGRYFAHSILT

VSEEEWNTGETYTCVAHEALPNRVTERTVDKSTGKPTLYNVSLVMSDTAGTCY

Human IgG4 constant region, Uniprot: P01861
(SEQ ID NO: 46)
ASTKGPSVFPLAPCSRSTSESTAALGCLVKDYFPEPVTVSWNSGALTSGVHTF

PAVLQSSGLYSLSSVVTVPSSSLGTKTYTCNVDHKPSNTKVDKRVESKYGPPCPSCPA

PEFLGGPSVFLFPPKPKDTLMISRTPEVTCVVVDVSQEDPEVQFNWYVDGVEVHNAK

TKPREEQFNSTYRVVSVLTVLHQDWLNGKEYKCKVSNKGLPSSIEKTISKAKGQPRE

PQVYTLPPSQEEMTKNQVSLTCLVKGFYPSDIAVEWESNGQPENNYKTTPPVLDSDG

SFFLYSRLTVDKSRWQEGNVFSCSVMHEALHNHYTQKSLSLSLGK

Human IgA1 constant region, Uniprot: P01876
(SEQ ID NO: 47)
ASPTSPKVFPLSLCSTQPDGNVVIACLVQGFFPQEPLSVTWSESGQGVTARNFP

PSQDASGDLYTTSSQLTLPATQCLAGKSVTCHVKHYTNPSQDVTVPCPVPSTPPTPSP

STPPTPSPSCCHPRLSLHRPALEDLLLGSEANLTCTLTGLRDASGVTFTWTPSSGKSAV

QGPPERDLCGCYSVSSVLPGCAEPWNHGKTFTCTAAYPESKTPLTATLSKSGNTFRP

EVHLLPPPSEELALNELVTLTCLARGFSPKDVLVRWLQGSQELPREKYLTWASRQEP

SQGTTTFAVTSILRVAAEDWKKGDTFSCMVGHEALPLAFTQKTIDRLAGKPTHVNVS

-continued

VVMAEVDGTCY

Human IgA2 constant region, Uniprot: P01877
(SEQ ID NO: 48)
ASPTSPKVFPLSLDSTPQDGNVVVACLVQGFFPQEPLSVTWSESGQNVTARNF

PPSQDASGDLYTTSSQLTLPATQCPDGKSVTCHVKHYTNPSQDVTVPCPVPPPPPCCH

PRLSLHRPALEDLLLGSEANLTCTLTGLRDASGATFTWTPSSGKSAVQGPPERDLCG

CYSVSSVLPGCAQPWNHGETFTCTAAHPELKTPLTANITKSGNTFRPEVHLLPPPSEE

LALNELVTLTCLARGFSPKDVLVRWLQGSQELPREKYLTWASRQEPSQGTTTFAVTS

ILRVAAEDWKKGDTFSCMVGHEALPLAFTQKTIDRMAGKPTHVNVSVVMAEVDGT

CY

Human Ig kappa constant region, Uniprot: P01834
(SEQ ID NO: 49)
TVAAPSVFIFPPSDEQLKSGTASVVCLLNNFYPREAKVQWKVDNALQSGNSQ

ESVTEQDSKDSTYSLSSTLTLSKADYEKHKVYACEVTHQGLSSPVTKSFNRGEC

In some embodiments, the immunoglobulin-related compositions of the present technology comprise a heavy chain constant region that is at least 80%, at least 85%, at least 90%, at least 95%, at least 99%, or is 100% identical to SEQ ID NOS: 41-48. Additionally or alternatively, in some embodiments, the immunoglobulin-related compositions of the present technology comprise a light chain constant region that is at least 80%, at least 85%, at least 90%, at least 95%, at least 99%, or is 100% identical to SEQ ID NO: 49. In some embodiments, the immunoglobulin-related compositions of the present technology bind to the extracellular domain of DLL3. In some embodiments, the epitope is a conformational epitope.

In another aspect, the present disclosure provides an isolated immunoglobulin-related composition (e.g., an antibody or antigen binding fragment thereof) comprising a heavy chain immunoglobulin variable domain ($V_H$) amino acid sequence comprising SEQ ID NO: 2, SEQ ID NO: 12, SEQ ID NO: 22, SEQ ID NO: 32, or a variant thereof having one or more conservative amino acid substitutions.

Additionally or alternatively, in some embodiments, the immunoglobulin-related compositions of the present technology comprise a light chain immunoglobulin variable domain ($V_L$) amino acid sequence comprising SEQ ID NO: 7, SEQ ID NO: 17, SEQ ID NO: 27, SEQ ID NO: 37, or a variant thereof having one or more conservative amino acid substitutions.

In some embodiments, the immunoglobulin-related compositions of the present technology comprise a heavy chain immunoglobulin variable domain ($V_H$) amino acid sequence and a light chain immunoglobulin variable domain ($V_L$) amino acid sequence selected from the group consisting of: SEQ ID NO: 2 and SEQ ID NO: 7 (7-I1-B); SEQ ID NO: 12 and SEQ ID NO: 17 (2-C8-A); SEQ ID NO: 22 and SEQ ID NO: 27 (10-O18-A); and SEQ ID NO: 32 and SEQ ID NO: 37 (6-G23-F), respectively.

In any of the above embodiments of the immunoglobulin-related compositions, the HC and LC immunoglobulin variable domain sequences form an antigen binding site that binds to the extracellular domain of DLL3. In any of the above embodiments of the immunoglobulin-related compositions, the HC and LC immunoglobulin variable domain sequences form an antigen binding site that binds to DLL3 and promote internalization of the immunoglobulin-related composition. In some embodiments, the epitope is a conformational epitope.

In some embodiments, the HC and LC immunoglobulin variable domain sequences are components of the same polypeptide chain. In other embodiments, the HC and LC immunoglobulin variable domain sequences are components of different polypeptide chains. In certain embodiments, the antibody is a full-length antibody.

In some embodiments, the immunoglobulin-related compositions of the present technology bind specifically to at least one DLL3 polypeptide. In some embodiments, the immunoglobulin-related compositions of the present technology bind at least one DLL3 polypeptide with a dissociation constant ($K_D$) of about $10^{-3}$ M, $10^{-4}$ M, $10^{-5}$ M, $10^{-6}$ M, $10^{-7}$ M, $10^{-8}$ M, $10^{-9}$ M, $10^{-10}$ M, $10^{-11}$ M, or $10^{-12}$ M. In certain embodiments, the immunoglobulin-related compositions are monoclonal antibodies, chimeric antibodies, humanized antibodies, or bispecific antibodies. In some embodiments, the antibodies comprise a human antibody framework region.

In certain embodiments, the immunoglobulin-related composition includes one or more of the following characteristics: (a) a light chain immunoglobulin variable domain sequence that is at least 80%, at least 85%, at least 90%, at least 95%, or at least 99% identical to the light chain immunoglobulin variable domain sequence present in any one of SEQ ID NOs: 7, 17, 27, or 37; and/or (b) a heavy chain immunoglobulin variable domain sequence that is at least 80%, at least 85%, at least 90%, at least 95%, or at least 99% identical to the heavy chain immunoglobulin variable domain sequence present in any one of SEQ ID NOs: 2, 12, 22, or 32. In another aspect, one or more amino acid residues in the immunoglobulin-related compositions provided herein are substituted with another amino acid. The substitution may be a "conservative substitution" as defined herein.

In certain embodiments, the immunoglobulin-related compositions contain an IgG1 constant region comprising one or more amino acid substitutions selected from the group consisting of N297A and K322A. Additionally or alternatively, in some embodiments, the immunoglobulin-related compositions contain an IgG4 constant region comprising a S228P mutation.

In some aspects, the anti-DLL3 immunoglobulin-related compositions described herein contain structural modifications to facilitate rapid binding and cell uptake and/or slow release. In some aspects, the anti-DLL3 immunoglobulin-related composition of the present technology (e.g., an antibody) may contain a deletion in the CH2 constant heavy chain region to facilitate rapid binding and cell uptake and/or slow release. In some aspects, a Fab fragment is used to facilitate rapid binding and cell uptake and/or slow release. In some aspects, a F(ab)′$_2$ fragment is used to facilitate rapid binding and cell uptake and/or slow release.

In one aspect, the present technology provides a nucleic acid sequence encoding any of the immunoglobulin-related compositions described herein. Also disclosed herein are recombinant nucleic acid sequences encoding any of the antibodies described herein. In some embodiments, the nucleic acid sequence is selected from the group consisting of SEQ ID NOs: 1, 6, 11, 16, 21, 26, 31, and 36.

In another aspect, the present technology provides a host cell or expression vector expressing any nucleic acid sequence encoding any of the immunoglobulin-related compositions described herein.

The immunoglobulin-related compositions of the present technology (e.g., an anti-DLL3 antibody) can be monospecific, bispecific, trispecific or of greater multispecificity. Multispecific antibodies can be specific for different epitopes of one or more DLL3 polypeptides or can be specific for both the DLL3 polypeptide(s) as well as for heterologous compositions, such as a heterologous polypeptide or solid support material. See, e.g., WO 93/17715; WO 92/08802; WO 91/00360; WO 92/05793; Tutt et al., *J. Immunol.* 147: 60-69 (1991); U.S. Pat. Nos. 5,573,920, 4,474,893, 5,601,819, 4,714,681, 4,925,648; 6,106,835; Kostelny et al., *J. Immunol.* 148: 1547-1553 (1992). In some embodiments, the immunoglobulin-related compositions are chimeric. In certain embodiments, the immunoglobulin-related compositions are humanized.

The immunoglobulin-related compositions of the present technology can further be recombinantly fused to a heterologous polypeptide at the N- or C-terminus or chemically conjugated (including covalently and non-covalently conjugations) to polypeptides or other compositions. For example, the immunoglobulin-related compositions of the present technology can be recombinantly fused or conjugated to molecules useful as labels in detection assays and effector molecules such as heterologous polypeptides, drugs, or toxins. See, e.g., WO 92/08495; WO 91/14438; WO 89/12624; U.S. Pat. No. 5,314,995; and EP 0 396387.

In any of the above embodiments of the immunoglobulin-related compositions of the present technology, the antibody or antigen binding fragment may be optionally conjugated to an agent selected from the group consisting of isotopes, dyes, chromagens, contrast agents, drugs, toxins, cytokines, enzymes, enzyme inhibitors, hormones, hormone antagonists, growth factors, radionuclides, metals, liposomes, nanoparticles, RNA, DNA or any combination thereof. In some embodiments, the antibody or antigen binding fragment of the present technology may be combined with a pharmaceutically-acceptable carrier. For a chemical bond or physical bond, a functional group on the immunoglobulin-related composition typically associates with a functional group on the agent. Alternatively, a functional group on the agent associates with a functional group on the immunoglobulin-related composition.

The functional groups on the agent and immunoglobulin-related composition can associate directly. For example, a functional group (e.g., a sulfhydryl group) on an agent can associate with a functional group (e.g., sulfhydryl group) on an immunoglobulin-related composition to form a disulfide. Alternatively, the functional groups can associate through a cross-linking agent (i.e., linker). Some examples of cross-linking agents are described below. The cross-linker can be attached to either the agent or the immunoglobulin-related composition. The number of agents or immunoglobulin-related compositions in a conjugate is also limited by the number of functional groups present on the other. For example, the maximum number of agents associated with a conjugate depends on the number of functional groups present on the immunoglobulin-related composition. Alternatively, the maximum number of immunoglobulin-related compositions associated with an agent depends on the number of functional groups present on the agent.

In yet another embodiment, the conjugate comprises one immunoglobulin-related composition associated to one agent. In one embodiment, a conjugate comprises at least one agent chemically bonded (e.g., conjugated) to at least one immunoglobulin-related composition. The agent can be chemically bonded to an immunoglobulin-related composition by any method known to those in the art. For example, a functional group on the agent may be directly attached to a functional group on the immunoglobulin-related composition. Some examples of suitable functional groups include, for example, amino, carboxyl, sulfhydryl, maleimide, isocyanate, isothiocyanate and hydroxyl.

The agent may also be chemically bonded to the immunoglobulin-related composition by means of cross-linking agents, such as dialdehydes, carbodiimides, dimaleimides, and the like. Cross-linking agents can, for example, be obtained from Pierce Biotechnology, Inc., Rockford, Ill. The Pierce Biotechnology, Inc. web-site can provide assistance. Additional cross-linking agents include the platinum cross-linking agents described in U.S. Pat. Nos. 5,580,990; 5,985, 566; and 6,133,038 of Kreatech Biotechnology, B.V., Amsterdam, The Netherlands.

Alternatively, the functional group on the agent and immunoglobulin-related composition can be the same. Homobifunctional cross-linkers are typically used to cross-link identical functional groups. Examples of homobifunctional cross-linkers include EGS (i.e., ethylene glycol bis [succinimidylsuccinate]), DSS (i.e., disuccinimidyl suberate), DMA (i.e., dimethyl adipimidate.2HCl), DTSSP (i.e., 3,3′-dithiobis[sulfosuccinimidylpropionate])), DPDPB (i.e., 1,4-di-[3′-(2′-pyridyldithio)-propionamido]butane), and BMH (i.e., bis-maleimidohexane). Such homobifunctional cross-linkers are also available from Pierce Biotechnology, Inc.

In other instances, it may be beneficial to cleave the agent from the immunoglobulin-related composition. The web-site of Pierce Biotechnology, Inc. described above can also provide assistance to one skilled in the art in choosing suitable cross-linkers which can be cleaved by, for example, enzymes in the cell. Thus the agent can be separated from the immunoglobulin-related composition. Examples of cleavable linkers include SMPT (i.e., 4-succinimidyloxycarbonyl-methyl-a-[2-pyridyldithio]toluene), Sulfo-LC-SPDP (i.e., sulfosuccinimidyl 6-(3-[2-pyridyldithio]-propionamido)hexanoate), LC-SPDP (i.e., succinimidyl 6-(3-[2-pyridyldithio]-propionamido)hexanoate), Sulfo-LC-SPDP (i.e., sulfosuccinimidyl 6-(3-[2-pyridyldithio]-propionamido)hexanoate), SPDP (i.e., N-succinimidyl 3-[2-pyridyldithio]-propionamidohexanoate), and AEDP (i.e., 3-[(2-aminoethyl)dithio]propionic acid HCl).

In another embodiment, a conjugate comprises at least one agent physically bonded with at least one immunoglobulin-related composition. Any method known to those in the art can be employed to physically bond the agents with the immunoglobulin-related compositions. For example, the immunoglobulin-related compositions and agents can be mixed together by any method known to those in the art. The order of mixing is not important. For instance, agents can be physically mixed with immunoglobulin-related compositions by any method known to those in the art. For example, the immunoglobulin-related compositions and agents can be placed in a container and agitated, by for example, shaking the container, to mix the immunoglobulin-related compositions and agents.

The immunoglobulin-related compositions can be modified by any method known to those in the art. For instance, the immunoglobulin-related composition may be modified by means of cross-linking agents or functional groups, as described above.

A. Methods of Preparing Anti-DLL3 Antibodies of the Present Technology

General Overview. Initially, a target polypeptide is chosen to which an antibody of the present technology can be raised. For example, an antibody may be raised against the full-length DLL3 protein, or to a portion of the extracellular domain of the DLL3 protein. Techniques for generating antibodies directed to such target polypeptides are well known to those skilled in the art. Examples of such techniques include, for example, but are not limited to, those involving display libraries, xeno or human mice, hybridomas, and the like. Target polypeptides within the scope of the present technology include any polypeptide derived from DLL3 protein containing the extracellular domain which is capable of eliciting an immune response.

It should be understood that recombinantly engineered antibodies and antibody fragments, e.g., antibody-related polypeptides, which are directed to DLL3 protein and fragments thereof are suitable for use in accordance with the present disclosure.

Anti-DLL3 antibodies that can be subjected to the techniques set forth herein include monoclonal and polyclonal antibodies, and antibody fragments such as Fab, Fab', F(ab')$_2$, Fd, scFv, diabodies, antibody light chains, antibody heavy chains and/or antibody fragments. Methods useful for the high yield production of antibody Fv-containing polypeptides, e.g., Fab' and F(ab')$_2$ antibody fragments have been described. See U.S. Pat. No. 5,648,237.

Generally, an antibody is obtained from an originating species. More particularly, the nucleic acid or amino acid sequence of the variable portion of the light chain, heavy chain or both, of an originating species antibody having specificity for a target polypeptide antigen is obtained. An originating species is any species which was useful to generate the antibody of the present technology or library of antibodies, e.g., rat, mouse, rabbit, chicken, monkey, human, and the like.

Phage or phagemid display technologies are useful techniques to derive the antibodies of the present technology. Techniques for generating and cloning monoclonal antibodies are well known to those skilled in the art. Expression of sequences encoding antibodies of the present technology, can be carried out in *E. coli*.

Due to the degeneracy of nucleic acid coding sequences, other sequences which encode substantially the same amino acid sequences as those of the naturally occurring proteins may be used in the practice of the present technology These include, but are not limited to, nucleic acid sequences including all or portions of the nucleic acid sequences encoding the above polypeptides, which are altered by the substitution of different codons that encode a functionally equivalent amino acid residue within the sequence, thus producing a silent change. It is appreciated that the nucleotide sequence of an immunoglobulin according to the present technology tolerates sequence homology variations of up to 25% as calculated by standard methods ("Current Methods in Sequence Comparison and Analysis," *Macromolecule Sequencing and Synthesis, Selected Methods and Applications*, pp. 127-149, 1998, Alan R. Liss, Inc.) so long as such a variant forms an operative antibody which recognizes DLL3 proteins. For example, one or more amino acid residues within a polypeptide sequence can be substituted by another amino acid of a similar polarity which acts as a functional equivalent, resulting in a silent alteration. Substitutes for an amino acid within the sequence may be selected from other members of the class to which the amino acid belongs. For example, the nonpolar (hydrophobic) amino acids include alanine, leucine, isoleucine, valine, proline, phenylalanine, tryptophan and methionine. The polar neutral amino acids include glycine, serine, threonine, cysteine, tyrosine, asparagine, and glutamine. The positively charged (basic) amino acids include arginine, lysine and histidine. The negatively charged (acidic) amino acids include aspartic acid and glutamic acid. Also included within the scope of the present technology are proteins or fragments or derivatives thereof which are differentially modified during or after translation, e.g., by glycosylation, proteolytic cleavage, linkage to an antibody molecule or other cellular ligands, etc. Additionally, an immunoglobulin encoding nucleic acid sequence can be mutated in vitro or in vivo to create and/or destroy translation, initiation, and/or termination sequences or to create variations in coding regions and/or form new restriction endonuclease sites or destroy pre-existing ones, to facilitate further in vitro modification. Any technique for mutagenesis known in the art can be used, including but not limited to in vitro site directed mutagenesis, *J. Biol. Chem.* 253:6551, use of Tab linkers (Pharmacia), and the like.

Preparation of Polyclonal Antisera and Immunogens. Methods of generating antibodies or antibody fragments of the present technology typically include immunizing a subject (generally a non-human subject such as a mouse or rabbit) with a purified DLL3 protein or fragment thereof or with a cell expressing the DLL3 protein or fragment thereof. An appropriate immunogenic preparation can contain, e.g., a recombinantly-expressed DLL3 protein or a chemically-synthesized DLL3 peptide. The extracellular domain of the DLL3 protein, or a portion or fragment thereof, can be used as an immunogen to generate an anti-DLL3 antibody that binds to the DLL3 protein, or a portion or fragment thereof using standard techniques for polyclonal and monoclonal antibody preparation.

The full-length DLL3 protein or fragments thereof, are useful as fragments as immunogens. In some embodiments, a DLL3 fragment comprises the extracellular domain of DLL3 such that an antibody raised against the peptide forms a specific immune complex with DLL3 protein.

The extracellular domain of DLL3 is 466 amino acids in length, spanning amino acids 27-492 of the full length DLL3 protein. In some embodiments, the antigenic DLL3 peptide comprises at least 5, 8, 10, 15, 20, 30, 40, 50, 60, 70, 80, 90, 100, 150, 200, 250, 300, 350, 400, or 450 amino acid residues. Longer antigenic peptides are sometimes desirable over shorter antigenic peptides, depending on use and according to methods well known to those skilled in the art. Multimers of a given epitope are sometimes more effective than a monomer.

If needed, the immunogenicity of the DLL3 protein (or fragment thereof) can be increased by fusion or conjugation to a carrier protein such as keyhole limpet hemocyanin (KLH) or ovalbumin (OVA). Many such carrier proteins are known in the art. One can also combine the DLL3 protein with a conventional adjuvant such as Freund's complete or incomplete adjuvant to increase the subject's immune reaction to the polypeptide. Various adjuvants used to increase the immunological response include, but are not limited to, Freund's (complete and incomplete), mineral gels (e.g., aluminum hydroxide), surface active substances (e.g., lysolecithin, pluronic polyols, polyanions, peptides, oil emulsions, dinitrophenol, etc.), human adjuvants such as Bacille Calmette-Guerin and *Corynebacterium parvum*, or similar immunostimulatory compounds. These techniques are standard in the art.

In describing the present technology, immune responses may be described as either "primary" or "secondary" immune responses. A primary immune response, which is also described as a "protective" immune response, refers to an immune response produced in an individual as a result of some initial exposure (e.g., the initial "immunization") to a particular antigen, e.g., DLL3 protein. In some embodiments, the immunization can occur as a result of vaccinating the individual with a vaccine containing the antigen. For example, the vaccine can be a DLL3 vaccine comprising one or more DLL3 protein-derived antigens. A primary immune response can become weakened or attenuated over time and can even disappear or at least become so attenuated that it cannot be detected. Accordingly, the present technology also relates to a "secondary" immune response, which is also described here as a "memory immune response." The term secondary immune response refers to an immune response elicited in an individual after a primary immune response has already been produced.

Thus, a secondary immune response can be elicited, e.g., to enhance an existing immune response that has become weakened or attenuated, or to recreate a previous immune response that has either disappeared or can no longer be detected. The secondary or memory immune response can be either a humoral (antibody) response or a cellular response. A secondary or memory humoral response occurs upon stimulation of memory B cells that were generated at the first presentation of the antigen. Delayed type hypersensitivity (DTH) reactions are a type of cellular secondary or memory immune response that are mediated by $CD4^+$ T cells. A first exposure to an antigen primes the immune system and additional exposure(s) results in a DTH.

Following appropriate immunization, the anti-DLL3 antibody can be prepared from the subject's serum. If desired, the antibody molecules directed against the DLL3 protein can be isolated from the mammal (e.g., from the blood) and further purified by well-known techniques, such as polypeptide A chromatography to obtain the IgG fraction.

Monoclonal Antibody. In one embodiment of the present technology, the antibody is an anti-DLL3 monoclonal antibody. For example, in some embodiments, the anti-DLL3 monoclonal antibody may be a human or a mouse anti-DLL3 monoclonal antibody. For preparation of monoclonal antibodies directed towards the DLL3 protein, or derivatives, fragments, analogs or homologs thereof, any technique that provides for the production of antibody molecules by continuous cell line culture can be utilized. Such techniques include, but are not limited to, the hybridoma technique (See, e.g., Kohler & Milstein, 1975. *Nature* 256: 495-497); the trioma technique; the human B-cell hybridoma technique (See, e.g., Kozbor, et al., 1983. *Immunol. Today* 4: 72) and the EBV hybridoma technique to produce human monoclonal antibodies (See, e.g., Cole, et al., 1985. In: MONOCLONAL ANTIBODIES AND CANCER THERAPY, Alan R. Liss, Inc., pp. 77-96). Human monoclonal antibodies can be utilized in the practice of the present technology and can be produced by using human hybridomas (See, e.g., Cote, et al., 1983. *Proc. Natl. Acad. Sci. USA* 80: 2026-2030) or by transforming human B-cells with Epstein Barr Virus in vitro (See, e.g., Cole, et al., 1985. In: MONOCLONAL ANTIBODIES AND CANCER THERAPY, Alan R. Liss, Inc., pp. 77-96). For example, a population of nucleic acids that encode regions of antibodies can be isolated. PCR utilizing primers derived from sequences encoding conserved regions of antibodies is used to amplify sequences encoding portions of antibodies from the population and then DNAs encoding antibodies or fragments thereof, such as variable domains, are reconstructed from the amplified sequences. Such amplified sequences also can be fused to DNAs encoding other proteins—e.g., a bacteriophage coat, or a bacterial cell surface protein—for expression and display of the fusion polypeptides on phage or bacteria. Amplified sequences can then be expressed and further selected or isolated based, e.g., on the affinity of the expressed antibody or fragment thereof for an antigen or epitope present on the DLL3 protein. Alternatively, hybridomas expressing anti-DLL3 monoclonal antibodies can be prepared by immunizing a subject and then isolating hybridomas from the subject's spleen using routine methods. See, e.g., Milstein et al., (Galfre and Milstein, *Methods Enzymol* (1981) 73: 3-46). Screening the hybridomas using standard methods will produce monoclonal antibodies of varying specificity (i.e., for different epitopes) and affinity. A selected monoclonal antibody with the desired properties, e.g., DLL3 binding, can be used as expressed by the hybridoma, it can be bound to a molecule such as polyethylene glycol (PEG) to alter its properties, or a cDNA encoding it can be isolated, sequenced and manipulated in various ways. Synthetic dendromeric trees can be added to reactive amino acid side chains, e.g., lysine, to enhance the immunogenic properties of DLL3 protein. Also, CPG-dinucleotide techniques can be used to enhance the immunogenic properties of the DLL3 protein. Other manipulations include substituting or deleting particular amino acyl residues that contribute to instability of the antibody during storage or after administration to a subject, and affinity maturation techniques to improve affinity of the antibody of the DLL3 protein.

Hybridoma Technique. In some embodiments, the antibody of the present technology is an anti-DLL3 monoclonal antibody produced by a hybridoma which includes a B cell obtained from a transgenic non-human animal, e.g., a transgenic mouse, having a genome comprising a human heavy chain transgene and a light chain transgene fused to an immortalized cell. Hybridoma techniques include those known in the art and taught in Harlow et al., *Antibodies: A Laboratory Manual* Cold Spring Harbor Laboratory, Cold Spring Harbor, NY, 349 (1988); Hammerling et al., *Monoclonal Antibodies And T-Cell Hybridomas*, 563-681 (1981). Other methods for producing hybridomas and monoclonal antibodies are well known to those of skill in the art.

Phage Display Technique. As noted above, the antibodies of the present technology can be produced through the application of recombinant DNA and phage display technology. For example, anti-DLL3 antibodies, can be prepared using various phage display methods known in the art. In phage display methods, functional antibody domains are displayed on the surface of a phage particle which carries polynucleotide sequences encoding them. Phages with a desired binding property are selected from a repertoire or combinatorial antibody library (e.g., human or murine) by selecting directly with an antigen, typically an antigen bound or captured to a solid surface or bead. Phages used in these methods are typically filamentous phage including fd and M13 with Fab, Fv or disulfide stabilized Fv antibody domains that are recombinantly fused to either the phage gene III or gene VIII protein. In addition, methods can be adapted for the construction of Fab expression libraries (See, e.g., Huse, et al., *Science* 246: 1275-1281, 1989) to allow rapid and effective identification of monoclonal Fab fragments with the desired specificity for a DLL3 polypeptide, e.g., a polypeptide or derivatives, fragments, analogs or homologs thereof. Other examples of phage display methods that can be used to make the antibodies of the present technology include those disclosed in Huston et al., *Proc. Natl. Acad. Sci U.S.A.*, 85: 5879-5883, 1988; Chaudhary et al., *Proc. Natl. Acad. Sci U.S.A.*, 87: 1066-1070, 1990; Brinkman et al., *J. Immunol. Methods* 182: 41-50, 1995; Ames et al., *J. Immunol. Methods* 184: 177-186, 1995; Kettleborough et al., *Eur. J. Immunol.* 24: 952-958, 1994; Persic et al., *Gene* 187: 9-18, 1997; Burton et al., *Advances in Immunology* 57: 191-280, 1994; PCT/GB91/01134; WO 90/02809; WO 91/10737; WO 92/01047; WO 92/18619; WO 93/11236; WO 95/15982; WO 95/20401; WO 96/06213; WO 92/01047 (Medical Research Council et al.); WO 97/08320 (Morphosys); WO 92/01047 (CAT/MRC); WO 91/17271 (Affymax); and U.S. Pat. Nos. 5,698,426, 5,223,409, 5,403,484, 5,580,717, 5,427,908, 5,750,753, 5,821,047, 5,571,698, 5,427,908, 5,516,637, 5,780,225, 5,658,727 and 5,733,743. Methods useful for displaying polypeptides on the surface of bacteriophage particles by attaching the polypeptides via disulfide bonds have been described by Lohning, U.S. Pat. No. 6,753,136. As described in the above references, after phage selection, the antibody coding regions from the phage can be isolated and used to generate whole antibodies, including human antibodies, or any other desired antigen binding fragment, and expressed in any desired host including mammalian cells, insect cells, plant cells, yeast, and bacteria. For example, techniques to recombinantly produce Fab, Fab' and F(ab')$_2$ fragments can also be employed using methods known in the art such as those disclosed in WO 92/22324; Mullinax et al., *BioTechniques* 12: 864-869, 1992; and Sawai et al., *AJRI* 34: 26-34, 1995; and Better et al., *Science* 240: 1041-1043, 1988.

Generally, hybrid antibodies or hybrid antibody fragments that are cloned into a display vector can be selected against the appropriate antigen in order to identify variants that maintain good binding activity, because the antibody or antibody fragment will be present on the surface of the phage or phagemid particle. See, e.g., Barbas III et al., *Phage Display, A Laboratory Manual* (Cold Spring Harbor Laboratory Press, Cold Spring Harbor, N.Y., 2001). However, other vector formats could be used for this process, such as cloning the antibody fragment library into a lytic phage vector (modified T7 or Lambda Zap systems) for selection and/or screening.

Expression of Recombinant Anti-DLL3 Antibodies. As noted above, the antibodies of the present technology can be produced through the application of recombinant DNA technology. Recombinant polynucleotide constructs encoding an anti-DLL3 antibody of the present technology typically include an expression control sequence operably-linked to the coding sequences of anti-DLL3 antibody chains, including naturally-associated or heterologous promoter regions. As such, another aspect of the technology includes vectors containing one or more nucleic acid sequences encoding an anti-DLL3 antibody of the present technology. For recombinant expression of one or more of the polypeptides of the present technology, the nucleic acid containing all or a portion of the nucleotide sequence encoding the anti-DLL3 antibody is inserted into an appropriate cloning vector, or an expression vector (i.e., a vector that contains the necessary elements for the transcription and translation of the inserted polypeptide coding sequence) by recombinant DNA techniques well known in the art and as detailed below. Methods for producing diverse populations of vectors have been described by Lerner et al., U.S. Pat. Nos. 6,291,160 and 6,680,192.

In general, expression vectors useful in recombinant DNA techniques are often in the form of plasmids. In the present disclosure, "plasmid" and "vector" can be used interchangeably as the plasmid is the most commonly used form of vector. However, the present technology is intended to include such other forms of expression vectors that are not technically plasmids, such as viral vectors (e.g., replication defective retroviruses, adenoviruses and adeno-associated viruses), which serve equivalent functions. Such viral vectors permit infection of a subject and expression of a construct in that subject. In some embodiments, the expression control sequences are eukaryotic promoter systems in vectors capable of transforming or transfecting eukaryotic host cells. Once the vector has been incorporated into the appropriate host, the host is maintained under conditions suitable for high level expression of the nucleotide sequences encoding the anti-DLL3 antibody, and the collection and purification of the anti-DLL3 antibody, e.g., cross-reacting anti-DLL3 antibodies. See generally, U.S. 2002/0199213. These expression vectors are typically replicable in the host organisms either as episomes or as an integral part of the host chromosomal DNA. Commonly, expression vectors contain selection markers, e.g., ampicillin-resistance or hygromycin-resistance, to permit detection of those cells transformed with the desired DNA sequences. Vectors can also encode signal peptide, e.g., pectate lyase, useful to direct the secretion of extracellular antibody fragments. See U.S. Pat. No. 5,576,195.

The recombinant expression vectors of the present technology comprise a nucleic acid encoding a protein with DLL3 binding properties in a form suitable for expression of the nucleic acid in a host cell, which means that the recombinant expression vectors include one or more regulatory sequences, selected on the basis of the host cells to be used for expression that is operably-linked to the nucleic acid sequence to be expressed. Within a recombinant expression vector, "operably-linked" is intended to mean that the nucleotide sequence of interest is linked to the regulatory sequence(s) in a manner that allows for expression of the nucleotide sequence (e.g., in an in vitro transcription/translation system or in a host cell when the vector is introduced into the host cell). The term "regulatory sequence" is intended to include promoters, enhancers and other expression control elements (e.g., polyadenylation signals). Such regulatory sequences are described, e.g., in Goeddel, GENE EXPRESSION TECHNOLOGY: METHODS IN ENZYMOLOGY 185, Academic Press, San Diego, Calif. (1990). Regulatory sequences include those that direct constitutive expression of a nucleotide sequence in many types of host cell and those that direct expression of the nucleotide sequence only in certain host cells (e.g., tissue-specific regulatory sequences). It will be appreciated by those skilled in the art that the design of the expression vector can depend on such factors as the choice of the host cell to be transformed, the level of expression of polypeptide desired, etc. Typical regulatory sequences useful as promoters of recombinant polypeptide expression (e.g., anti-DLL3 antibody), include, e.g., but are not limited to, promoters of 3-phosphoglycerate kinase and other glycolytic enzymes. Inducible yeast promoters include, among others, promoters from alcohol dehydrogenase, isocytochrome C, and enzymes responsible for maltose and galactose utilization. In one embodiment, a polynucleotide encoding an anti-DLL3 antibody of the present technology is operably-linked to an ara B promoter and expressible in a host cell. See U.S. Pat. No. 5,028,530. The expression vectors of the present technology can be introduced into host cells to thereby produce polypeptides or peptides, including fusion polypeptides, encoded by nucleic acids as described herein (e.g., anti-DLL3 antibody, etc.).

Another aspect of the present technology pertains to anti-DLL3 antibody-expressing host cells, which contain a nucleic acid encoding one or more anti-DLL3 antibodies. The recombinant expression vectors of the present technology can be designed for expression of an anti-DLL3 antibody in prokaryotic or eukaryotic cells. For example, an anti-DLL3 antibody can be expressed in bacterial cells such as Escherichia coli, insect cells (using baculovirus expression vectors), fungal cells, e.g., yeast, yeast cells or mammalian cells. Suitable host cells are discussed further in Goeddel, GENE EXPRESSION TECHNOLOGY: METHODS IN ENZYMOLOGY 185, Academic Press, San Diego, Calif. (1990). Alternatively, the recombinant expression vector can be transcribed and translated in vitro, e.g., using T7 promoter regulatory sequences and T7 polymerase. Methods useful for the preparation and screening of polypeptides having a predetermined property, e.g., anti-DLL3 antibody, via expression of stochastically generated polynucleotide sequences has been previously described. See U.S. Pat. Nos. 5,763,192; 5,723,323; 5,814,476; 5,817,483; 5,824,514; 5,976,862; 6,492,107; 6,569,641.

Expression of polypeptides in prokaryotes is most often carried out in E. coli with vectors containing constitutive or inducible promoters directing the expression of either fusion or non-fusion polypeptides. Fusion vectors add a number of amino acids to a polypeptide encoded therein, usually to the amino terminus of the recombinant polypeptide. Such fusion vectors typically serve three purposes: (i) to increase expression of recombinant polypeptide; (ii) to increase the solubility of the recombinant polypeptide; and (iii) to aid in the purification of the recombinant polypeptide by acting as a ligand in affinity purification. Often, in fusion expression vectors, a proteolytic cleavage site is introduced at the junction of the fusion moiety and the recombinant polypeptide to enable separation of the recombinant polypeptide from the fusion moiety subsequent to purification of the fusion polypeptide. Such enzymes, and their cognate recognition sequences, include Factor Xa, thrombin and enterokinase. Typical fusion expression vectors include pGEX (Pharmacia Biotech Inc; Smith and Johnson, 1988. *Gene* 67: 31-40), pMAL (New England Biolabs, Beverly, Mass.) and pRIT5 (Pharmacia, Piscataway, N.J.) that fuse glutathione S-transferase (GST), maltose E binding polypeptide, or polypeptide A, respectively, to the target recombinant polypeptide.

Examples of suitable inducible non-fusion E. coli expression vectors include pTrc (Amrann et al., (1988) *Gene* 69: 301-315) and pET 11d (Studier et al., GENE EXPRESSION TECHNOLOGY: METHODS IN ENZYMOLOGY 185, Academic Press, San Diego, Calif. (1990) 60-89). Methods for targeted assembly of distinct active peptide or protein domains to yield multifunctional polypeptides via polypeptide fusion has been described by Pack et al., U.S. Pat. Nos. 6,294,353; 6,692,935. One strategy to maximize recombinant polypeptide expression, e.g., an anti-DLL3 antibody, in E. coli is to express the polypeptide in host bacteria with an impaired capacity to proteolytically cleave the recombinant polypeptide. See, e.g., Gottesman, GENE EXPRESSION TECHNOLOGY: METHODS IN ENZYMOLOGY 185, Academic Press, San Diego, Calif. (1990) 119-128. Another strategy is to alter the nucleic acid sequence of the nucleic acid to be inserted into an expression vector so that the individual codons for each amino acid are those preferentially utilized in the expression host, e.g., E. coli (See, e.g., Wada, et al., 1992. *Nucl. Acids Res.* 20: 2111-2118). Such alteration of nucleic acid sequences of the present technology can be carried out by standard DNA synthesis techniques.

In another embodiment, the anti-DLL3 antibody expression vector is a yeast expression vector. Examples of vectors for expression in yeast *Saccharomyces cerevisiae* include pYepSec1 (Baldari, et al., 1987. *EMBO J.* 6: 229-234), pMFa (Kurjan and Herskowitz, Cell 30: 933-943, 1982), pJRY88 (Schultz et al., *Gene* 54: 113-123, 1987), pYES2 (Invitrogen Corporation, San Diego, Calif.), and picZ (Invitrogen Corp, San Diego, Calif.). Alternatively, an anti-DLL3 antibody can be expressed in insect cells using baculovirus expression vectors. Baculovirus vectors available for expression of polypeptides, e.g., anti-DLL3 antibody, in cultured insect cells (e.g., SF9 cells) include the pAc series (Smith, et al., *Mol. Cell. Biol.* 3: 2156-2165, 1983) and the pVL series (Lucklow and Summers, 1989. *Virology* 170: 31-39).

In yet another embodiment, a nucleic acid encoding an anti-DLL3 antibody of the present technology is expressed in mammalian cells using a mammalian expression vector. Examples of mammalian expression vectors include, e.g., but are not limited to, pCDM8 (Seed, *Nature* 329: 840, 1987) and pMT2PC (Kaufman, et al., *EMBO J.* 6: 187-195, 1987). When used in mammalian cells, the expression vector's control functions are often provided by viral regulatory elements. For example, commonly used promoters are derived from polyoma, adenovirus 2, cytomegalovirus, and simian virus 40. For other suitable expression systems for both prokaryotic and eukaryotic cells that are useful for expression of the anti-DLL3 antibody of the present technology, see, e.g., Chapters 16 and 17 of Sambrook, et al., MOLECULAR CLONING: A LABORATORY MANUAL. 2nd ed., Cold Spring Harbor Laboratory, Cold Spring Harbor Laboratory Press, Cold Spring Harbor, N.Y., 1989.

In another embodiment, the recombinant mammalian expression vector is capable of directing expression of the nucleic acid in a particular cell type (e.g., tissue-specific regulatory elements). Tissue-specific regulatory elements are known in the art. Non-limiting examples of suitable tissue-specific promoters include the albumin promoter (liver-specific; Pinkert, et al., *Genes Dev.* 1: 268-277, 1987), lymphoid-specific promoters (Calame and Eaton, *Adv. Immunol.* 43: 235-275, 1988), promoters of T cell receptors (Winoto and Baltimore, *EMBO J.* 8: 729-733, 1989) and immunoglobulins (Banerji, et al., 1983. *Cell* 33: 729-740; Queen and Baltimore, Cell 33: 741-748, 1983.), neuron-specific promoters (e.g., the neurofilament promoter; Byrne and Ruddle, *Proc. Natl. Acad. Sci. USA* 86: 5473-5477, 1989), pancreas-specific promoters (Edlund, et al., 1985. *Science* 230: 912-916), and mammary gland-specific promoters (e.g., milk whey promoter; U.S. Pat. No. 4,873,316 and European Application Publication No. 264,166). Developmentally-regulated promoters are also encompassed, e.g., the murine hox promoters (Kessel and Gruss, *Science* 249: 374-379, 1990) and the α-fetoprotein promoter (Campes and Tilghman, *Genes Dev.* 3: 537-546, 1989).

Another aspect of the present methods pertains to host cells into which a recombinant expression vector of the present technology has been introduced. The terms "host cell" and "recombinant host cell" are used interchangeably herein. It is understood that such terms refer not only to the particular subject cell but also to the progeny or potential progeny of such a cell. Because certain modifications may occur in succeeding generations due to either mutation or environmental influences, such progeny may not, in fact, be identical to the parent cell, but are still included within the scope of the term as used herein.

A host cell can be any prokaryotic or eukaryotic cell. For example, an anti-DLL3 antibody can be expressed in bacterial cells such as *E. coli*, insect cells, yeast or mammalian cells. Mammalian cells are a suitable host for expressing nucleotide segments encoding immunoglobulins or fragments thereof. See Winnacker, *From Genes To Clones*, (VCH Publishers, N Y, 1987). A number of suitable host cell lines capable of secreting intact heterologous proteins have been developed in the art, and include Chinese hamster ovary (CHO) cell lines, various COS cell lines, HeLa cells, L cells and myeloma cell lines. In some embodiments, the cells are non-human. Expression vectors for these cells can include expression control sequences, such as an origin of replication, a promoter, an enhancer, and necessary processing information sites, such as ribosome binding sites, RNA splice sites, polyadenylation sites, and transcriptional terminator sequences. Queen et al., *Immunol. Rev.* 89: 49, 1986. Illustrative expression control sequences are promoters derived from endogenous genes, cytomegalovirus, SV40, adenovirus, bovine papillomavirus, and the like. Co et al., *J Immunol.* 148: 1149, 1992. Other suitable host cells are known to those skilled in the art.

Vector DNA can be introduced into prokaryotic or eukaryotic cells via conventional transformation or transfection techniques. As used herein, the terms "transformation" and "transfection" are intended to refer to a variety of art-recognized techniques for introducing foreign nucleic acid (e.g., DNA) into a host cell, including calcium phosphate or calcium chloride co-precipitation, DEAE-dextran-mediated transfection, lipofection, electroporation, biolistics or viral-based transfection. Other methods used to transform mammalian cells include the use of polybrene, protoplast fusion, liposomes, electroporation, and microinjection (See generally, Sambrook et al., *Molecular Cloning*). Suitable methods for transforming or transfecting host cells can be found in Sambrook, et al. (MOLECULAR CLONING: A LABORATORY MANUAL. 2nd ed., Cold Spring Harbor Laboratory, Cold Spring Harbor Laboratory Press, Cold Spring Harbor, N.Y., 1989), and other laboratory manuals. The vectors containing the DNA segments of interest can be transferred into the host cell by well-known methods, depending on the type of cellular host.

For stable transfection of mammalian cells, it is known that, depending upon the expression vector and transfection technique used, only a small fraction of cells may integrate the foreign DNA into their genome. In order to identify and select these integrants, a gene that encodes a selectable marker (e.g., resistance to antibiotics) is generally introduced into the host cells along with the gene of interest. Various selectable markers include those that confer resistance to drugs, such as G418, hygromycin and methotrexate. Nucleic acid encoding a selectable marker can be introduced into a host cell on the same vector as that encoding the anti-DLL3 antibody or can be introduced on a separate vector. Cells stably transfected with the introduced nucleic acid can be identified by drug selection (e.g., cells that have incorporated the selectable marker gene will survive, while the other cells die).

A host cell that includes an anti-DLL3 antibody of the present technology, such as a prokaryotic or eukaryotic host cell in culture, can be used to produce (i.e., express) recombinant anti-DLL3 antibody. In one embodiment, the method comprises culturing the host cell (into which a recombinant expression vector encoding the anti-DLL3 antibody has been introduced) in a suitable medium such that the anti-DLL3 antibody is produced. In another embodiment, the method further comprises the step of isolating the anti-DLL3 antibody from the medium or the host cell. Once expressed, collections of the anti-DLL3 antibody, e.g., the anti-DLL3 antibodies or the anti-DLL3 antibody-related polypeptides are purified from culture media and host cells. The anti-DLL3 antibody can be purified according to standard procedures of the art, including HPLC purification, column chromatography, gel electrophoresis and the like. In one embodiment, the anti-DLL3 antibody is produced in a host organism by the method of Boss et al., U.S. Pat. No. 4,816,397. Usually, anti-DLL3 antibody chains are expressed with signal sequences and are thus released to the culture media. However, if the anti-DLL3 antibody chains are not naturally secreted by host cells, the anti-DLL3 antibody chains can be released by treatment with mild detergent. Purification of recombinant polypeptides is well known in the art and includes ammonium sulfate precipitation, affinity chromatography purification technique, column chromatography, ion exchange purification technique, gel electrophoresis and the like (See generally Scopes, Protein Purification (Springer-Verlag, N.Y., 1982).

Polynucleotides encoding anti-DLL3 antibodies, e.g., the anti-DLL3 antibody coding sequences, can be incorporated in transgenes for introduction into the genome of a transgenic animal and subsequent expression in the milk of the transgenic animal. See, e.g., U.S. Pat. Nos. 5,741,957, 5,304,489, and 5,849,992. Suitable transgenes include coding sequences for light and/or heavy chains in operable linkage with a promoter and enhancer from a mammary gland specific gene, such as casein or β-lactoglobulin. For production of transgenic animals, transgenes can be microinjected into fertilized oocytes, or can be incorporated into the genome of embryonic stem cells, and the nuclei of such cells transferred into enucleated oocytes.

Single-Chain Antibodies. In one embodiment, the anti-DLL3 antibody of the present technology is a single-chain anti-DLL3 antibody. According to the present technology, techniques can be adapted for the production of single-chain antibodies specific to a DLL3 protein (See, e.g., U.S. Pat. No. 4,946,778). Examples of techniques which can be used to produce single-chain Fvs and antibodies of the present technology include those described in U.S. Pat. Nos. 4,946,778 and 5,258,498; Huston et al., *Methods in Enzymology*, 203: 46-88, 1991; Shu, L. et al., *Proc. Natl. Acad. Sci. USA*, 90: 7995-7999, 1993; and Skerra et al., *Science* 240: 1038-1040, 1988.

Chimeric and Humanized Antibodies. In one embodiment, the anti-DLL3 antibody of the present technology is a chimeric anti-DLL3 antibody. In one embodiment, the anti-DLL3 antibody of the present technology is a humanized anti-DLL3 antibody. In one embodiment of the present technology, the donor and acceptor antibodies are monoclonal antibodies from different species. For example, the acceptor antibody is a human antibody (to minimize its antigenicity in a human), in which case the resulting CDR-grafted antibody is termed a "humanized" antibody.

Recombinant anti-DLL3 antibodies, such as chimeric and humanized monoclonal antibodies, comprising both human and non-human portions, can be made using standard recombinant DNA techniques, and are within the scope of the present technology. For some uses, including in vivo use of the anti-DLL3 antibody of the present technology in humans as well as use of these agents in in vitro detection assays, it is possible to use chimeric or humanized anti-DLL3 antibodies. Such chimeric and humanized monoclonal antibodies can be produced by recombinant DNA techniques known in the art. Such useful methods include, e.g., but are not limited to, methods described in International Application No. PCT/US86/02269; U.S. Pat. No. 5,225,539; European Patent No. 184187; European Patent No. 171496; European Patent No. 173494; PCT International Publication No. WO 86/01533; U.S. Pat. Nos. 4,816,567; 5,225,539; European Patent No. 125023; Better, et al., 1988. *Science* 240: 1041-1043; Liu, et al., 1987. *Proc. Nat. Acad Sci. USA* 84: 3439-3443; Liu, et al., 1987. *J. Immunol.* 139: 3521-3526; Sun, et al., 1987. *Proc. Natl. Acad Sci. USA* 84: 214-218; Nishimura, et al., 1987. *Cancer Res.* 47: 999-1005; Wood, et al., 1985. *Nature* 314: 446-449; Shaw et al., 1988. *J. Natl. Cancer Inst.* 80: 1553-1559; Morrison (1985) *Science* 229: 1202-1207; Oi, et al. (1986) *BioTechniques* 4: 214; Jones, et al., 1986. *Nature* 321: 552-525; Verhoeyan, et al., 1988. *Science* 239: 1534; Morrison, *Science* 229: 1202, 1985; Oi et al., *BioTechniques* 4: 214, 1986; Gillies et al., *J Immunol. Methods,* 125: 191-202, 1989; U.S. Pat. No. 5,807,715; and Beidler, et al., 1988. *J. Immunol.* 141: 4053-4060. For example, antibodies can be humanized using a variety of techniques including CDR-grafting (EP 0 239 400; WO 91/09967; U.S. Pat. Nos. 5,530,101; 5,585,089; 5,859,205; 6,248,516; EP460167), veneering or resurfacing (EP 0 592 106; EP 0 519 596; Padlan E. A., Molecular Immunology, 28: 489-498, 1991; Studnicka et al., *Protein Engineering* 7: 805-814, 1994; Roguska et al., *PNAS* 91: 969-973, 1994), and chain shuffling (U.S. Pat. No. 5,565,332). In one embodiment, a cDNA encoding a murine anti-DLL3 monoclonal antibody is digested with a restriction enzyme selected specifically to remove the sequence encoding the Fc constant region, and the equivalent portion of a cDNA encoding a human Fc constant region is substituted (See Robinson et al., PCT/US86/02269; Akira et al., European Patent Application 184,187; Taniguchi, European Patent Application 171,496; Morrison et al., European Patent Application 173,494; Neuberger et al., WO 86/01533; Cabilly et al. U.S. Pat. No. 4,816,567; Cabilly et al., European Patent Application 125,023; Better et al. (1988) *Science* 240: 1041-1043; Liu et al. (1987) *Proc. Natl. Acad Sci. USA* 84: 3439-3443; Liu et al. (1987) *J Immunol* 139: 3521-3526; Sun et al. (1987) *Proc. Natl. Acad Sci. USA* 84: 214-218; Nishimura et al. (1987) *Cancer Res* 47: 999-1005; Wood et al. (1985) *Nature* 314: 446-449; and Shaw et al. (1988) *J. Nat. Cancer Inst.* 80: 1553-1559; U.S. Pat. Nos. 6,180,370; 6,300,064; 6,696,248; 6,706,484; 6,828,422.

In one embodiment, the present technology provides the construction of humanized anti-DLL3 antibodies that are unlikely to induce a human anti-mouse antibody (hereinafter referred to as "HAMA") response, while still having an effective antibody effector function. As used herein, the terms "human" and "humanized", in relation to antibodies, relate to any antibody which is expected to elicit a therapeutically tolerable weak immunogenic response in a human subject. In one embodiment, the present technology provides for a humanized anti-DLL3 antibodies, heavy and light chain immunoglobulins.

CDR Antibodies. In some embodiments, the anti-DLL3 antibody of the present technology is an anti-DLL3 CDR antibody. Generally the donor and acceptor antibodies used to generate the anti-DLL3 CDR antibody are monoclonal antibodies from different species; typically the acceptor antibody is a human antibody (to minimize its antigenicity in a human), in which case the resulting CDR-grafted antibody is termed a "humanized" antibody. The graft may be of a single CDR (or even a portion of a single CDR) within a single $V_H$ or $V_L$ of the acceptor antibody, or can be of multiple CDRs (or portions thereof) within one or both of the $V_H$ and $V_L$. Frequently, all three CDRs in all variable domains of the acceptor antibody will be replaced with the corresponding donor CDRs, though one needs to replace only as many as necessary to permit adequate binding of the resulting CDR-grafted antibody to DLL3 protein. Methods for generating CDR-grafted and humanized antibodies are taught by Queen et al. U.S. Pat. Nos. 5,585,089; 5,693,761; 5,693,762; and Winter U.S. Pat. No. 5,225,539; and EP 0682040. Methods useful to prepare $V_H$ and $V_L$ polypeptides are taught by Winter et al., U.S. Pat. Nos. 4,816,397; 6,291,158; 6,291,159; 6,291,161; 6,545,142; EP 0368684; EP0451216; and EP0120694.

After selecting suitable framework region candidates from the same family and/or the same family member, either or both the heavy and light chain variable regions are produced by grafting the CDRs from the originating species into the hybrid framework regions. Assembly of hybrid antibodies or hybrid antibody fragments having hybrid variable chain regions with regard to either of the above aspects can be accomplished using conventional methods known to those skilled in the art. For example, DNA sequences encoding the hybrid variable domains described herein (i.e., frameworks based on the target species and CDRs from the originating species) can be produced by oligonucleotide synthesis and/or PCR. The nucleic acid encoding CDR regions can also be isolated from the originating species antibodies using suitable restriction enzymes and ligated into the target species framework by ligating with suitable ligation enzymes. Alternatively, the framework regions of the variable chains of the originating species antibody can be changed by site-directed mutagenesis.

Since the hybrids are constructed from choices among multiple candidates corresponding to each framework region, there exist many combinations of sequences which are amenable to construction in accordance with the principles described herein. Accordingly, libraries of hybrids can be assembled having members with different combinations of individual framework regions. Such libraries can be electronic database collections of sequences or physical collections of hybrids.

This process typically does not alter the acceptor antibody's FRs flanking the grafted CDRs. However, one skilled in the art can sometimes improve antigen binding affinity of the resulting anti-DLL3 CDR-grafted antibody by replacing certain residues of a given FR to make the FR more similar to the corresponding FR of the donor antibody. Suitable locations of the substitutions include amino acid residues adjacent to the CDR, or which are capable of interacting with a CDR (See, e.g., U.S. Pat. No. 5,585,089, especially columns 12-16). Or one skilled in the art can start with the donor FR and modify it to be more similar to the acceptor FR or a human consensus FR. Techniques for making these modifications are known in the art. Particularly if the resulting FR fits a human consensus FR for that position, or is at least 90% or more identical to such a consensus FR, doing so may not increase the antigenicity of the resulting modified anti-DLL3 CDR-grafted antibody significantly compared to the same antibody with a fully human FR.

Bispecific Antibodies (BsAbs). A bispecific antibody is an antibody that can bind simultaneously to two targets that have a distinct structure, e.g., two different target antigens, two different epitopes on the same target antigen. BsAbs can be made, for example, by combining heavy chains and/or light chains that recognize different epitopes of the same or different antigen. In some embodiments, by molecular function, a bispecific binding agent binds one antigen (or epitope) on one of its two binding arms (one VH/VL pair), and binds a different antigen (or epitope) on its second arm (a different VH/VL pair). By this definition, a bispecific binding agent has two distinct antigen binding arms (in both specificity and CDR sequences), and is monovalent for each antigen to which it binds.

Bispecific antibodies (BsAb) and bispecific antibody fragments (BsFab) of the present technology have at least one arm that specifically binds to, for example, DLL3 and at least one other arm that specifically binds to a second target antigen. In certain embodiments, the BsAbs are capable of binding to tumor cells that express DLL3 antigen on the cell surface.

A variety of bispecific fusion proteins can be produced using molecular engineering. For example, BsAbs have been constructed that either utilize the full immunoglobulin framework (e.g., IgG), single chain variable fragment (scFv), or combinations thereof. In some embodiments, the bispecific fusion protein is divalent, comprising, for example, a scFv with a single binding site for one antigen and a Fab fragment with a single binding site for a second antigen. In some embodiments, the bispecific fusion protein is divalent, comprising, for example, an scFv with a single binding site for one antigen and another scFv fragment with a single binding site for a second antigen. In other embodiments, the bispecific fusion protein is tetravalent, comprising, for example, an immunoglobulin (e.g., IgG) with two binding sites for one antigen and two identical scFvs for a second antigen. BsAbs composed of two scFv units in tandem have been shown to be a clinically successful bispecific antibody format. In some embodiments, BsAbs comprise two single chain variable fragments (scFvs) in tandem have been designed such that an scFv that binds a tumor antigen (e.g., DLL3) is linked with an scFv that binds to a different target antigen.

Recent methods for producing BsAbs include engineered recombinant monoclonal antibodies which have additional cysteine residues so that they crosslink more strongly than the more common immunoglobulin isotypes. See, e.g., FitzGerald et al., *Protein Eng.* 10(10):1221-1225 (1997). Another approach is to engineer recombinant fusion proteins linking two or more different single-chain antibody or antibody fragment segments with the needed dual specificities. See, e.g., Coloma et al., *Nature Biotech.* 15:159-163 (1997). A variety of bispecific fusion proteins can be produced using molecular engineering.

Bispecific fusion proteins linking two or more different single-chain antibodies or antibody fragments are produced in a similar manner. Recombinant methods can be used to produce a variety of fusion proteins. In some certain embodiments, a BsAb according to the present technology comprises an immunoglobulin, which immunoglobulin comprises a heavy chain and a light chain, and an scFv. In some certain embodiments, the scFv is linked to the C-terminal end of the heavy chain of any DLL3 immunoglobulin disclosed herein. In some certain embodiments, scFvs are linked to the C-terminal end of the light chain of any DLL3 immunoglobulin disclosed herein. In various embodiments, scFvs are linked to heavy or light chains via a linker sequence. Appropriate linker sequences necessary for the in-frame connection of the heavy chain Fd to the scFv are introduced into the $V_L$ and $V_{kappa}$ domains through PCR reactions. The DNA fragment encoding the scFv is then ligated into a staging vector containing a DNA sequence encoding the $CH_1$ domain. The resulting scFv-$CH_1$ construct is excised and ligated into a vector containing a DNA sequence encoding the $V_H$ region of a DLL3 antibody. The resulting vector can be used to transfect an appropriate host cell, such as a mammalian cell for the expression of the bispecific fusion protein.

In some embodiments, a linker is at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100 or more amino acids in length. In some embodiments, a linker is characterized in that it tends not to adopt a rigid three-dimensional structure, but rather provides flexibility to the polypeptide (e.g., first and/or second antigen binding sites). In some embodiments, a linker is employed in a BsAb described herein based on specific properties imparted to the BsAb such as, for example, an increase in stability. In some embodiments, a BsAb of the present technology comprises a $G_4S$ linker (SEQ ID NO: 57). In some certain embodiments, a BsAb of the present technology comprises a $(G_4S)_n$ linker (SEQ ID NO: 58), wherein n is 1, 2, 3, 4, 5, 6, 7, 8, 9, 10, 11, 12, 13, 14, 15 or more.

Fc Modifications. In some embodiments, the anti-DLL3 antibodies of the present technology comprise a variant Fc region, wherein said variant Fc region comprises at least one amino acid modification relative to a wild-type Fc region (or the parental Fc region), such that said molecule has an altered affinity for an Fc receptor (e.g., an FcγR), provided that said variant Fc region does not have a substitution at positions that make a direct contact with Fc receptor based on crystallographic and structural analysis of Fc-Fc receptor interactions such as those disclosed by Sondermann et al., *Nature*, 406:267-273 (2000). Examples of positions within the Fc region that make a direct contact with an Fc receptor such as an FcγR, include amino acids 234-239 (hinge region), amino acids 265-269 (B/C loop), amino acids 297-299 (C7E loop), and amino acids 327-332 (F/G) loop.

In some embodiments, an anti-DLL3 antibody of the present technology has an altered affinity for activating and/or inhibitory receptors, having a variant Fc region with one or more amino acid modifications, wherein said one or more amino acid modification is a N297 substitution with alanine, or a K322 substitution with alanine.

Glycosylation Modifications. In some embodiments, anti-DLL3 antibodies of the present technology have an Fc region with variant glycosylation as compared to a parent Fc region. In some embodiments, variant glycosylation includes the absence of fucose; in some embodiments, variant glycosylation results from expression in GnT1-deficient CHO cells.

In some embodiments, the antibodies of the present technology, may have a modified glycosylation site relative to an appropriate reference antibody that binds to an antigen of interest (e.g., DLL3), without altering the functionality of the antibody, e.g., binding activity to the antigen. As used herein, "glycosylation sites" include any specific amino acid sequence in an antibody to which an oligosaccharide (i.e., carbohydrates containing two or more simple sugars linked together) will specifically and covalently attach.

Oligosaccharide side chains are typically linked to the backbone of an antibody via either N- or O-linkages. N-linked glycosylation refers to the attachment of an oligosaccharide moiety to the side chain of an asparagine residue. O-linked glycosylation refers to the attachment of an oligosaccharide moiety to a hydroxyamino acid, e.g., serine, threonine. For example, an Fc-glycoform (hDLL3-IgG1n) that lacks certain oligosaccharides including fucose and terminal N-acetylglucosamine may be produced in special CHO cells and exhibit enhanced ADCC effector function.

In some embodiments, the carbohydrate content of an immunoglobulin-related composition disclosed herein is modified by adding or deleting a glycosylation site. Methods for modifying the carbohydrate content of antibodies are well known in the art and are included within the present technology, see, e.g., U.S. Pat. No. 6,218,149; EP 0359096B1; U.S. Patent Publication No. US 2002/0028486; International Patent Application Publication WO 03/035835; U.S. Patent Publication No. 2003/0115614; U.S. Pat. Nos. 6,218,149; 6,472,511; all of which are incorporated herein by reference in their entirety. In some embodiments, the carbohydrate content of an antibody (or relevant portion or component thereof) is modified by deleting one or more endogenous carbohydrate moieties of the antibody. In some certain embodiments, the present technology includes deleting the glycosylation site of the Fc region of an antibody, by modifying position 297 from asparagine to alanine.

Engineered glycoforms may be useful for a variety of purposes, including but not limited to enhancing or reducing effector function. Engineered glycoforms may be generated by any method known to one skilled in the art, for example by using engineered or variant expression strains, by co-expression with one or more enzymes, for example N-acetylglucosaminyltransferase III (GnTIII), by expressing a molecule comprising an Fc region in various organisms or cell lines from various organisms, or by modifying carbohydrate(s) after the molecule comprising Fc region has been expressed. Methods for generating engineered glycoforms are known in the art, and include but are not limited to those described in Umana et al., 1999, *Nat. Biotechnol.* 17: 176-180; Davies et al., 2001, *Biotechnol. Bioeng.* 74:288-294; Shields et al., 2002, *J. Biol. Chem.* 277:26733-26740; Shinkawa et al., 2003, *J. Biol. Chem.* 278:3466-3473; U.S. Pat. No. 6,602,684; U.S. patent application Ser. No. 10/277, 370; U.S. patent application Ser. No. 10/113,929; International Patent Application Publications WO 00/61739A1; WO 01/292246A1; WO 02/311140A1; WO 02/30954A1; POTILLEGENT™ technology (Biowa, Inc. Princeton, N.J.); GLYCOMAB™ glycosylation engineering technology (GLYCART biotechnology AG, Zurich, Switzerland); each of which is incorporated herein by reference in its entirety. See, e.g., International Patent Application Publication WO 00/061739; U.S. Patent Application Publication No. 2003/0115614; Okazaki et al., 2004, *JMB*, 336: 1239-49.

Fusion Proteins. In one embodiment, the anti-DLL3 antibody of the present technology is a fusion protein. The anti-DLL3 antibodies of the present technology, when fused to a second protein, can be used as an antigenic tag. Examples of domains that can be fused to polypeptides include not only heterologous signal sequences, but also other heterologous functional regions. The fusion does not necessarily need to be direct, but can occur through linker sequences. Moreover, fusion proteins of the present technology can also be engineered to improve characteristics of the anti-DLL3 antibodies. For instance, a region of additional amino acids, particularly charged amino acids, can be added to the N-terminus of the anti-DLL3 antibody to improve stability and persistence during purification from the host cell or subsequent handling and storage. Also, peptide moieties can be added to an anti-DLL3 antibody to facilitate purification. Such regions can be removed prior to final preparation of the anti-DLL3 antibody. The addition of peptide moieties to facilitate handling of polypeptides are familiar and routine techniques in the art. The anti-DLL3 antibody of the present technology can be fused to marker sequences, such as a peptide which facilitates purification of the fused polypeptide. In select embodiments, the marker amino acid sequence is a hexa-histidine peptide (SEQ ID NO: 59), such as the tag provided in a pQE vector (QIAGEN, Inc., Chatsworth, Calif.), among others, many of which are commercially available. As described in Gentz et al., *Proc. Natl. Acad. Sci. USA* 86: 821-824, 1989, for instance, hexa-histidine (SEQ ID NO: 59) provides for convenient purification of the fusion protein. Another peptide tag useful for purification, the "HA" tag, corresponds to an epitope derived from the influenza hemagglutinin protein. Wilson et al., *Cell* 37: 767, 1984.

Thus, any of these above fusion proteins can be engineered using the polynucleotides or the polypeptides of the present technology. Also, in some embodiments, the fusion proteins described herein show an increased half-life in vivo.

Fusion proteins having disulfide-linked dimeric structures (due to the IgG) can be more efficient in binding and neutralizing other molecules compared to the monomeric secreted protein or protein fragment alone. Fountoulakis et al., *J. Biochem.* 270: 3958-3964, 1995.

Similarly, EP-A-O 464 533 (Canadian counterpart 2045869) discloses fusion proteins comprising various portions of constant region of immunoglobulin molecules together with another human protein or a fragment thereof. In many cases, the Fc part in a fusion protein is beneficial in therapy and diagnosis, and thus can result in, e.g., improved pharmacokinetic properties. See EP-A 0232 262. Alternatively, deleting or modifying the Fc part after the fusion protein has been expressed, detected, and purified, may be desired. For example, the Fc portion can hinder therapy and diagnosis if the fusion protein is used as an antigen for immunizations. In drug discovery, e.g., human proteins, such as hIL-5, have been fused with Fc portions for the purpose of high-throughput screening assays to identify antagonists of hIL-5. Bennett et al., *J. Molecular Recognition* 8: 52-58, 1995; Johanson et al., *J. Biol. Chem.,* 270: 9459-9471, 1995.

Labeled Anti-DLL3 antibodies. In one embodiment, the anti-DLL3 antibody of the present technology is coupled with a label moiety, i.e., detectable group. The particular label or detectable group conjugated to the anti-DLL3 antibody is not a critical aspect of the technology, so long as it does not significantly interfere with the specific binding of the anti-DLL3 antibody of the present technology to the DLL3 protein. The detectable group can be any material having a detectable physical or chemical property. Such detectable labels have been well-developed in the field of immunoassays and imaging. In general, almost any label useful in such methods can be applied to the present technology. Thus, a label is any composition detectable by spectroscopic, photochemical, biochemical, immunochemical, electrical, optical or chemical means. Labels useful in the practice of the present technology include magnetic beads (e.g., Dynabeads™), fluorescent dyes (e.g., fluorescein isothiocyanate, Texas red, rhodamine, and the like), radiolabels (e.g., $^3$H, $^{14}$C, $^{35}$S $^{125}$I, $^{121}$I, $^{131}$I, $^{112}$In, $^{99m}$Tc), other imaging agents such as microbubbles (for ultrasound imaging), $^{18}$F, $^{11}$C, $^{15}$O, $^{89}$Zr (for Positron emission tomography), $^{99m}$Tc, $^{111}$In (for Single photon emission tomography), enzymes (e.g., horse radish peroxidase, alkaline phosphatase and others commonly used in an ELISA), and calorimetric labels such as colloidal gold or colored glass or plastic (e.g., polystyrene, polypropylene, latex, and the like) beads. Patents that describe the use of such labels include U.S. Pat. Nos. 3,817,837; 3,850,752; 3,939,350; 3,996,345; 4,277,437; 4,275,149; and 4,366,241, each incorporated herein by reference in their entirety and for all purposes. See also Handbook of Fluorescent Probes and Research Chemicals ($6^{th}$ Ed., Molecular Probes, Inc., Eugene OR).

The label can be coupled directly or indirectly to the desired component of an assay according to methods well known in the art. As indicated above, a wide variety of labels can be used, with the choice of label depending on factors such as required sensitivity, ease of conjugation with the compound, stability requirements, available instrumentation, and disposal provisions.

Non-radioactive labels are often attached by indirect means. Generally, a ligand molecule (e.g., biotin) is covalently bound to the molecule. The ligand then binds to an anti-ligand (e.g., streptavidin) molecule which is either inherently detectable or covalently bound to a signal system, such as a detectable enzyme, a fluorescent compound, or a chemiluminescent compound. A number of ligands and anti-ligands can be used. Where a ligand has a natural anti-ligand, e.g., biotin, thyroxine, and cortisol, it can be used in conjunction with the labeled, naturally-occurring anti-ligands. Alternatively, any haptenic or antigenic compound can be used in combination with an antibody, e.g., an anti-DLL3 antibody.

The molecules can also be conjugated directly to signal generating compounds, e.g., by conjugation with an enzyme or fluorophore. Enzymes of interest as labels will primarily be hydrolases, particularly phosphatases, esterases and glycosidases, or oxidoreductases, particularly peroxidases. Fluorescent compounds useful as labeling moieties, include, but are not limited to, e.g., fluorescein and its derivatives, rhodamine and its derivatives, dansyl, umbelliferone, and the like. Chemiluminescent compounds useful as labeling moieties, include, but are not limited to, e.g., luciferin, and 2,3-dihydrophthalazinediones, e.g., luminol. For a review of various labeling or signal-producing systems which can be used, see U.S. Pat. No. 4,391,904.

Means of detecting labels are well known to those of skill in the art. Thus, for example, where the label is a radioactive label, means for detection include a scintillation counter or photographic film as in autoradiography. Where the label is a fluorescent label, it can be detected by exciting the fluorochrome with the appropriate wavelength of light and detecting the resulting fluorescence. The fluorescence can be detected visually, by means of photographic film, by the use of electronic detectors such as charge coupled devices (CCDs) or photomultipliers and the like. Similarly, enzymatic labels can be detected by providing the appropriate substrates for the enzyme and detecting the resulting reaction product. Finally, simple colorimetric labels can be detected simply by observing the color associated with the label. Thus, in various dipstick assays, conjugated gold often appears pink, while various conjugated beads appear the color of the bead.

Some assay formats do not require the use of labeled components. For instance, agglutination assays can be used to detect the presence of the target antibodies, e.g., the anti-DLL3 antibodies. In this case, antigen-coated particles are agglutinated by samples comprising the target antibodies. In this format, none of the components need be labeled and the presence of the target antibody is detected by simple visual inspection.

B. Identifying and Characterizing the Anti-DLL3 Antibodies of the Present Technology Methods for identifying and/or screening the anti-DLL3 antibodies of the present technology. Methods useful to identify and screen antibodies against DLL3 polypeptides for those that possess the desired specificity to DLL3 protein (e.g., those that bind to the extracellular domain of DLL3) include any immunologically-mediated techniques known within the art. Components of an immune response can be detected in vitro by various methods that are well known to those of ordinary skill in the art. For example, (1) cytotoxic T lymphocytes can be incubated with radioactively labeled target cells and the lysis of these target cells detected by the release of radioactivity; (2) helper T lymphocytes can be incubated with antigens and antigen presenting cells and the synthesis and secretion of cytokines measured by standard methods (Windhagen A et al., *Immunity*, 2: 373-80, 1995); (3) antigen presenting cells can be incubated with whole protein antigen and the presentation of that antigen on MHC detected by either T lymphocyte activation assays or biophysical methods (Harding et al., *Proc. Natl. Acad. Sci.*, 86: 4230-4, 1989); (4) mast cells can be incubated with reagents that cross-link their Fc-epsilon receptors and histamine release measured by enzyme immunoassay (Siraganian et al., *TIPS*, 4: 432-437, 1983); and (5) enzyme-linked immunosorbent assay (ELISA).

Similarly, products of an immune response in either a model organism (e.g., mouse) or a human subject can also be detected by various methods that are well known to those of ordinary skill in the art. For example, (1) the production of antibodies in response to vaccination can be readily detected by standard methods currently used in clinical laboratories, e.g., an ELISA; (2) the migration of immune cells to sites of inflammation can be detected by scratching the surface of skin and placing a sterile container to capture the migrating cells over scratch site (Peters et al., *Blood*, 72: 1310-5, 1988); (3) the proliferation of peripheral blood mononuclear cells (PBMCs) in response to mitogens or mixed lymphocyte reaction can be measured using $^3$H-thymidine; (4) the phagocytic capacity of granulocytes, macrophages, and other phagocytes in PBMCs can be measured by placing PBMCs in wells together with labeled particles (Peters et al., *Blood*, 72: 1310-5, 1988); and (5) the differentiation of immune system cells can be measured by labeling PBMCs with antibodies to CD molecules such as CD4 and CD8 and measuring the fraction of the PBMCs expressing these markers.

In one embodiment, anti-DLL3 antibodies of the present technology are selected using display of DLL3 peptides on the surface of replicable genetic packages. See, e.g., U.S. Pat. Nos. 5,514,548; 5,837,500; 5,871,907; 5,885,793; 5,969,108; 6,225,447; 6,291,650; 6,492,160; EP 585 287; EP 605522; EP 616640; EP 1024191; EP 589 877; EP 774 511; EP 844 306. Methods useful for producing/selecting a filamentous bacteriophage particle containing a phagemid genome encoding for a binding molecule with a desired specificity has been described. See, e.g., EP 774 511; U.S. Pat. Nos. 5,871,907; 5,969,108; 6,225,447; 6,291,650; 6,492,160.

In some embodiments, anti-DLL3 antibodies of the present technology are selected using display of DLL3 peptides on the surface of a yeast host cell. Methods useful for the isolation of scFv polypeptides by yeast surface display have been described by Kieke et al., *Protein Eng.* 1997 November; 10(11): 1303-10.

In some embodiments, anti-DLL3 antibodies of the present technology are selected using ribosome display. Methods useful for identifying ligands in peptide libraries using ribosome display have been described by Mattheakis et al., *Proc. Natl. Acad. Sci. USA* 91: 9022-26, 1994; and Hanes et al., *Proc. Natl. Acad. Sci. USA* 94: 4937-42, 1997.

In certain embodiments, anti-DLL3 antibodies of the present technology are selected using tRNA display of DLL3 peptides. Methods useful for in vitro selection of ligands using tRNA display have been described by Merryman et al., *Chem. Biol.*, 9: 741-46, 2002.

In one embodiment, anti-DLL3 antibodies of the present technology are selected using RNA display. Methods useful for selecting peptides and proteins using RNA display libraries have been described by Roberts et al. *Proc. Natl. Acad. Sci. USA*, 94: 12297-302, 1997; and Nemoto et al., *FEBS Lett.*, 414: 405-8, 1997. Methods useful for selecting peptides and proteins using unnatural RNA display libraries have been described by Frankel et al., *Curr. Opin. Struct. Biol.*, 13: 506-12, 2003.

In some embodiments, anti-DLL3 antibodies of the present technology are expressed in the periplasm of gram negative bacteria and mixed with labeled DLL3 protein. See WO 02/34886. In clones expressing recombinant polypeptides with affinity for DLL3 protein, the concentration of the labeled DLL3 protein bound to the anti-DLL3 antibodies is increased and allows the cells to be isolated from the rest of the library as described in Harvey et al., *Proc. Natl. Acad. Sci.* 22: 9193-98 2004 and U.S. Pat. Publication No. 2004/0058403.

After selection of the desired anti-DLL3 antibodies, it is contemplated that said antibodies can be produced in large volume by any technique known to those skilled in the art, e.g., prokaryotic or eukaryotic cell expression and the like. The anti-DLL3 antibodies which are, e.g., but not limited to, anti-DLL3 hybrid antibodies or fragments can be produced by using conventional techniques to construct an expression vector that encodes an antibody heavy chain in which the CDRs and, if necessary, a minimal portion of the variable region framework, that are required to retain original species antibody binding specificity (as engineered according to the techniques described herein) are derived from the originating species antibody and the remainder of the antibody is derived from a target species immunoglobulin which can be manipulated as described herein, thereby producing a vector for the expression of a hybrid antibody heavy chain.

Measurement of DLL3 Binding. In some embodiments, a DLL3 binding assay refers to an assay format wherein DLL3 protein and an anti-DLL3 antibody are mixed under conditions suitable for binding between the DLL3 protein and the anti-DLL3 antibody and assessing the amount of binding between the DLL3 protein and the anti-DLL3 antibody. The amount of binding is compared with a suitable control, which can be the amount of binding in the absence of the DLL3 protein, the amount of the binding in the presence of a non-specific immunoglobulin composition, or both. The amount of binding can be assessed by any suitable method. Binding assay methods include, e.g., ELISA, radioimmunoassays, scintillation proximity assays, fluorescence energy transfer assays, liquid chromatography, membrane filtration assays, and the like. Biophysical assays for the direct measurement of DLL3 protein binding to anti-DLL3 antibody are, e.g., nuclear magnetic resonance, fluorescence, fluorescence polarization, surface plasmon resonance (BIA-CORE chips), biolayer interferometry, and the like. Specific binding is determined by standard assays known in the art, e.g., radioligand binding assays, ELISA, FRET, immunoprecipitation, SPR, NMR (2D-NMR), mass spectroscopy and the like. If the specific binding of a candidate anti-DLL3 antibody is at least 1 percent greater than the binding observed in the absence of the candidate anti-DLL3 antibody, the candidate anti-DLL3 antibody is useful as an anti-DLL3 antibody of the present technology.

Use of the Anti-DLL3 Antibodies of the Present Technology

General. The antibodies of the present technology are useful in methods known in the art relating to the localization and/or quantitation of DLL3 polypeptides (e.g., for use in measuring levels of the DLL3 protein within appropriate physiological samples, for use in diagnostic methods, for use in imaging the polypeptide, and the like). The anti-DLL3 antibodies of the present technology are useful to isolate a DLL3 polypeptide by standard techniques, such as affinity chromatography or immunoprecipitation. An anti-DLL3 antibody of the present technology can facilitate the purification of natural immunoreactive DLL3 proteins from biological samples, e.g., mammalian sera or cells as well as recombinantly-produced immunoreactive DLL3 proteins expressed in a host system. Moreover, anti-DLL3 antibodies of the present technology can be used to detect an immunoreactive DLL3 protein (e.g., in plasma, a cellular lysate or cell supernatant) in order to evaluate the abundance and pattern of expression of the immunoreactive polypeptide. The anti-DLL3 antibodies of the present technology can be used diagnostically to monitor immunoreactive DLL3 protein levels in tissue as part of a clinical testing procedure, e.g., to determine the efficacy of a given treatment regimen. As noted above, the detection can be facilitated by coupling (i.e., physically linking) the anti-DLL3 antibodies of the present technology to a detectable substance.

Detection of DLL3 Protein. An exemplary method for detecting the presence or absence of an immunoreactive DLL3 protein in a biological sample involves obtaining a biological sample from a test subject and contacting the biological sample with an anti-DLL3 antibody of the present technology capable of detecting an immunoreactive DLL3 protein such that the presence of an immunoreactive DLL3 protein is detected in the biological sample. Detection may be accomplished by means of a detectable label attached to the antibody.

The term "labeled" with regard to the anti-DLL3 antibody is intended to encompass direct labeling of the antibody by coupling (i.e., physically linking) a detectable substance to the antibody, as well as indirect labeling of the antibody by reactivity with another compound that is directly labeled, such as a secondary antibody. Examples of indirect labeling include detection of a primary antibody using a fluorescently-labeled secondary antibody and end-labeling of a DNA probe with biotin such that it can be detected with fluorescently-labeled streptavidin.

In some embodiments, the anti-DLL3 antibodies disclosed herein are conjugated to one or more detectable labels. For such uses, anti-DLL3 antibodies may be detectably labeled by covalent or non-covalent attachment of a chromogenic, enzymatic, radioisotopic, isotopic, fluorescent, toxic, chemiluminescent, nuclear magnetic resonance contrast agent or other label.

Examples of suitable chromogenic labels include diaminobenzidine and 4-hydroxyazo-benzene-2-carboxylic acid. Examples of suitable enzyme labels include malate dehydrogenase, staphylococcal nuclease, $\Delta$-5-steroid isomerase, yeast-alcohol dehydrogenase, $\alpha$-glycerol phosphate dehydrogenase, triose phosphate isomerase, peroxidase, alkaline phosphatase, asparaginase, glucose oxidase, β-galactosidase, ribonuclease, urease, catalase, glucose-6-phosphate dehydrogenase, glucoamylase, and acetylcholine esterase.

Examples of suitable radioisotopic labels include $^{3}$H, $^{111}$In, $^{125}$I, $^{131}$I, $^{32}$P, $^{35}$S, $^{14}$C, $^{51}$Cr, $^{57}$To, $^{58}$Co, $^{59}$Fe, $^{75}$Se, $^{152}$Eu, $^{90}$Y, $^{67}$Cu, $^{217}$Ci, $^{211}$At, $^{212}$Pb, $^{47}$Sc, $^{109}$Pd, etc. $^{111}$In is an exemplary isotope where in vivo imaging is used since its avoids the problem of dehalogenation of the $^{125}$I or $^{131}$I-labeled DLL3-binding antibodies by the liver. In addition, this isotope has a more favorable gamma emission energy for imaging (Perkins et al, *Eur. J. Nucl. Med.* 70:296-301 (1985); Carasquillo et al., *J. Nucl. Med.* 25:281-287 (1987)). For example, $^{111}$In coupled to monoclonal antibodies with 1-(P-isothiocyanatobenzyl)-DPTA exhibits little uptake in non-tumorous tissues, particularly the liver, and enhances specificity of tumor localization (Esteban et al., *J. Nucl. Med.* 28:861-870 (1987)). Examples of suitable non-radioactive isotopic labels include $^{157}$Gd, $^{55}$Mn, $^{162}$Dy, $^{52}$Tr, and $^{56}$Fe.

Examples of suitable fluorescent labels include an $^{152}$Eu label, a fluorescein label, an isothiocyanate label, a rhodamine label, a phycoerythrin label, a phycocyanin label, an allophycocyanin label, a Green Fluorescent Protein (GFP) label, an o-phthaldehyde label, and a fluorescamine label. Examples of suitable toxin labels include diphtheria toxin, ricin, and cholera toxin.

Examples of chemiluminescent labels include a luminol label, an isoluminol label, an aromatic acridinium ester label, an imidazole label, an acridinium salt label, an oxalate ester label, a luciferin label, a luciferase label, and an aequorin label. Examples of nuclear magnetic resonance contrasting agents include heavy metal nuclei such as Gd, Mn, and iron.

The detection method of the present technology can be used to detect an immunoreactive DLL3 protein in a biological sample in vitro as well as in vivo. In vitro techniques for detection of an immunoreactive DLL3 protein include enzyme linked immunosorbent assays (ELISAs), Western blots, immunoprecipitations, radioimmunoassay, and immunofluorescence. Furthermore, in vivo techniques for detection of an immunoreactive DLL3 protein include introducing into a subject a labeled anti-DLL3 antibody. For example, the anti-DLL3 antibody can be labeled with a radioactive marker whose presence and location in a subject can be detected by standard imaging techniques. In one embodiment, the biological sample contains DLL3 protein molecules from the test subject.

Immunoassay and Imaging. An anti-DLL3 antibody of the present technology can be used to assay immunoreactive DLL3 protein levels in a biological sample (e.g., human plasma) using antibody-based techniques. For example, protein expression in tissues can be studied with classical immunohistological methods. Jalkanen, M. et al., *J Cell. Biol.* 101: 976-985, 1985; Jalkanen, M. et al., *J. Cell. Biol.* 105: 3087-3096, 1987. Other antibody-based methods useful for detecting protein gene expression include immunoassays, such as the enzyme linked immunosorbent assay (ELISA) and the radioimmunoassay (RIA). Suitable antibody assay labels are known in the art and include enzyme labels, such as, glucose oxidase, and radioisotopes or other radioactive agent, such as iodine ($^{125}$I, $^{121}$I, $^{131}$I) carbon ($^{14}$C), sulfur ($^{35}$S), tritium ($^{3}$H), indium ($^{111}$In), and technetium ($^{99m}$Tc), and fluorescent labels, such as fluorescein, rhodamine, and green fluorescent protein (GFP), as well as biotin.

In addition to assaying immunoreactive DLL3 protein levels in a biological sample, the anti-DLL3 antibodies of the present technology may be used for in vivo imaging of DLL3. Antibodies useful for this method include those detectable by X-radiography, NMR or ESR. For X-radiography, suitable labels include radioisotopes such as barium or cesium, which emit detectable radiation but are not overtly harmful to the subject. Suitable markers for NMR and ESR include those with a detectable characteristic spin, such as deuterium, which can be incorporated into the anti-DLL3 antibodies by labeling of nutrients for the relevant scFv clone.

An anti-DLL3 antibody of the present technology which has been labeled with an appropriate detectable imaging moiety, such as a radioisotope (e.g., $^{131}$I, $^{111}$In, $^{99m}$Tc, $^{18}$F, $^{89}$Zr), a radio-opaque substance, or a material detectable by nuclear magnetic resonance, is introduced (e.g., parenterally, subcutaneously, or intraperitoneally) into the subject. It will be understood in the art that the size of the subject and the imaging system used will determine the quantity of imaging moiety needed to produce diagnostic images. In the case of a radioisotope moiety, for a human subject, the quantity of radioactivity injected will normally range from about 5 to 20 millicuries of $^{99m}$Tc. The labeled anti-DLL3 antibody will then accumulate at the location of cells which contain the specific target polypeptide. For example, labeled anti-DLL3 antibodies of the present technology will accumulate within the subject in cells and tissues in which the DLL3 protein has localized.

Thus, the present technology provides a diagnostic method of a medical condition, which involves: (a) assaying the expression of immunoreactive DLL3 protein by measuring binding of an anti-DLL3 antibody of the present technology in cells or body fluid of an individual; (b) comparing the amount of immunoreactive DLL3 protein present in the sample with a standard reference, wherein an increase or decrease in immunoreactive DLL3 protein levels compared to the standard is indicative of a medical condition.

Affinity Purification. The anti-DLL3 antibodies of the present technology may be used to purify immunoreactive DLL3 protein from a sample. In some embodiments, the antibodies are immobilized on a solid support. Examples of such solid supports include plastics such as polycarbonate, complex carbohydrates such as agarose and sepharose, acrylic resins and such as polyacrylamide and latex beads. Techniques for coupling antibodies to such solid supports are well known in the art (Weir et al., "Handbook of Experimental Immunology" 4th Ed., Blackwell Scientific Publications, Oxford, England, Chapter 10 (1986); Jacoby et al., Meth. Enzym. 34 Academic Press, N.Y. (1974)).

The simplest method to bind the antigen to the antibody-support matrix is to collect the beads in a column and pass the antigen solution down the column. The efficiency of this method depends on the contact time between the immobilized antibody and the antigen, which can be extended by using low flow rates. The immobilized antibody captures the antigen as it flows past. Alternatively, an antigen can be contacted with the antibody-support matrix by mixing the antigen solution with the support (e.g., beads) and rotating or rocking the slurry, allowing maximum contact between the antigen and the immobilized antibody. After the binding reaction has been completed, the slurry is passed into a column for collection of the beads. The beads are washed using a suitable washing buffer and then the pure or substantially pure antigen is eluted.

An antibody or polypeptide of interest can be conjugated to a solid support, such as a bead. In addition, a first solid support such as a bead can also be conjugated, if desired, to a second solid support, which can be a second bead or other support, by any suitable means, including those disclosed herein for conjugation of a polypeptide to a support. Accordingly, any of the conjugation methods and means disclosed herein with reference to conjugation of a polypeptide to a solid support can also be applied for conjugation of a first support to a second support, where the first and second solid support can be the same or different.

Appropriate linkers, which can be cross-linking agents, for use for conjugating a polypeptide to a solid support include a variety of agents that can react with a functional group present on a surface of the support, or with the polypeptide, or both. Reagents useful as cross-linking agents include homo-bi-functional and, in particular, hetero-bi-functional reagents. Useful bi-functional cross-linking agents include, but are not limited to, N-SIAB, dimaleimide, DTNB, N-SATA, N-SPDP, SMCC and 6-HYNIC. A cross-linking agent can be selected to provide a selectively cleavable bond between a polypeptide and the solid support. For example, a photolabile cross-linker, such as 3-amino-(2-nitrophenyl)propionic acid can be employed as a means for cleaving a polypeptide from a solid support. (Brown et al., *Mol. Divers*, pp, 4-12 (1995); Rothschild et al., *Nucl. Acids Res.*, 24:351-66 (1996); and U.S. Pat. No. 5,643,722). Other cross-linking reagents are well-known in the art. (See, e.g., Wong (1991), supra; and Hermanson (1996), supra).

An antibody or polypeptide can be immobilized on a solid support, such as a bead, through a covalent amide bond formed between a carboxyl group functionalized bead and the amino terminus of the polypeptide or, conversely, through a covalent amide bond formed between an amino group functionalized bead and the carboxyl terminus of the polypeptide. In addition, a bi-functional trityl linker can be attached to the support, e.g., to the 4-nitrophenyl active ester on a resin, such as a Wang resin, through an amino group or a carboxyl group on the resin via an amino resin. Using a bi-functional trityl approach, the solid support can require treatment with a volatile acid, such as formic acid or trifluoroacetic acid to ensure that the polypeptide is cleaved and can be removed. In such a case, the polypeptide can be deposited as a beadless patch at the bottom of a well of a solid support or on the flat surface of a solid support. After addition of a matrix solution, the polypeptide can be desorbed into a MS.

Hydrophobic trityl linkers can also be exploited as acid-labile linkers by using a volatile acid or an appropriate matrix solution, e.g., a matrix solution containing 3-HPA, to cleave an amino linked trityl group from the polypeptide. Acid lability can also be changed. For example, trityl, monomethoxytrityl, dimethoxytrityl or trimethoxytrityl can be changed to the appropriate p-substituted, or more acid-labile tritylamine derivatives, of the polypeptide, i.e., trityl ether and tritylamine bonds can be made to the polypeptide. Accordingly, a polypeptide can be removed from a hydrophobic linker, e.g., by disrupting the hydrophobic attraction or by cleaving tritylether or tritylamine bonds under acidic conditions, including, if desired, under typical MS conditions, where a matrix, such as 3-HPA acts as an acid.

Orthogonally cleavable linkers can also be useful for binding a first solid support, e.g., a bead to a second solid support, or for binding a polypeptide of interest to a solid support. Using such linkers, a first solid support, e.g., a bead, can be selectively cleaved from a second solid support, without cleaving the polypeptide from the support; the polypeptide then can be cleaved from the bead at a later time. For example, a disulfide linker, which can be cleaved using a reducing agent, such as DTT, can be employed to bind a bead to a second solid support, and an acid cleavable bi-functional trityl group could be used to immobilize a polypeptide to the support. As desired, the linkage of the polypeptide to the solid support can be cleaved first, e.g., leaving the linkage between the first and second support intact. Trityl linkers can provide a covalent or hydrophobic conjugation and, regardless of the nature of the conjugation, the trityl group is readily cleaved in acidic conditions.

For example, a bead can be bound to a second support through a linking group which can be selected to have a length and a chemical nature such that high density binding of the beads to the solid support, or high density binding of the polypeptides to the beads, is promoted. Such a linking group can have, e.g., "tree-like" structure, thereby providing a multiplicity of functional groups per attachment site on a solid support. Examples of such linking group; include polylysine, polyglutamic acid, penta-erythrole and tris-hydroxy-aminomethane.

Noncovalent Binding Association. An antibody or polypeptide can be conjugated to a solid support, or a first solid support can also be conjugated to a second solid support, through a noncovalent interaction. For example, a magnetic bead made of a ferromagnetic material, which is capable of being magnetized, can be attracted to a magnetic solid support, and can be released from the support by removal of the magnetic field. Alternatively, the solid support can be provided with an ionic or hydrophobic moiety, which can allow the interaction of an ionic or hydrophobic moiety, respectively, with a polypeptide, e.g., a polypeptide containing an attached trityl group or with a second solid support having hydrophobic character.

A solid support can also be provided with a member of a specific binding pair and, therefore, can be conjugated to a polypeptide or a second solid support containing a complementary binding moiety. For example, a bead coated with avidin or with streptavidin can be bound to a polypeptide having a biotin moiety incorporated therein, or to a second solid support coated with biotin or derivative of biotin, such as iminobiotin.

It should be recognized that any of the binding members disclosed herein or otherwise known in the art can be reversed. Thus, biotin, e.g., can be incorporated into either a polypeptide or a solid support and, conversely, avidin or other biotin binding moiety would be incorporated into the support or the polypeptide, respectively. Other specific binding pairs contemplated for use herein include, but are not limited to, hormones and their receptors, enzyme, and their substrates, a nucleotide sequence and its complementary sequence, an antibody and the antigen to which it interacts specifically, and other such pairs knows to those skilled in the art.

A. Diagnostic Uses of the Anti-DLL3 Antibodies of the Present Technology

General. The anti-DLL3 antibodies of the present technology are useful in diagnostic methods. As such, the present technology provides methods using the antibodies in the diagnosis of DLL3 activity in a subject. The anti-DLL3 antibodies of the present technology may be selected such that they have any level of epitope binding specificity and very high binding affinity to a DLL3 polypeptide. In general, the higher the binding affinity of an antibody, the more stringent wash conditions can be performed in an immunoassay to remove nonspecifically bound material without removing target polypeptide. Accordingly, the anti-DLL3 antibodies of the present technology useful in diagnostic assays usually have binding affinities of about $10^8$ M$^{-1}$, $10^9$ M$^{-1}$, $10^{10}$ M$^{-1}$, $10^{11}$ M$^{-1}$ or $10^{12}$ M$^{-1}$. Further, it is desirable that anti-DLL3 antibodies used as diagnostic reagents have a sufficient kinetic on-rate to reach equilibrium under standard conditions in at least 12 h, at least five (5) h, or at least one (1) hour.

Anti-DLL3 antibodies can be used to detect an immunoreactive DLL3 protein in a variety of standard assay formats. Such formats include immunoprecipitation, Western blotting, ELISA, radioimmunoassay, and immunometric assays. See Harlow & Lane, Antibodies, A Laboratory Manual (Cold Spring Harbor Publications, New York, 1988); U.S. Pat. Nos. 3,791,932; 3,839,153; 3,850,752; 3,879,262; 4,034,074, 3,791,932; 3,817,837; 3,839,153; 3,850,752; 3,850,578; 3,853,987; 3,867,517; 3,879,262; 3,901,654; 3,935,074; 3,984,533; 3,996,345; 4,034,074; and 4,098,876. Biological samples can be obtained from any tissue or body fluid of a subject. In certain embodiments, the subject is at an early stage of cancer. In one embodiment, the early stage of cancer is determined by the level or expression pattern of DLL3 protein in a sample obtained from the subject. In certain embodiments, the sample is selected from the group consisting of urine, blood, serum, plasma, saliva, amniotic fluid, cerebrospinal fluid (CSF), and biopsied body tissue.

Immunometric or sandwich assays are one format for the diagnostic methods of the present technology. See U.S. Pat. Nos. 4,376,110, 4,486,530, 5,914,241, and 5,965,375. Such assays use one antibody, e.g., the anti-DLL3 antibody or a population of anti-DLL3 antibodies immobilized to a solid phase, and another anti-DLL3 antibody or a population of anti-DLL3 antibodies in solution. Typically, the solution anti-DLL3 antibody or population of anti-DLL3 antibodies is labeled. If an antibody population is used, the population can contain antibodies binding to different epitope specificities within the target polypeptide. Accordingly, the same population can be used for both solid phase and solution antibody. If anti-DLL3 monoclonal antibodies are used, first and second DLL3 monoclonal antibodies having different binding specificities are used for the solid and solution phase. Solid phase (also referred to as "capture") and solution (also referred to as "detection") antibodies can be contacted with target antigen in either order or simultaneously. If the solid phase antibody is contacted first, the assay is referred to as being a forward assay. Conversely, if the solution antibody is contacted first, the assay is referred to as being a reverse assay. If the target is contacted with both antibodies simultaneously, the assay is referred to as a simultaneous assay. After contacting the DLL3 protein with the anti-DLL3 antibody, a sample is incubated for a period that usually varies from about 10 min to about 24 hr and is usually about 1 hr. A wash step is then performed to remove components of the sample not specifically bound to the anti-DLL3 antibody being used as a diagnostic reagent. When solid phase and solution antibodies are bound in separate steps, a wash can be performed after either or both binding steps. After washing, binding is quantified, typically by detecting a label linked to the solid phase through binding of labeled solution antibody. Usually for a given pair of antibodies or populations of antibodies and given reaction conditions, a calibration curve is prepared from samples containing known concentrations of target antigen. Concentrations of the immunoreactive DLL3 protein in samples being tested are then read by interpolation from the calibration curve (i.e., standard curve). Analyte can be measured either from the amount of labeled solution antibody bound at equilibrium or by kinetic measurements of bound labeled solution antibody at a series of time points before equilibrium is reached. The slope of such a curve is a measure of the concentration of the DLL3 protein in a sample.

Suitable supports for use in the above methods include, e.g., nitrocellulose membranes, nylon membranes, and derivatized nylon membranes, and also particles, such as agarose, a dextran-based gel, dipsticks, particulates, microspheres, magnetic particles, test tubes, microtiter wells, SEPHADEX™ (Amersham Pharmacia Biotech, Piscataway N.J.), and the like. Immobilization can be by absorption or by covalent attachment. Optionally, anti-DLL3 antibodies can be joined to a linker molecule, such as biotin for attachment to a surface bound linker, such as avidin.

In some embodiments, the present disclosure provides an anti-DLL3 antibody of the present technology conjugated to a diagnostic agent. The diagnostic agent may comprise a radioactive or non-radioactive label, a contrast agent (such as for magnetic resonance imaging, computed tomography or ultrasound), and the radioactive label can be a gamma-, beta-, alpha-, Auger electron-, or positron-emitting isotope. A diagnostic agent is a molecule which is administered conjugated to an antibody moiety, i.e., antibody or antibody fragment, or subfragment, and is useful in diagnosing or detecting a disease by locating the cells containing the antigen.

Useful diagnostic agents include, but are not limited to, radioisotopes, dyes (such as with the biotin-streptavidin complex), contrast agents, fluorescent compounds or molecules and enhancing agents (e.g., paramagnetic ions) for magnetic resonance imaging (MRI). U.S. Pat. No. 6,331,175 describes MRI technique and the preparation of antibodies conjugated to a MRI enhancing agent and is incorporated in its entirety by reference. In some embodiments, the diagnostic agents are selected from the group consisting of radioisotopes, enhancing agents for use in magnetic resonance imaging, and fluorescent compounds. In order to load an antibody component with radioactive metals or paramagnetic ions, it may be necessary to react it with a reagent having a long tail to which are attached a multiplicity of chelating groups for binding the ions. Such a tail can be a polymer such as a polylysine, polysaccharide, or other derivatized or derivatizable chain having pendant groups to which can be bound chelating groups such as, e.g., ethylenediaminetetraacetic acid (EDTA), diethylenetriaminepentaacetic acid (DTPA), porphyrins, polyamines, crown ethers, bis-thiosemicarbazones, polyoximes, and like groups known to be useful for this purpose. Chelates may be coupled to the antibodies of the present technology using standard chemistries. The chelate is normally linked to the antibody by a group which enables formation of a bond to the molecule with minimal loss of immunoreactivity and minimal aggregation and/or internal cross-linking. Other methods and reagents for conjugating chelates to antibodies are disclosed in U.S. Pat. No. 4,824,659. Particularly useful metal-chelate combinations include 2-benzyl-DTPA and its monomethyl and cyclohexyl analogs, used with diagnostic isotopes for radio-imaging. The same chelates, when complexed with non-radioactive metals, such as manganese, iron and gadolinium are useful for MRI, when used along with the DLL3 antibodies of the present technology.

B. Therapeutic Uses of the Anti-DLL3 Antibodies of the Present Technology

The immunoglobulin-related compositions (e.g., antibodies or antigen binding fragments thereof) of the present technology are useful for the treatment of DLL3-associated cancers. Such treatment can be used in patients identified as having pathologically high levels of the DLL3 (e.g., those diagnosed by the methods described herein) or in patients diagnosed with a disease known to be associated with such pathological levels. In one aspect, the present disclosure provides a method for treating a DLL3-associated cancer in a subject in need thereof, comprising administering to the subject an effective amount of an antibody (or antigen binding fragment thereof) of the present technology. Examples of cancers that can be treated by the antibodies of the present technology include, but are not limited to: small cell lung carcinoma (SCLC), large cell neuroendocrine carcinoma (LCNEC), pulmonary neuroendocrine cancers, extrapulmonary neuroendocrine cancers, and melanoma.

The immunoglobulin-related compositions of the present technology may be employed in conjunction with other therapeutic agents useful in the treatment of DLL3-associated cancers. For example, the antibodies of the present technology may be separately, sequentially or simultaneously administered with at least one additional therapeutic agent, or be conjugated to at least one additional therapeutic agent, wherein the at least one additional therapeutic agent is selected from the group consisting of marine-derived compounds (e.g., dolastatin 10, auristatins, tasidotin, dolastatin 15 or variants thereof, monomethyl auristatin E (MMAE), monomethyl auristatin F (MMAF)) (see Newman & Cragg, *Mar Drugs*. 2017 April; 15(4): 99), vinca agents, anti-estrogen drugs, aromatase inhibitors, ovarian suppression agents, VEGF/VEGFR inhibitors, PARP inhibitors, cytostatic alkaloids, cytotoxic antibiotics, antimetabolites, endocrine/hormonal agents, bisphosphonate therapy agents and targeted biological therapy agents (e.g., therapeutic peptides described in U.S. Pat. No. 6,306,832, WO 2012007137, WO 2005000889, WO 2010096603 etc.), alkylating agents, alkyl sulfonates, amanitins, aziridines, ethylenimines and methylamelamines, acetogenins, a camptothecin, bryostatin, callystatin, CC-1065, cryptophycins, dolastatin, duocarmycin, eleutherobin, pancratistatin, a sarcodictyin, spongistatin, nitrogen mustards, antibiotics, enediyne antibiotics, dynemicin, bisphosphonates, esperamicin, chromoprotein enediyne antiobiotic chromophores, aclacinomysins, actinomycin, authramycin, azaserine, bleomycins, cactinomycin, carabicin, carminomycin, carzinophilin, chromomycins, dactinomycin, daunorubicin, detorubicin, 6-diazo-5-oxo-L-norleucine, ADRIAMYCIN® doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites, folic acid analogues, purine analogs, androgens, anti-adrenals, folic acid replenisher such as frolinic acid, aceglatone, aldophosphamide glycoside, aminolevulinic acid, eniluracil, amsacrine, bestrabucil, bisantrene, edatraxate, defo famine, demecolcine, diaziquone, elfornithine, elliptinium acetate, an epothilone, etoglucid, gallium nitrate, hydroxyurea, lentinan, lonidainine, maytansinoids, mitoguazone, mitoxantrone, mopidanmol, nitraerine, pentostatin, phenamet, pirarubicin, losoxantrone, podophyllinic acid, 2-ethylhydrazide, procarbazine, PSK® polysaccharide complex (JHS Natural Products, Eugene, OR), razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; vemurafenib; dacarbazine; mannomustine; mitobronitol; mitolactol; pipobroman; gacytosine; arabinoside ("Ara-C"); cyclophosphamide; thiotepa; taxoids, chloranbucil; GEMZAR® gemcitabine; 6-thioguanine; mercaptopurine; methotrexate; platinum analogs, vinblastine; platinum; etoposide (VP-16); ifosfamide; mitoxantrone; vincristine; NAVELBINE® vinorelbine; novantrone; teniposide; edatrexate; daunomycin; aminopterin; xeloda; ibandronate; irinotecan (Camptosar, CPT-11), topoisomerase inhibitor RFS 2000; difluorometlhylornithine; retinoids; capecitabine; combretastatin; leucovorin; oxaliplatin; inhibitors of PKC-alpha, Raf, H-Ras, EGFR and VEGF-A that reduce cell proliferation and pharmaceutically acceptable salts or solvates, acids or derivatives of any of the above. In some embodiments, the at least one additional therapeutic agent is a chemotherapeutic agent. Specific chemotherapeutic agents include, but are not limited to, cyclophosphamide, fluorouracil (or 5-fluorouracil or 5-FU), methotrexate, edatrexate (10-ethyl-10-deaza-aminopterin), thiotepa, carboplatin, cisplatin, taxanes, paclitaxel, protein-bound paclitaxel, docetaxel, vinorelbine, tamoxifen, raloxifene, toremifene, fulvestrant, gemcitabine, irinotecan, ixabepilone, temozolmide, topotecan, vincristine, vinblastine, eribulin, mutamycin, capecitabine, anastrozole, exemestane, letrozole, leuprolide, abarelix, buserlin, goserelin, megestrol acetate, risedronate, pamidronate, ibandronate, alendronate, denosumab, zoledronate, trastuzumab, tykerb, anthracyclines (e.g., daunorubicin and doxorubicin), bevacizumab, oxaliplatin, melphalan, etoposide, mechlorethamine, bleomycin, microtubule poisons, annonaceous acetogenins, auristatins, maytansinoids, tubulysins, calicheamicins, duocarmycins, benzodiazepines, camptothecins, or combinations thereof.

Other compatible anti-cancer agents comprise commercially or clinically available compounds such as erlotinib (TARCEVA®, Genentech/OSI Pharm.), docetaxel (TAXOTERE®, Sanofi-Aventis), 5-FU (fiuorouracil, 5-fluorouracil, CAS No. 51-21-8), PD-0325901 (CAS No. 391210-10-9, Pfizer), cisplatin (cis-diamine, dichloroplatinum(II), CAS No. 15663-27-1), carboplatin (CAS No. 41575-94-4), paclitaxel (TAXOL®, Bristol-Myers Squibb Oncology, Princeton, N.J.), trastuzumab (HERCEPTIN®, Genentech), temozolomide (4-methyl-5-oxo-2,3,4,6,8-pentazabicyclo [4.3.0] nona-2,7,9-triene-9-carboxamide, CAS No. 85622-93-1, TEMODAR®, TEMODAL®, Schering Plough), tamoxifen ((Z)-2-[4-(1,2-diphenylbut-1-enyl)phenoxy]-N,N-dimethylethanamine, NOLVADEX®, ISTUBAL®, VALODEX®), and doxorubicin (ADRIAMYCIN®). Additional commercially or clinically available anti-cancer agents comprise bortezomib (VELCADE®, Millennium Pharm.), sutent (SUNITINIB®, SU11248, Pfizer), letrozole (FEMARA®, Novartis), imatinib mesylate (GLEEVEC®, Novartis), XL-518 (Mek inhibitor, Exelixis, WO 2007/044515), ARRY-886 (Mek inhibitor, AZD6244, Array BioPharma, Astra Zeneca), SF-1126 (PI3K inhibitor, Semafore Pharmaceuticals), BEZ-235 (PI3K inhibitor, Novartis), XL-147 (PI3K inhibitor, Exelixis), PTK787/ZK 222584 (Novartis), fulvestrant (FASLODEX®, AstraZeneca), leucovorin (folinic acid), rapamycin (sirolimus, RAPAMUNE®, Wyeth), lapatinib (TYKERB®, GSK572016, Glaxo Smith Kline), lonafarnib (SARASAR™, SCH 66336, Schering Plough), sorafenib (NEXAVAR®, BAY43-9006, Bayer Labs), gefitinib (IRESSA®, AstraZeneca), irinotecan (CAMPTOSAR®, CPT-11, Pfizer), tipifarnib (ZARNESTRA™, Johnson & Johnson), ABRAXANE™ (Cremophor-free), albumin-engineered nanoparticle formulations of paclitaxel (American Pharmaceutical Partners, Schaumberg, Il), vandetanib (rINN, ZD6474, ZACTIMA®, AstraZeneca), chloranmbucil, AG1478, AG1571 (SU 5271; Sugen), temsirolimus (TORISEL®, Wyeth), pazopanib (GlaxoSmithKline), canfosfamide (TELCYTA®, Telik), thiotepa and cyclosphosphamide (CYTOXAN®, NEOSAR®);

vinorelbine (NAVELBINE®); capecitabine (XELODA®, Roche), tamoxifen (including NOLVADEX®; tamoxifen citrate, FARESTON® (toremifme citrate) MEGASE® (megestrol acetate), AROMASIN® (exemestane; Pfizer), formestanie, fadrozole, RIVISOR® (vorozole), FEMARA® and ARIMIDEX® (anastrozole; AstraZeneca); dabrafmib (TAFINLAR®, GlaxoSmithKline); dasatinib (SPRYCEL®, Bristol-Myers Squibb); trametinib (MEKINIST®, GlaxoSmithKline); nilotinib (TASIGNA®, Novartis), troxacitabine (a 1,3-dioxolane nucleoside cytosine analog); antisense oligonucleotides, ribozymes such as a VEGF expression inhibitor and a HER2 expression inhibitor; vaccines, PROLEUKIN® rIL-2; LURTOTECAN® topoisomerase 1 inhibitor; ABARELIX® rmRH; Vinorelbine and Esperamicins and pharmaceutically acceptable salts, acids or derivatives of any of the above.

The compositions of the present technology may optionally be administered as a single bolus to a subject in need thereof. Alternatively, the dosing regimen may comprise multiple administrations performed at various times after the appearance of tumors.

Administration can be carried out by any suitable route, including orally, intranasally, parenterally (intravenously, intramuscularly, intraperitoneally, or subcutaneously), rectally, intracranially, intratumorally, intrathecally, or topically. Administration includes self-administration and the administration by another. It is also to be appreciated that the various modes of treatment of medical conditions as described are intended to mean "substantial", which includes total but also less than total treatment, and wherein some biologically or medically relevant result is achieved.

In some embodiments, the antibodies of the present technology comprise pharmaceutical formulations which may be administered to subjects in need thereof in one or more doses. Dosage regimens can be adjusted to provide the desired response (e.g., a therapeutic response).

Typically, an effective amount of the antibody compositions of the present technology, sufficient for achieving a therapeutic effect, range from about 0.000001 mg per kilogram body weight per day to about 10,000 mg per kilogram body weight per day. Typically, the dosage ranges are from about 0.0001 mg per kilogram body weight per day to about 100 mg per kilogram body weight per day. For administration of anti-DLL3 antibodies, the dosage ranges from about 0.0001 to 100 mg/kg, and more usually 0.01 to 5 mg/kg every week, every two weeks or every three weeks, of the subject body weight. For example, dosages can be 1 mg/kg body weight or 10 mg/kg body weight every week, every two weeks or every three weeks or within the range of 1-10 mg/kg every week, every two weeks or every three weeks. In one embodiment, a single dosage of antibody ranges from 0.1-10,000 micrograms per kg body weight. In one embodiment, antibody concentrations in a carrier range from 0.2 to 2000 micrograms per delivered milliliter. An exemplary treatment regime entails administration once per every two weeks or once a month or once every 3 to 6 months. Anti-DLL3 antibodies may be administered on multiple occasions. Intervals between single dosages can be hourly, daily, weekly, monthly or yearly. Intervals can also be irregular as indicated by measuring blood levels of the antibody in the subject. In some methods, dosage is adjusted to achieve a serum antibody concentration in the subject of from about 75 μg/mL to about 125 μg/mL, 100 μg/mL to about 150 μg/mL, from about 125 μg/mL to about 175 μg/mL, or from about 150 μg/mL to about 200 μg/mL. Alternatively, anti-DLL3 antibodies can be administered as a sustained release formulation, in which case less frequent administration is required. Dosage and frequency vary depending on the half-life of the antibody in the subject. The dosage and frequency of administration can vary depending on whether the treatment is prophylactic or therapeutic. In prophylactic applications, a relatively low dosage is administered at relatively infrequent intervals over a long period of time. In therapeutic applications, a relatively high dosage at relatively short intervals is sometimes required until progression of the disease is reduced or terminated, or until the subject shows partial or complete amelioration of symptoms of disease. Thereafter, the patient can be administered a prophylactic regime.

In another aspect, the present disclosure provides a method for detecting a tumor in a subject in vivo comprising (a) administering to the subject an effective amount of an antibody (or antigen binding fragment thereof) of the present technology, wherein the antibody is configured to localize to a tumor expressing DLL3 and is labeled with a radioisotope; and (b) detecting the presence of a tumor in the subject by detecting radioactive levels emitted by the antibody that are higher than a reference value. In some embodiments, the reference value is expressed as injected dose per gram (% ID/g). The reference value may be calculated by measuring the radioactive levels present in non-tumor (normal) tissues, and computing the average radioactive levels present in non-tumor (normal) tissues ±standard deviation. In some embodiments, the ratio of radioactive levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

In some embodiments, the subject is diagnosed with or is suspected of having cancer. Radioactive levels emitted by the antibody may be detected using positron emission tomography or single photon emission computed tomography.

Additionally or alternatively, in some embodiments, the method further comprises administering to the subject an effective amount of an immunoconjugate comprising an antibody of the present technology conjugated to a radionuclide. In some embodiments, the radionuclide is an alpha particle-emitting isotope, a beta particle-emitting isotope, an Auger-emitter, or any combination thereof. Examples of beta particle-emitting isotopes include $^{86}Y$, $^{90}Y$, $^{89}Sr$, $^{165}Dy$, $^{186}Re$, $^{188}Re$, $^{177}Lu$, and $^{67}Cu$. Examples of alpha particle-emitting isotopes include $^{213}Bi$, $^{211}At$, $^{225}Ac$, $^{152}Dy$, $^{212}Bi$, $^{223}Ra$, $^{219}Rn$, $^{215}Po$, $^{211}Bi$, $^{221}Fr$, $^{217}At$, and $^{255}Fm$. Examples of Auger-emitters include $^{111}In$, $^{67}Ga$, $^{51}Cr$, $^{58}Co$, $^{99m}Tc$, $^{103m}Rh$, $^{195m}Pt$, $^{119}Sb$, $^{161}Ho$, $^{189m}Os$, $^{192}I$, $^{201}Tl$, and $^{203}Pb$. In some embodiments of the method, nonspecific FcR-dependent binding in normal tissues is eliminated or reduced (e.g., via N297A mutation in Fc region, which results in aglycosylation). The therapeutic effectiveness of such an immunoconjugate may be determined by computing the area under the curve (AUC) tumor:AUC normal tissue ratio. In some embodiments, the immunoconjugate has a AUC tumor:AUC normal tissue ratio of about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

Toxicity. Optimally, an effective amount (e.g., dose) of an anti-DLL3 antibody described herein will provide therapeutic benefit without causing substantial toxicity to the subject. Toxicity of the anti-DLL3 antibody described herein can be determined by standard pharmaceutical procedures in cell cultures or experimental animals, e.g., by determining the $LD_{50}$ (the dose lethal to 50% of the population) or the $LD_{100}$ (the dose lethal to 100% of the population). The dose ratio between toxic and therapeutic effect is the therapeutic index. The data obtained from these cell culture assays and animal studies can be used in formulating a dosage range that is not toxic for use in human. The dosage of the anti-DLL3 antibody described herein lies within a range of circulating concentrations that include the effective dose with little or no toxicity. The dosage can vary within this range depending upon the dosage form employed and the route of administration utilized. The exact formulation, route of administration and dosage can be chosen by the individual physician in view of the subject's condition. See, e.g., Fingl et al., In: *The Pharmacological Basis of Therapeutics*, Ch. 1 (1975).

Formulations of Pharmaceutical Compositions. According to the methods of the present technology, the anti-DLL3 antibody can be incorporated into pharmaceutical compositions suitable for administration. The pharmaceutical compositions generally comprise recombinant or substantially purified antibody and a pharmaceutically-acceptable carrier in a form suitable for administration to a subject. Pharmaceutically-acceptable carriers are determined in part by the particular composition being administered, as well as by the particular method used to administer the composition. Accordingly, there is a wide variety of suitable formulations of pharmaceutical compositions for administering the antibody compositions (See, e.g., *Remington's Pharmaceutical Sciences*, Mack Publishing Co., Easton, PA 18$^{th}$ ed., 1990). The pharmaceutical compositions are generally formulated as sterile, substantially isotonic and in full compliance with all Good Manufacturing Practice (GMP) regulations of the U.S. Food and Drug Administration.

The terms "pharmaceutically-acceptable," "physiologically-tolerable," and grammatical variations thereof, as they refer to compositions, carriers, diluents and reagents, are used interchangeably and represent that the materials are capable of administration to or upon a subject without the production of undesirable physiological effects to a degree that would prohibit administration of the composition. For example, "pharmaceutically-acceptable excipient" means an excipient that is useful in preparing a pharmaceutical composition that is generally safe, non-toxic, and desirable, and includes excipients that are acceptable for veterinary use as well as for human pharmaceutical use. Such excipients can be solid, liquid, semisolid, or, in the case of an aerosol composition, gaseous. "Pharmaceutically-acceptable salts and esters" means salts and esters that are pharmaceutically-acceptable and have the desired pharmacological properties. Such salts include salts that can be formed where acidic protons present in the composition are capable of reacting with inorganic or organic bases. Suitable inorganic salts include those formed with the alkali metals, e.g., sodium and potassium, magnesium, calcium, and aluminum. Suitable organic salts include those formed with organic bases such as the amine bases, e.g., ethanolamine, diethanolamine, triethanolamine, tromethamine, N-methylglucamine, and the like. Such salts also include acid addition salts formed with inorganic acids (e.g., hydrochloric and hydrobromic acids) and organic acids (e.g., acetic acid, citric acid, maleic acid, and the alkane- and arene-sulfonic acids such as methanesulfonic acid and benzenesulfonic acid). Pharmaceutically-acceptable esters include esters formed from carboxy, sulfonyloxy, and phosphonoxy groups present in the anti-DLL3 antibody, e.g., $C_{1-6}$ alkyl esters. When there are two acidic groups present, a pharmaceutically-acceptable salt or ester can be a mono-acid-mono-salt or ester or a di-salt or ester; and similarly where there are more than two acidic groups present, some or all of such groups can be salified or esterified. An anti-DLL3 antibody named in this technology can be present in unsalified or unesterified form, or in salified and/or esterified form, and the naming of such anti-DLL3 antibody is intended to include both the original (unsalified and unesterified) compound and its pharmaceutically-acceptable salts and esters. Also, certain embodiments of the present technology can be present in more than one stereoisomeric form, and the naming of such anti-DLL3 antibody is intended to include all single stereoisomers and all mixtures (whether racemic or otherwise) of such stereoisomers. A person of ordinary skill in the art, would have no difficulty determining the appropriate timing, sequence and dosages of administration for particular drugs and compositions of the present technology.

Examples of such carriers or diluents include, but are not limited to, water, saline, Ringer's solutions, dextrose solution, and 5% human serum albumin. Liposomes and non-aqueous vehicles such as fixed oils may also be used. The use of such media and compounds for pharmaceutically active substances is well known in the art. Except insofar as any conventional media or compound is incompatible with the anti-DLL3 antibody, use thereof in the compositions is contemplated. Supplementary active compounds can also be incorporated into the compositions.

A pharmaceutical composition of the present technology is formulated to be compatible with its intended route of administration. The anti-DLL3 antibody compositions of the present technology can be administered by parenteral, topical, intravenous, oral, subcutaneous, intraarterial, intradermal, transdermal, rectal, intracranial, intrathecal, intraperitoneal, intranasal; or intramuscular routes, or as inhalants. The anti-DLL3 antibody can optionally be administered in combination with other agents that are at least partly effective in treating various DLL3-associated cancers.

Solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial compounds such as benzyl alcohol or methyl parabens; antioxidants such as ascorbic acid or sodium bisulfite; chelating compounds such as ethylenediaminetetraacetic acid (EDTA); buffers such as acetates, citrates or phosphates, and compounds for the adjustment of tonicity such as sodium chloride or dextrose. The pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, N.J.) or phosphate buffered saline (PBS). In all cases, the composition must be sterile and should be fluid to the extent that easy syringeability exists. It must be stable under the conditions of manufacture and storage and must be preserved against the contaminating action of microorganisms such as bacteria and fungi. The carrier can be a solvent or dispersion medium containing, e.g., water, ethanol, polyol (e.g., glycerol, propylene glycol, and liquid polyethylene glycol, and the like), and suitable mixtures thereof. The proper fluidity can be maintained, e.g., by the use of a coating such as lecithin, by the maintenance of the required particle size in the case of dispersion and by the use of surfactants. Prevention of the action of microorganisms can be achieved by various antibacterial and antifungal compounds, e.g., parabens, chlorobutanol, phenol, ascorbic acid, thimerosal, and the like. In many cases, it will be desirable to include isotonic compounds, e.g., sugars, polyalcohols such as manitol, sorbitol, sodium chloride in the composition. Prolonged absorption of the injectable compositions can be brought about by including in the composition a compound which delays absorption, e.g., aluminum monostearate and gelatin.

Sterile injectable solutions can be prepared by incorporating an anti-DLL3 antibody of the present technology in the required amount in an appropriate solvent with one or a combination of ingredients enumerated above, as required, followed by filtered sterilization. Generally, dispersions are prepared by incorporating the anti-DLL3 antibody into a sterile vehicle that contains a basic dispersion medium and the required other ingredients from those enumerated above. In the case of sterile powders for the preparation of sterile injectable solutions, methods of preparation are vacuum drying and freeze-drying that yields a powder of the active ingredient plus any additional desired ingredient from a previously sterile-filtered solution thereof. The antibodies of the present technology can be administered in the form of a depot injection or implant preparation which can be formulated in such a manner as to permit a sustained or pulsatile release of the active ingredient.

Oral compositions generally include an inert diluent or an edible carrier. They can be enclosed in gelatin capsules or compressed into tablets. For the purpose of oral therapeutic administration, the anti-DLL3 antibody can be incorporated with excipients and used in the form of tablets, troches, or capsules. Oral compositions can also be prepared using a fluid carrier for use as a mouthwash, wherein the compound in the fluid carrier is applied orally and swished and expectorated or swallowed. Pharmaceutically compatible binding compounds, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating compound such as alginic acid, Primogel, or corn starch; a lubricant such as magnesium stearate or Sterotes; a glidant such as colloidal silicon dioxide; a sweetening compound such as sucrose or saccharin; or a flavoring compound such as peppermint, methyl salicylate, or orange flavoring.

For administration by inhalation, the anti-DLL3 antibody is delivered in the form of an aerosol spray from pressured container or dispenser which contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are generally known in the art, and include, e.g., for transmucosal administration, detergents, bile salts, and fusidic acid derivatives. Transmucosal administration can be accomplished through the use of nasal sprays or suppositories. For transdermal administration, the anti-DLL3 antibody is formulated into ointments, salves, gels, or creams as generally known in the art.

The anti-DLL3 antibody can also be prepared as pharmaceutical compositions in the form of suppositories (e.g., with conventional suppository bases such as cocoa butter and other glycerides) or retention enemas for rectal delivery.

In one embodiment, the anti-DLL3 antibody is prepared with carriers that will protect the anti-DLL3 antibody against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art. The materials can also be obtained commercially from Alza Corporation and Nova Pharmaceuticals, Inc. Liposomal suspensions (including liposomes targeted to infected cells with monoclonal antibodies to viral antigens) can also be used as pharmaceutically-acceptable carriers. These can be prepared according to methods known to those skilled in the art, e.g., as described in U.S. Pat. No. 4,522,811.

C. Kits

The present technology provides kits for the detection and/or treatment of DLL3-associated cancers, comprising at least one immunoglobulin-related composition of the present technology (e.g., any antibody or antigen binding fragment described herein), or a functional variant (e.g., substitutional variant) thereof. Optionally, the above described components of the kits of the present technology are packed in suitable containers and labeled for diagnosis and/or treatment of DLL3-associated cancers. The above-mentioned components may be stored in unit or multi-dose containers, for example, sealed ampoules, vials, bottles, syringes, and test tubes, as an aqueous, preferably sterile, solution or as a lyophilized, preferably sterile, formulation for reconstitution. The kit may further comprise a second container which holds a diluent suitable for diluting the pharmaceutical composition towards a higher volume. Suitable diluents include, but are not limited to, the pharmaceutically acceptable excipient of the pharmaceutical composition and a saline solution. Furthermore, the kit may comprise instructions for diluting the pharmaceutical composition and/or instructions for administering the pharmaceutical composition, whether diluted or not. The containers may be formed from a variety of materials such as glass or plastic and may have a sterile access port (for example, the container may be an intravenous solution bag or a vial having a stopper which may be pierced by a hypodermic injection needle). The kit may further comprise more containers comprising a pharmaceutically acceptable buffer, such as phosphate-buffered saline, Ringer's solution and dextrose solution. It may further include other materials desirable from a commercial and user standpoint, including other buffers, diluents, filters, needles, syringes, culture medium for one or more of the suitable hosts. The kits may optionally include instructions customarily included in commercial packages of therapeutic or diagnostic products, that contain information about, for example, the indications, usage, dosage, manufacture, administration, contraindications and/or warnings concerning the use of such therapeutic or diagnostic products.

The kits are useful for detecting the presence of an immunoreactive DLL3 in a biological sample, e.g., any body fluid including, but not limited to, e.g., serum, plasma, lymph, cystic fluid, urine, stool, cerebrospinal fluid, ascitic fluid or blood and including biopsy samples of body tissue. For example, the kit can comprise: one or more humanized, chimeric, or bispecific anti-DLL3 antibodies of the present technology (or antigen binding fragments thereof) capable of binding a DLL3 in a biological sample; means for determining the amount of the DLL3 in the sample; and means for comparing the amount of the immunoreactive DLL3 in the sample with a standard. One or more of the anti-DLL3 antibodies may be labeled. The kit components, (e.g., reagents) can be packaged in a suitable container. The kit can further comprise instructions for using the kit to detect the immunoreactive DLL3.

For antibody-based kits, the kit can comprise, e.g., 1) a first antibody, e.g. a humanized, chimeric, or bispecific DLL3 antibody of the present technology (or an antigen binding fragment thereof), attached to a solid support, which binds to a DLL3 polypeptide; and, optionally; 2) a second, different antibody which binds to either the DLL3 polypeptide or to the first antibody, and is conjugated to a detectable label.

The kit can also comprise, e.g., a buffering agent, a preservative or a protein-stabilizing agent. The kit can further comprise components necessary for detecting the detectable-label, e.g., an enzyme or a substrate. The kit can also contain a control sample or a series of control samples, which can be assayed and compared to the test sample. Each component of the kit can be enclosed within an individual container and all of the various containers can be within a single package, along with instructions for interpreting the results of the assays performed using the kit. The kits of the present technology may contain a written product on or in the kit container. The written product describes how to use the reagents contained in the kit, e.g., for detection of a DLL3 polypeptide in vitro or in vivo, or for treatment of DLL3-associated cancers in a subject in need thereof. In certain embodiments, the use of the reagents can be according to the methods of the present technology.

EXAMPLES

The present technology is further illustrated by the following Examples, which should not be construed as limiting in any way. The following Examples demonstrate the preparation, characterization, and use of illustrative anti-DLL3 antibodies of the present technology.

Example 1: Generation of Monoclonal Antibodies

The extracellular domain (ECD) of DLL3 (GenBank accession number Q9NY J7-1) corresponding to amino acids Ala27-Ala479 with a C-terminal 6xHis tag (SEQ ID NO: 59) produced in HEK293T cells stably expressing full length DLL3 were used as immunogens. Ablexis AlivaMAb Kappa Mice (Ablexis, San Diego, CA) harboring a human immunoglobulin repertoire were immunized either with soluble DLL3-ECD or stable cells following standard immunization techniques over a period of 3 weeks. Splenocytes and draining lymph node cells from mice with high serum titers specific for DLL3 were harvested and fused with mouse myeloma cells to generate hybridomas using electrofusion. These hybridomas were then screened to identify the presence of antibodies that bound specifically to soluble DLL3-ECD by ELISA and full-length DLL3 protein on stably expressing 293 cells by flow cytometry versus parental 293 cells. Hybridomas were selected for further investigation by ranking in flow cytometry for staining intensity on 293 DLL3 transfectants along with 4° C./37° C. staining as described below.

Example 2: The 4/37 Internalization Assay with the Monoclonal Antibodies 6-G23-F, 2-C8-A, 7-I1-B and 10-O18-A The four monoclonal antibodies (6-G23-F, 2-C8-A, 7-I1-B and 10-O18-A) were compared for their ability to internalize DLL3 by comparing the staining at 4° C. with that at 37° C. A reference monoclonal antibody SC16, which is known to internalize via DLL3 and to have ADC activity, and which was previously reported in the literature, was used as the positive control for internalization. NCI-H82 cells in exponential growth were harvested with trypsin/EDTA, washed once in RPMI containing 10% fetal calf serum (FCS) and resuspended in DMEM supplemented with 10% FCS at $2 \times 10^7$ cells/ml. 100 µl ($2 \times 10^6$ cells) were added to U bottom 96 well plates. The test monoclonal antibodies (6-G23-F, 2-C8-A, 7-I1-B or 10-O18-A) or the reference monoclonal antibody were added to separate wells to give a final concentration of 10 µg/ml in duplicate plates. Both plates were held at 4° C. for 30 minutes after which both plates were washed 2x with cold RPMI supplemented with 10% FCS and resuspended in RPMI supplemented with 10% FCS. One plate was held at 4° C. (the control plate) and the other plate was incubated at 37° C. in a $CO_2$ incubator (the experimental plate). After 4 hours incubation at 37° C. in a $CO_2$ incubator for the experimental plate and at 4° C. for the control plate, the cells were washed 3 times at 4° C. with cold wash buffer (PBS containing 0.5% BSA). Then the samples were re-suspended in cold wash buffer+R-Phycoerythrin-AffiniPure F(ab')2 Fragment Goat Anti-Mouse IgG (Jackson 115-116-071) at a final concentration of 7 µg/ml in wash buffer. After 30 minutes incubation at 4° C. the cells were washed three times in cold wash buffer and either fixed in PBS 0.5% paraformaldehyde and analyzed by flow cytometry within 48 hours. The mean fluorescent intensity (MFI) ratios calculated by dividing the MFI obtained from the control plate (which incubated with the antibodies at 4° C.) by the corresponding MFI obtained from the experimental plate (which incubated with the antibodies at 37° C.) was taken as a relative measure of internalization. A high value indicated greater internalization. As shown in the Table below, all of the monoclonal antibodies (6-G23-F, 2-C8-A, 7-I1-B and 10-O18-A) were able to internalize on binding DLL3 but not to the extent of the reference monoclonal antibody.

| Clone | MFI Ratio |
| --- | --- |
| 6-G23-F | 1.67 |
| 2-C8-A | 1.76 |
| 7-I1-B | 1.68 |
| 10-O18-A | 1.56 |
| Reference Monoclonal antibody | 2.66 |
| Mouse IgG1 | 1.28 |

These results demonstrate that the immunoglobulin-related compositions of the present technology undergo internalization via binding to DLL3. Accordingly, the immunoglobulin-related compositions disclosed herein are useful for delivering therapeutic agents to DLL3-positive cancer cells.

Example 3: The Quenching Internalization Assay for Monoclonal Antibodies 6-G23-F, 2-C8-A, 7-I1-B and 10-O18-A To rank the monoclonal antibodies with respect to internalization, a Quenching Internalization Assay was used. This method reflects internalization and entry into the endosome/lysosome pathway. A goat anti-mouse IgG1 F(ab) (Jackson Immunoresearch 115-007-185) was doubly labelled with Dy light Dy650 NHS ester (Thermofisher 02206) and a LICOR IRDye QC1 NHS ester (LICOR 929-7030) (the doubly labelled antibody is referred to as "F(ab) Dy650-QC1" herein). The principle of this assay is as follows: F(ab) Dy650-QC1 is not fluorescent because the Dy light Dy650 fluorescence is quenched by TRDye QC1. However, upon internalization, the F(ab) Dy650-QC1 is degraded via the endosome/lysosome pathway, and resultant release of the IRDye QC1 makes the fluorescence of Dy light Dy650 observable. Accordingly, the Dy light Dy650 fluorescence signal was taken as a measure of internalization via the lysosomes. Briefly, NCI-H82 cells in exponential growth were harvested with trypsin/EDTA, washed once in growth media RPMI supplemented with 10% FCS and re-suspended in of growth media and $1.25 \times 10^6$ cell (80 μl) were added per well. Monoclonal DLL3 antibodies at 200 μg/ml concentration were mixed with the goat anti-mouse IgG1 Dy650 QC1 at 200 μg/ml at room temperature for 20 minutes, and 20 μl of the mixture added to the cells. After 30 minutes incubation at 4° C. the cells were washed twice with the growth media, resuspended in the growth media and transferred to 37° C. in a $CO_2$ incubator for 4 hours to allow internalization. The cells were then washed 2× with ice cold PBS containing 0.5% BSA and analyzed on by flow cytometry, and the Mean Fluorescent Intensity was determined. The Mean Fluorescent Intensity of the control reference monoclonal was set at 100% internalization. As shown in the Table below, all four monoclonal antibodies demonstrated internalization and entry into the endosome/lysosome pathway.

| Clone | Dy light Dy658 Fluorescence (% of the Control Reference Monoclonal Antibody) |
|---|---|
| 6-G23-F (10 μg/ml) | 76.5 |
| 7-I1-B (10 μg/ml) | 70.1 |
| 2-C8-A (10 μg/ml) | 62.9 |
| 10-O18-A (10 μg/ml) | 62.2 |
| Isotype Control | 20 |

These results demonstrate that the immunoglobulin-related compositions of the present technology undergo internalization via binding to DLL3, and enter the phagosome/lysosome compartment of the cells. Accordingly, the immunoglobulin-related compositions disclosed herein are useful for delivering therapeutic agents to DLL3-positive cancer cells.

Example 4: The Fab ZAP Assay for the Panel of Anti-DLL3 Monoclonal Antibodies

A Fab ZAP assay was used as another way to measure internalization. The Fab ZAP assay measures the delivery of a toxin to a cell via internalization of the anti-DLL3 monoclonal antibody. The Fab ZAP assay uses the saporin toxin conjugated F(ab) anti-mouse heavy and Light Chain to tag the monoclonal antibodies with toxin. A kit from Advanced Targeting Systems was used, and the Fab ZAP assay protocol was followed to characterize the panel of anti-DLL3 monoclonal antibodies. Briefly, NCI-H82 cells in exponential growth are harvested with trypsin/EDTA, washed once in RMPI supplemented with 10% FCS and plated at 5000 cells/well in 96 well white solid plates in 100 μl RPMI supplemented with 10% FCS. The next day, 25 μl of the purified monoclonal antibodies (G23-F, 2-C8-A, 7-I1-B or 10-O18-A) or the reference monoclonal monoclonal antibody, were added at a starting concentration of 10 μg/ml, and serial three fold dilutions performed. The saporin conjugated F(ab) anti-mouse Ig HL (Fab ZAP) was added in 25 μl to give a final concentration of 4.4 nM. After 3-4 days an equal volume of Cell Titre Glow (Promega G7571) was added to the plate, which was shaken on an orbital shaker for 2 minutes and after a further 10 minutes at room temperature the luminescence was read using a plate reader. All of the monoclonal antibodies were tested as full titrations in order to negate the prozone effect. As shown in FIG. 1 and the Table below, all of the monoclonal antibodies exhibited cytotoxic activity, comparable to the reference monoclonal antibody. In other experiments with these monoclonal antibodies, a mouse IgG1 control monoclonal antibody did not exhibit cytotoxic activity. Accordingly, these results demonstrate that the cytotoxic activity is mediated through recognition of DLL3 and not through FcRs.

|  | FAB ZAP % SC16 Max Killing |
|---|---|
| 6-G23-F (10 μg/ml) | 94.0 |
| 7-I1-B (10 μg/ml) | 97.0 |
| 10-O18-A (10 μg/ml) | 88.0 |
| 2-C8-A (10 μg/ml) | 89.0 |

These results demonstrate that the immunoglobulin-related compositions of the present technology can deliver therapeutic agents to tumors that express DLL3 on their cell surface. Accordingly, the immunoglobulin-related compositions disclosed herein are useful for delivering therapeutic agents to DLL3-positive cancer cells.

Example 5: Epitope Binning of Panel of Anti-DLL3 Monoclonal Antibodies

The panel of purified anti-DLL3 monoclonal antibodies and the reference monoclonal antibody were subjected to pairwise epitope binning on a Carterra® array surface plasmon resonance (SPR) assay platform (Carterra® Inc., Salt Lake City UT) where each monoclonal antibody was tested for the capture of Histidine-tagged DLL3 antigen (DLL3-His), and also for competing with every other antibody in the panel for the binding to DLL3-His. The antibodies were immobilized on a HC200M chip (ligand) through standard amine coupling techniques by the print array method. Then in each cycle antigen was injected across the entire array followed by a single antibody (analyte). At the end of each cycle the surface was regenerated to remove antigen and analyte before a new cycle started. As shown in the Table below, three different bins were identified with the panel with 7-I1-B and 2-C8-A mapping to bin 2 while 6-G23-F was in bin 3 and 10-O18-A was in bin 1.

| Monoclonal | Epitope Bin |
|---|---|
| 10-O18-A | 1 |
| 7-I1-B | 2 |
| 2-C8-A | 2 |
| 6-G23-F | 3 |

These results demonstrate that the immunoglobulin-related compositions of the present technology bind to three distinct epitopes present in DLL3 protein. Accordingly, the immunoglobulin-related compositions disclosed herein may be used in combination with each other for delivering multiple therapeutic agents to tumor cells expressing DLL3.

Example 6: Affinity Measurement

Binding affinities of the four monoclonal antibodies (6-G23-F, 2-C8-A, 7-I1-B and 10-O18-A) were determined by biolayer interferometry (BLI) using the Octet HTX instrument at 25° C. using PBS 0.1% BSA 0.02% Tween 20 as the binding buffer and 10 mM Glycine pH 1.7 as the regeneration buffer. The four purified monoclonal antibodies (5 μg/mL each) were loaded onto anti-mouse Fc sensors. Loaded sensors were dipped into a serial dilutions of Recombinant Human DLL3 Protein, (amino acids Ala27-Ala479, cat #9749-DL, R&D Systems) at a 200 nM starting concentration, with 7 serial 1:3 dilutions. As shown in FIGS. 2A-2D, binding was concentration-dependent. Dissociation constants ($K_D$) were calculated using a monovalent (1:1) binding model. As shown in FIG. 2E, all the monoclonal antibodies had affinities in the sub-nanomolar range. FIG. 7 shows that the 6-G23-F, 10-O18-A, and 2-C8-A monoclonal antibodies (mAbs) selectively bind DLL3, but not DLL1 or DLL4. The 7-I1-B mAb binds both DLL3 and DLL4, but not DLL1.

These results demonstrate that the immunoglobulin-related compositions of the present technology specifically bind DLL3 with high affinity. Accordingly, the immunoglobulin-related compositions of the present technology are useful in methods for detecting DLL3 protein in a biological sample.

Example 7: Binding of Monoclonal Antibodies to Transfected and Primary Cells The four monoclonal antibodies (6-G23-F, 2-C8-A, 7-I1-B and 10-O18-A) were tested for their ability to bind to mouse and cynomologus DLL3 as well as endogenous human DLL3 by flow cytometry. For this purpose, HEK293 cells were transfected with plasmid DNA encoding full-length human, mouse or cynomologus DLL3 and used in the experiment. Briefly $10^6$ transfected HEK293 cells or NCI-H82 primary cells were added in FACS buffer PBS 0.5% BSA to the wells of a 96 well U bottom plate and purified monoclonal added to 10 μg/ml. After 30 minutes incubation at 4° C. the cells were washed 3 times in FACS buffer and incubated with a PE labelled F(ab)2 anti-mouse IgG H and L $2^{nd}$ stage. After another 30 minutes incubation at 4° C. the cells were washed three times in FACS buffer and analyzed on the flow cytometer. Data are presented at the ratio of the Mean Fluorescent Intensity for the monoclonal divided by the background staining with the $2^{nd}$ stage. As shown in the Table below, all of the monoclonal antibodies cross reacted with cynomologus DLL3 and detected endogenous DLL3 on NCI H82 cells but only 6-G23-F and 7-I1-B bound to mouse DLL3.

| Monoclonal | 293 hDLL3 | 293 cyno DLL3 | 293 mDLL3 | 293 (negative control) | NCI-H82 |
|---|---|---|---|---|---|
| 6-G23-F | 6.33 | 13.06 | 3.97 | 1.32 | 11.10 |
| 7-I1-B | 9.74 | 18.67 | 4.70 | 1.46 | 19.21 |
| 10-O18-A | 4.74 | 9.85 | 0.99 | 0.60 | 9.40 |
| 2-C8-A | 7.71 | 15.03 | 1.50 | 0.59 | 11.89 |

These results demonstrate that the immunoglobulin-related compositions of the present technology are useful in methods for detecting DLL3 protein in a biological sample.

Example 8: Sequencing

Variable Heavy and Variable Light chains of the four monoclonal antibodies were isolated from the corresponding hybridomas for 7-I1-B, 6-G23-F, 2-C8-A and 10-O18-A by RACE (Rapid amplification of cDNA ends). RNA was isolated from lysed hybridoma with a RNAEasy kit (Qiagen). The mRNA was isolated for cDNA synthesis and PCR products were generated using the RACE kit. The PCR products were then cloned into a TOPO vector, PCR amplified, and subsequently gel isolated for sequencing. The nucleotide and amino acid sequences of heavy chain variable domain ($V_H$) and light chain variable domain ($V_L$) are shown in the Table below and FIGS. 3A-3D (7-I1-B). FIGS. 4A-4D (2-C8-A), FIGS. 5A-5D (10-O18-A) and FIGS. 6A-6D (6-G23-F).

| SEQ ID NO: | Description | Sequence |
|---|---|---|
| SEQ ID NO: 1 | Nucleotide Sequence of $V_H$ of 7-I1-B | GAGGTGCAGCTGGTGGAGTCTGGGGGGGGC TTGGTAAAGCCTGGGGGGTCCCTTAGACTCT CCTGTGCAGCCTCTGGATTCACTTTCAGTAA CACCTGGATGAGCTGGGTCCGCCAGGCTCC AGGGAAGGGGCTGGAGTGGGTTGGCCGTAT TAAAAGCAAATCTGATGGTGGGACAACAGA CTACGCTGCACCCGTGAAAGGCAGATTCAC CATCTCAAGAGATGATTCAAAAAACACGCT GTATCTGCAAATGAACAGCCTGAAAACCGA GGACACAGCCGTGTATTACTGTACCCAGTAT TATTGGAACTCCTTTGACTACTGGGGCCAGG GAACCCTGGTCACCGTCTCCTCA |
| SEQ ID NO: 2 | Amino acid Sequence of $V_H$ of 7-I1-B | EVQLVESGGGLVKPGGSLRLSCAASGFTFSNT WMSWVRQAPGKGLEWVGRIKSKSDGGTTDY AAPVKGRFTISRDDSKNTLYLQMNSLKTEDTA VYYCTQYYWNSFDYWGQGTLVTVSS |
| SEQ ID NO: 3 | Amino acid Sequence of $V_H$ CDR1 of 7-I1-B | GFTFSNTW |
| SEQ ID NO: 4 | Amino acid Sequence of $V_H$ CDR2 of 7-I1-B | IKSKSDGGTT |
| SEQ ID NO: 5 | Amino acid Sequence of $V_H$ CDR3 of 7-I1-B | TQYYWNSFDY |
| SEQ ID NO: 6 | Nucleotide Sequence of $V_L$ of 7-I1-B | GACATCCAGATGACCCAGTCTCCATCCTCCC TGTCTGCATCTGTAGGAGACAGAGTCACCAT CACTTGCCAGGCGAGTCAGGACATTAGCAA CTATTTAAATTGGTATCAGCAGAAACCAGG |

| SEQ ID NO: | Description | Sequence |
|---|---|---|
| | | GAAAGCCCTAAGCTCCTGATCTACGATGC ATCCAATTTGGAAACAGGGGTCCCATCAAG GTTCAGTGGAAGTGGATCTGGGACAGATTTT ACTTTCACCATCAGCAGCCTGCAGCCTGAAG ATATTGCAACATATTACTGTCAACAGTATGA TAATCTCCCGCTCACTTTCGGCGGAGGGACC AAGGTGGAGATCAAA |
| SEQ ID NO: 7 | Amino acid Sequence of $V_L$ of 7-I1-B | DIQMTQSPSSLSASVGDRVTITCQASQDISNYL NWYQQKPGKAPKLLIYDASNLETGVPSRFSGS GSGTDFTFTISSLQPEDIATYYCQQYDNLPLTF GGGTKVEIK |
| SEQ ID NO: 8 | Amino acid Sequence of $V_L$ CDR1 of 7-I1-B | QASQDISNYLN |
| SEQ ID NO: 9 | Amino acid Sequence of $V_L$ CDR2 of 7-I1-B | DASNLET |
| SEQ ID NO: 10 | Amino acid Sequence of $V_L$ CDR3 of 7-I1-B | QQYDNLPLT |
| SEQ ID NO: 11 | Nucleotide Sequence of $V_H$ of 2-C8-A | GAGGTGCAGCTGGTGGAGTCTGGGGGAGGC TTGGTCCAGCCTGGGGGGTCCCAGAGACTCT CCTGTGCAGCCTCTGGATTCACCTTTAGTAG CTATTGGATGAACTGGGTCCGCCAGGCTCCA GGGAAGGGGCTGGAGTGGGTGGCCAACATA AAGGAAGATGGAAGTGAGAAATACTATGTG GACTCTGTGAAGGGCCGATTCACCATCTCCA GAGACAACGCCAAGAACTCACTGTATCTGC AAATGAACAGCCTGAGAGCCGAGGACACGG CTGTGTATTACTGTGCGAGAGATCCGGGCTG GGCTCCCTTTGACTACTGGGGCCAGGGAAC CCTGGTCACCGTCTCCTCA |
| SEQ ID NO: 12 | Amino acid Sequence of $V_H$ of 2-C8-A | EVQLVESGGGLVQPGGSQRLSCAASGFTFSSY WMNWVRQAPGKGLEWVANIKEDGSEKYYV DSVKGRFTISRDNAKNSLYLQMNSLRAEDTA VYYCARDPGWAPFDYWGQGTLVTVSS |
| SEQ ID NO: 13 | Amino acid Sequence of $V_H$ CDR1 of 2-C8-A | GFTFSSY |
| SEQ ID NO: 14 | Amino acid Sequence of $V_H$ CDR2 of 2-C8-A | KEDGSE |
| SEQ ID NO: 15 | Amino acid Sequence of $V_H$ CDR3 of 2-C8-A | DPGWAPFDY |
| SEQ ID NO: 16 | Nucleotide Sequence of $V_L$ of 2-C8-A | GACATCCAGATGTCCCAGTCTCCATCCTCAC TGTCTGCATCTGTAGGAGACAGAGTCACCAT CACTTGTCGGGCGAGTCAGGGCATTAGCAA TTATTTAGCCTGGTTTCAGCAGAAACCAGGG AAAGCCCCTAAGTCCCTGATCTATGCTGCAT CCAGTTTGCAAAGTGGGGTCCCATCAAAGTT CAGCGGCAGTGGATCTGGGACAGATTTCAC TCTCGCCATCAGCAGCCTGCAGCCTGAAGAT TTTGCAACTTATTACTGCCAACAGTATAATA GTTTCCCGTACACTTTTGGCCAGGGGACCAC GCTGGAGATCAAA |
| SEQ ID NO: 17 | Amino acid Sequence of $V_L$ of 2-C8-A | DIQMSQSPSSLSASVGDRVTITCRASQGISNYL AWFQQKPGKAPKSLIYAASSLQSGVPSKFSGS GSGTDFTLAISSLQPEDFATYYCQQYNSFPYTF GQGTTLEIK |
| SEQ ID NO: 18 | Amino acid Sequence of $V_L$ CDR1 of 2-C8-A | RASQGISNYLA |
| SEQ ID NO: 19 | Amino acid Sequence of $V_L$ CDR2 of 2-C8-A | AASSLQS |
| SEQ ID NO: 20 | Amino acid Sequence of $V_L$ CDR3 of 2-C8-A | QQYNSFPYT |
| SEQ ID NO: 21 | Nucleotide Sequence of $V_H$ of 10-018-A | CAGGTGCAGCTGCAGGAGTCGGGCCCAGGA CTGGTGAAGCCTTCGGAGACCCTGTCCCTCA |

| SEQ ID NO: | Description | Sequence |
|---|---|---|
| | | CCTGCACTGTCTCTGGTGGCTCCATCAATAG<br>TTACTACTGGAGCTGGATCCGGCAGCCCCCA<br>GGGAAGGGACTGGAGTGGATTGGGTATATC<br>TTTTACAGTGGGATCACCAACTACAACCCCT<br>CCCTCAAGAGTCGAGTCACCATATCATTAGA<br>CACGTCCAAGAACCAGTTCTCCCTGAAGCTG<br>AGCTCTGTGACCGCTGCGGACACGGCCGTG<br>TATTACTGTGCGAGAATCGGCGTGGCTGGTT<br>TTTACTTTGACTACTGGGGCCAGGGAACCCT<br>GGTCACCGTCTCCTCA |
| SEQ ID NO: 22 | Amino acid Sequence of V$_H$ of 10-O18-A | QVQLQESGPGLVKPSETLSLTCTVSGGSINSYY<br>WSWIRQPPGKGLEWIGYIFYSGITNYNPSLKSR<br>VTISLDTSKNQFSLKLSSVTAADTAVYYCARI<br>GVAGFYFDYWGQGTLVTVSS |
| SEQ ID NO: 23 | Amino acid Sequence of V$_H$ CDR1 of 10-O18-A | GGSINSY |
| SEQ ID NO: 24 | Amino acid Sequence of V$_H$ CDR2 of 10-O18-A | FYSGI |
| SEQ ID NO: 25 | Amino acid Sequence of V$_H$ CDR3 of 10-O18-A | IGVAGFYFDY |
| SEQ ID NO: 26 | Nucleotide Sequence of V$_L$ of 10-O18-A | GAAATTGTGTTGACGCAGTCTCCAGGCACCC<br>TGTCTTTGTCTCCAGGGGAAAGAGCCACCCT<br>CTCCTGCAGGGCCAGTCAGAGTGTTAGCAG<br>CAGCTACTTAGCCTGGTACCAGCAGAAACC<br>TGGCCAGGCTCCCAGGCTCCTCATCTATGGT<br>GCATCCAGCAGGGCCACTGGCATCCCAGAC<br>AGGTTCAGTGGCAGTGGGTCTGGGACAGAC<br>TTCACTCTCACCATCAGCAGACTGGAGCCTG<br>AAGATTTTGCAGTGTATTACTGTCAGCAGTA<br>TGGTACCTCACCGCTCACTTTCGGCGGAGGG<br>ACCAAGGTGGAGATCAAA |
| SEQ ID NO: 27 | Amino acid Sequence of V$_L$ of 10-O18-A | EIVLTQSPGTLSLSPGERATLSCRASQSVSSSYL<br>AWYQQKPGQAPRLLIYGASSRATGIPDRFSGS<br>GSGTDFTLTISRLEPEDFAVYYCQQYGTSPLTF<br>GGGTKVEIK |
| SEQ ID NO: 28 | Amino acid Sequence of V$_L$ CDR1 of 10-O18-A | RASQSVSSSYLA |
| SEQ ID NO: 29 | Amino acid Sequence of V$_L$ CDR2 of 10-O18-A | GASSRAT |
| SEQ ID NO: 30 | Amino acid Sequence of V$_L$ CDR3 of 10-O18-A | QQYGTSPLT |
| SEQ ID NO: 31 | Nucleotide Sequence of V$_H$ of 6-G23-F | CAGGTGCAGCTGGTGCAGTCTGGGGCTGAG<br>GTGAAGAAGCCTGGGGCCTCAGTGAAGGTT<br>TCCTGCAAGGCATCTGGATACACCTTCACCA<br>GCTACTATATACACTGGGTGCGACAGGCCC<br>CTGGACAAGGGCTTGAGTGGATGGGAATAA<br>TCGACCCAAGTGATGGTAGCACAAACTACG<br>CACAGAAGTTCCAGGGCAGAGTCACCATGA<br>CCAGGGACACGTCCACGAGCACAGTCTACA<br>TGGAGCTGAGCAGCCTGAGATCTGAGGACA<br>CGGCCGTGTATTACTGTGCGAGAGATCGGG<br>AATATAACTACTACGGTTTGGACGTCTGGGG<br>CCAAGGGACCACGGTCACCGTCTCCTCA |
| SEQ ID NO: 32 | Amino acid Sequence of V$_H$ of 6-G23-F | QVQLVQSGAEVKKPGASVKVSCKASGYTFTS<br>YYIHWVRQAPGQGLEWMGIIDPSDGSTNYAQ<br>KFQGRVTMTRDTSTSTVYMELSSLRSEDTAV<br>YYCARDREYNYYGLDVWGQGTTVTVSS |
| SEQ ID NO: 33 | Amino acid Sequence of V$_H$ CDR1 of 6-G23-F | GYTFTSY |
| SEQ ID NO: 34 | Amino acid Sequence of V$_H$ CDR2 of 6-G23-F | DPSDGS |
| SEQ ID NO: 35 | Amino acid Sequence of V$_H$ CDR3 of 6-G23-F | DREYNYYGLDV |

| SEQ ID NO: | Description | Sequence |
|---|---|---|
| SEQ ID NO: 36 | Nucleotide Sequence of $V_L$ of 6-G23-F | GATGTTGTGATGACTCAGTCTCCACTCTCCC<br>TGCCCGTCACCCTTGGACAGCCGGCCTCCAT<br>CTCCTGCAGGTCTAGTCAAAGCCTCGTATAC<br>CGTGATGGAAACACCTACTTGAATTGGTTTC<br>AGCAGAGGCCAGGCCAATCTCCAAGGCGCC<br>TAATTTATAAGGTTTCTAACCGGGACTCTGG<br>GGTCCCAGACAGATTCCGCGGCAGTGGGTC<br>AGGCACTGATTTCACACTGAAAATCAGCCG<br>GGTGGAGGCTGAGGATGTTGGGGTTTATTA<br>CTGCATGCAAGGTACACACTGGCCTCCGAC<br>GTTCGGCCAAGGGACCAAGGTGGAAATCAA<br>A |
| SEQ ID NO: 37 | Amino acid Sequence of $V_L$ of 6-G23-F | DVVMTQSPLSLPVTLGQPASISCRSSQSLVYR<br>DGNTYLNWFQQRPGQSPRRLIYKVSNRDSGV<br>PDRFRGSGSGTDFTLKISRVEAEDVGVYYCM<br>QGTHWPPTFGQGTKVEIK |
| SEQ ID NO: 38 | Amino acid Sequence of $V_L$ CDR1 of 6-G23-F | RSSQSLVYRDGNTYLN |
| SEQ ID NO: 39 | Amino acid Sequence of $V_L$ CDR2 of 6-G23-F | KVSNRDS |
| SEQ ID NO: 40 | Amino acid Sequence of $V_L$ CDR3 of 6-G23-F | MQGTHWPPT |

Example 9: Treatment of NCI-H209 Xenografts

Eight week old female athymic nude mice will be used for this study. NCI-H209 tumor cells will be grown to mid-log phase in RPMI containing 10% fetal calf serum (FCS). The cells will be cultured in tissue culture flasks in a humidified incubator at 37° C., in an atmosphere of 5% $CO_2$ and 95% air. Mice will be implanted subcutaneously in the right flank with $5 \times 10^6$ NCI-H209 tumor cells in 50% matrigel in a total volume of 0.2 ml. Eight days after inoculation, mice will randomized into groups when tumors reached an average tumor volume of .about.150 $mm^3$. The mice will be injected on days 8, 12 and 15 via intraperitoneal injection with either human IgG1 (1 or 10 mg/kg; n=5-15 mice) as a negative control or one or more Antibody-Drug Conjugates of 6-G23-F, 2-C8-A, 7-I1-B and 10-O18-A (1 or 10 mg/kg; n=5-15 mice). Tumor growth will be measured.

Antibody-Drug Conjugates of 6-G23-F, 2-C8-A, 7-I1-B and 10-O18-A will be prepared using methods known in the literature. Some methods are disclosed in Examples 3-4 herein. One or more of a protein toxin (e.g., saporin toxin, *Pseudomonas* exotoxin, and diphtheria toxin), a radionuclide, an anthracycline, a microtubule inhibitor, a mitosis inhibitor, a DNA damaging agent, a nucleotide analog, an amino acid analog, a vitamin analog will be conjugated with 6-G23-F, 2-C8-A, 7-I1-B and 10-O18-A to generate 6-G23-F-ADC, 2-C8-A-ADC, 7-I1-B-ADC and 10-O18-A-ADC, respectively. Eight week old female athymic nude mice will be used for this study. NCI-H209 tumor cells will be grown to mid-log phase in RPMI containing 10% fetal calf serum (FCS). The cells will be cultured in tissue culture flasks in a humidified incubator at 37° C., in an atmosphere of 5% $CO_2$ and 95% air. Mice will be implanted subcutaneously in the right flank with $5 \times 10^6$ NCI-H209 tumor cells in 50% matrigel in a total volume of 0.2 ml. Eight days after inoculation, mice will randomized into groups when tumors reached an average tumor volume of about 150 $mm^3$. The mice will be injected on days 8, 12 and 15 via intraperitoneal injection with either human IgG1-ADC (0.11 or 1 mg/kg; n=5-15 mice) as a negative control or one or more of 6-G23-F-ADC, 2-C8-A-ADC, 7-I1-B-ADC or 10-O18-A-ADC (0.1 or 1 mg/kg; n=5-15 mice). Tumor growth will be measured.

These results will demonstrate that the immunoglobulin-related compositions of the present technology are useful in methods for treating a subject suffering from a DLL3-associated cancer (e.g., small-cell lung cancer, large cell neuroendocrine carcinoma, pulmonary neuroendocrine cancers, extrapulmonary neuroendocrine cancers, extrapulmonary neuroendocrine cancers, or melanoma).

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

All patents, patent applications, provisional applications, and publications referred to or cited herein are incorporated by reference in their entirety, including all figures and tables, to the extent they are not inconsistent with the explicit teachings of this specification.

What is claimed is:

1. An antibody or antigen binding fragment thereof comprising a heavy chain immunoglobulin variable domain ($V_H$) and a light chain immunoglobulin variable domain ($V_L$), wherein
   (a) the $V_H$ comprises a $V_H$-CDR1 sequence, a $V_H$-CDR2 sequence, and a $V_H$-CDR3 sequence selected from the group consisting of
       (i) SEQ ID NO: 3, SEQ ID NO: 4, and SEQ ID NO: 5, respectively;
       (ii) SEQ ID NO: 13, SEQ ID NO: 14, and SEQ ID NO: 15, respectively;
       (iii) SEQ ID NO: 23, SEQ ID NO: 24, and SEQ ID NO: 25, respectively; and
       (iv) SEQ ID NO: 33, SEQ ID NO: 34, and SEQ ID NO: 35, respectively;
   and
   (b) the $V_L$ comprises a $V_L$-CDR1 sequence, a $V_L$-CDR2 sequence, and a $V_L$-CDR3 sequence selected from the group consisting of (i) SEQ ID NO: 8, SEQ ID NO: 9, and SEQ ID NO: 10, respectively;
(ii) SEQ ID NO: 18, SEQ ID NO: 19, and SEQ ID NO: 20, respectively;
(iii) SEQ ID NO: 28, SEQ ID NO: 29, and SEQ ID NO: 30, respectively; and
(iv) SEQ ID NO: 38, SEQ ID NO: 39, and SEQ ID NO: 40, respectively.

2. The antibody or antigen binding fragment of claim 1, wherein:
   (a) the $V_H$ comprises an amino acid sequence selected from the group consisting of SEQ ID NO: 2, SEQ ID NO: 12, SEQ ID NO: 22, and SEQ ID NO: 32; and
   (b) the $V_L$ comprises an amino acid sequence selected from the group consisting of SEQ ID NO: 7, SEQ ID NO: 17, SEQ ID NO: 27, and SEQ ID NO: 37.

3. The antibody or antigen binding fragment of claim 2, wherein the $V_H$ amino acid sequence and the $V_L$ amino acid sequence is selected from the group consisting of:
   SEQ ID NO: 2 and SEQ ID NO: 7 (7-I1-B), respectively;
   SEQ ID NO: 12 and SEQ ID NO: 17 (2-C8-A), respectively;
   SEQ ID NO: 22 and SEQ ID NO: 27 (10-O18-A), respectively; and
   SEQ ID NO: 32 and SEQ ID NO: 37 (6-G23-F), respectively.

4. The antibody or antigen binding fragment of claim 1 comprising:
   (a) a light chain immunoglobulin variable domain sequence that is at least 95% identical to the light chain immunoglobulin variable domain sequence of any one of SEQ ID NOs: 7, 17, 27, or 37; and
   (b) a heavy chain immunoglobulin variable domain sequence that is at least 95% identical to the heavy chain immunoglobulin variable domain sequence present in any one of SEQ ID NOs: 2, 12, 22, or 32.

5. The antibody or antigen binding fragment of claim 1, further comprising a Fc domain of an isotype selected from the group consisting of IgG1, IgG2, IgG3, IgG4, IgA1, IgA2, IgM, IgD, and IgE.

6. The antibody or antigen binding fragment of claim 1, wherein the antigen binding fragment is selected from the group consisting of Fab, F(ab')$_2$, Fab', scF$_v$, and F$_v$.

7. The antibody of claim 1, wherein the antibody is a monoclonal antibody, a chimeric antibody, a humanized antibody, or a bispecific antibody.

8. The antibody or antigen binding fragment of claim 1, wherein the antibody or antigen binding fragment binds to an epitope present in a mammalian DLL3 polypeptide.

9. The antibody or antigen binding fragment of claim 8, wherein the epitope is a conformational epitope or a non-conformational epitope.

10. The antibody or antigen binding fragment of claim 8, wherein the mammalian DLL3 polypeptide has an amino acid sequence comprising amino acid residues 27-492 of SEQ ID NO: 50 or SEQ ID NO: 51.

11. A composition comprising the antibody or antigen binding fragment of claim 1 and a pharmaceutically-acceptable carrier, optionally wherein the antibody or antigen binding fragment is conjugated to an agent selected from the group consisting of isotopes, dyes, chromagens, contrast agents, drugs, toxins, cytokines, enzymes, enzyme inhibitors, hormones, hormone antagonists, growth factors, radionuclides, metals, liposomes, nanoparticles, RNA, DNA or any combination thereof.

12. A kit comprising the antibody or antigen binding fragment of claim 1 and instructions for use.

13. The kit of claim 12, wherein the antibody or antigen binding fragment is coupled to at least one detectable label selected from the group consisting of a radioactive label, a fluorescent label, and a chromogenic label.

14. A method for treating a DLL3-associated cancer in a subject in need thereof, comprising: administering to the subject a therapeutically effective amount of the antibody or antigen binding fragment of claim 1, wherein the antibody or antigen binding fragment is conjugated to at least one additional therapeutic agent.

15. The method of claim 14, wherein the at least one additional therapeutic agent is selected from the group consisting of isotopes, drugs, toxins, cytokines, enzymes, enzyme inhibitors, hormones, hormone antagonists, growth factors, radionuclides, metals, liposomes, nanoparticles, RNA, DNA or any combination thereof.

16. The method of claim 14, wherein the DLL3-associated cancer is small-cell lung cancer, large cell neuroendocrine carcinoma, pulmonary neuroendocrine cancer, extra-pulmonary neuroendocrine cancers, or melanoma.

17. A method for detecting DLL3 protein levels in a biological sample comprising:
   contacting the biological sample with the antibody or antigen binding fragment of claim 1, wherein the antibody or antigen binding fragment is conjugated to a detectable label; and
   detecting the signal generated by the detectable label in the biological sample.

* * * * *